US012216437B2

(12) United States Patent
Miller

(10) Patent No.: US 12,216,437 B2
(45) Date of Patent: Feb. 4, 2025

(54) METHOD, SYSTEM, AND COMPUTER PROGRAM PRODUCT FOR AUTONOMOUS CONTROL OF DYNAMICAL SYSTEMS

(71) Applicant: Andrew Gilbert Miller, Pittsburgh, PA (US)

(72) Inventor: Andrew Gilbert Miller, Pittsburgh, PA (US)

( * ) Notice: Subject to any disclaimer, the term of this patent is extended or adjusted under 35 U.S.C. 154(b) by 701 days.

(21) Appl. No.: 17/425,509

(22) PCT Filed: Jan. 27, 2020

(86) PCT No.: PCT/US2020/015264
§ 371 (c)(1),
(2) Date: Jul. 23, 2021

(87) PCT Pub. No.: WO2020/154743
PCT Pub. Date: Jul. 30, 2020

(65) Prior Publication Data
US 2022/0146992 A1    May 12, 2022

Related U.S. Application Data

(60) Provisional application No. 62/796,935, filed on Jan. 25, 2019, provisional application No. 62/796,961, filed on Jan. 25, 2019.

(51) Int. Cl.
*G05B 13/02* (2006.01)
*G05B 15/02* (2006.01)

(52) U.S. Cl.
CPC .......... *G05B 13/029* (2013.01); *G05B 15/02* (2013.01)

(58) Field of Classification Search
CPC ..... G05B 13/029; G05B 15/02; G01S 13/862; G01S 13/865; G01S 13/867; G01S 13/89; G01S 13/93; G01S 17/93; G01S 17/86; G01S 17/89; G06N 3/08
See application file for complete search history.

(56) References Cited

U.S. PATENT DOCUMENTS

| 5,652,871 A * | 7/1997 | Steinman ................ G06F 30/20 700/90 |
| 2006/0208169 A1 | 9/2006 | Breed et al. |
| 2009/0018696 A1 * | 1/2009 | Goerick ................... B25J 9/161 901/1 |

(Continued)

*Primary Examiner* — Santosh R Poudel
(74) *Attorney, Agent, or Firm* — The Webb Law Firm

(57) ABSTRACT

Provided is a system for autonomous control of dynamical systems. The system may include one or more processors programmed or configured to receive data associated with a host platform, construct a run-time dynamic envelope based on the data associated with the host platform, and construct a Worldview Relational Interaction Map (WRIM) based on the run-time dynamic envelope, wherein the WRIM comprises a coordinate system corresponding to an area (e.g., a volume associated with the area) of an environment of the host platform, wherein the coordinate system comprises a plurality of elements, wherein each element of the plurality of elements includes one or more data attributes associated with a predicted momentum exchange resulting from the host platform co-occupying the element with an entity. A method and computer program product are also disclosed.

20 Claims, 22 Drawing Sheets

(56) References Cited

U.S. PATENT DOCUMENTS

| | | | |
|---|---|---|---|
| 2010/0094509 A1* | 4/2010 | Luke | B60W 40/02 |
| | | | 342/52 |
| 2010/0223008 A1* | 9/2010 | Dunbabin | E02F 9/262 |
| | | | 701/301 |
| 2016/0018806 A1 | 1/2016 | Kohn et al. | |
| 2016/0216130 A1 | 7/2016 | Abramson et al. | |
| 2018/0067488 A1* | 3/2018 | Pollach | G06N 7/01 |

* cited by examiner

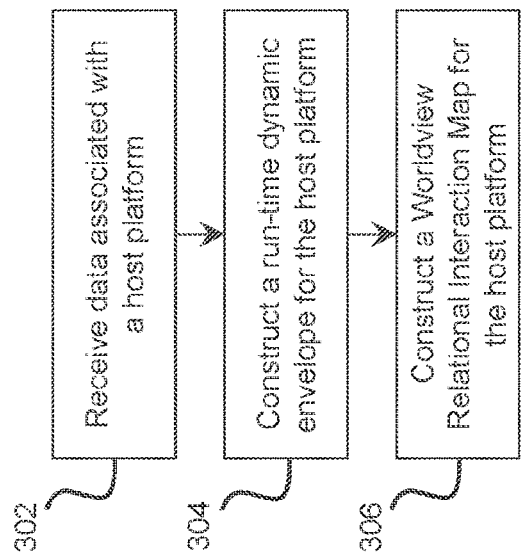

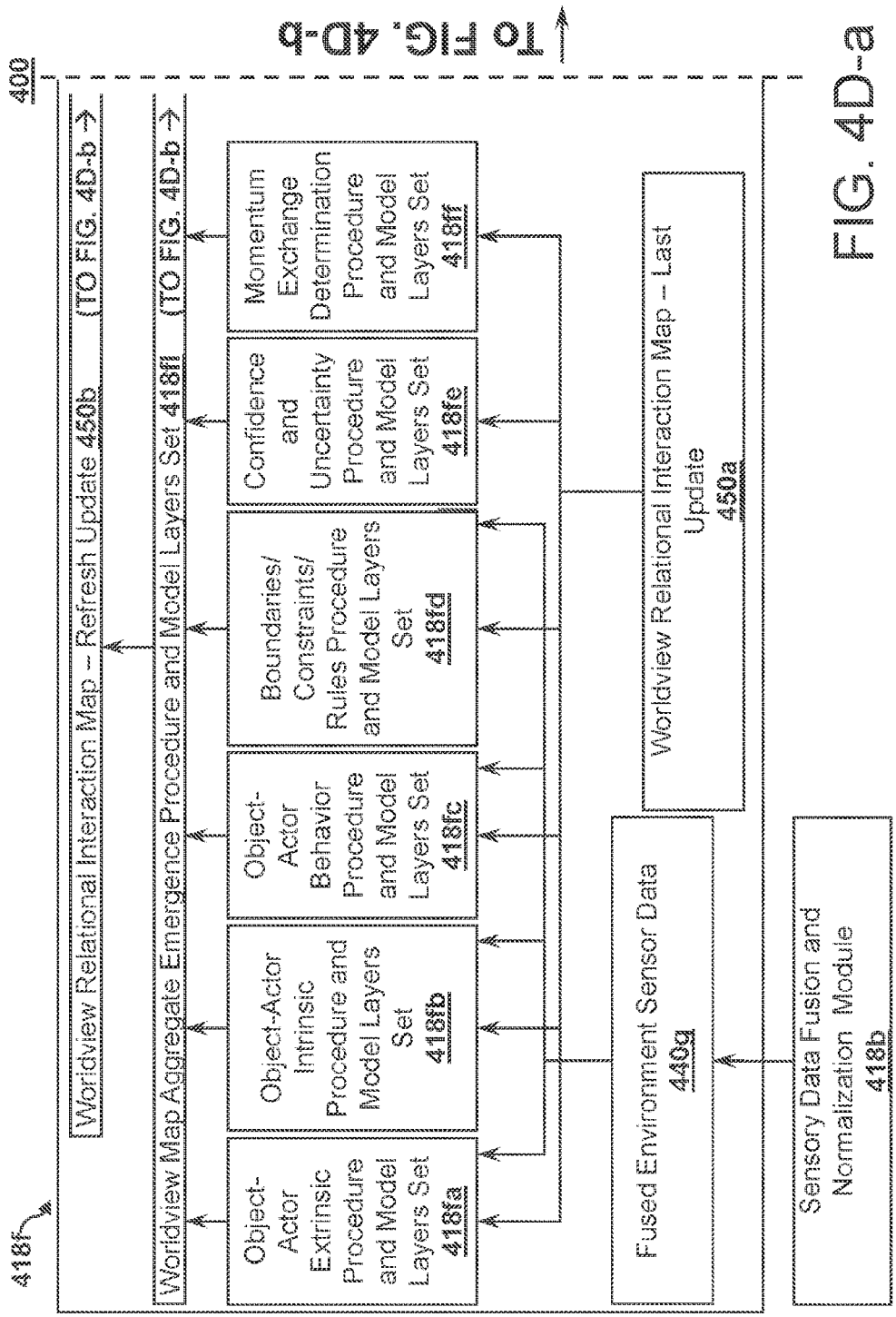

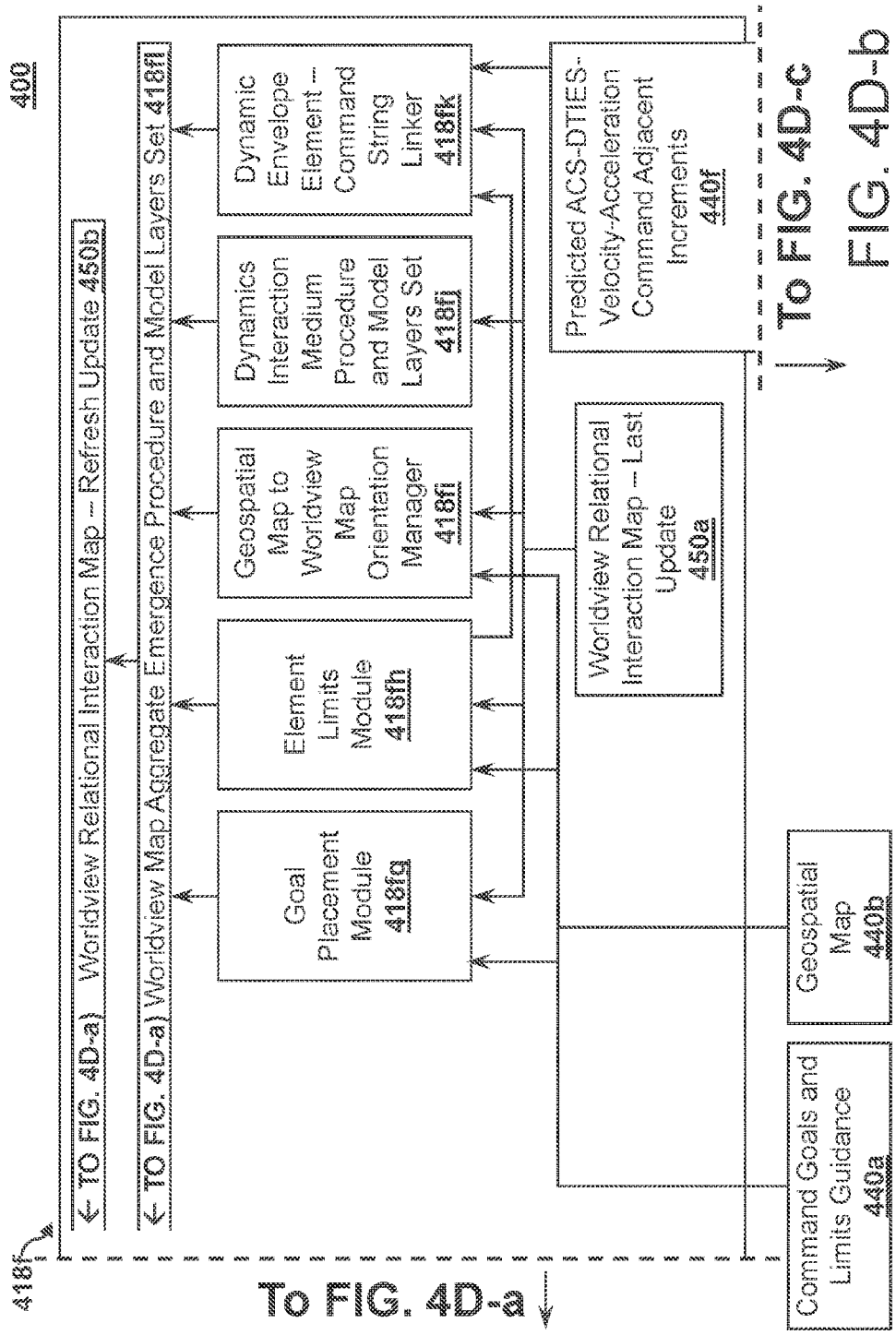

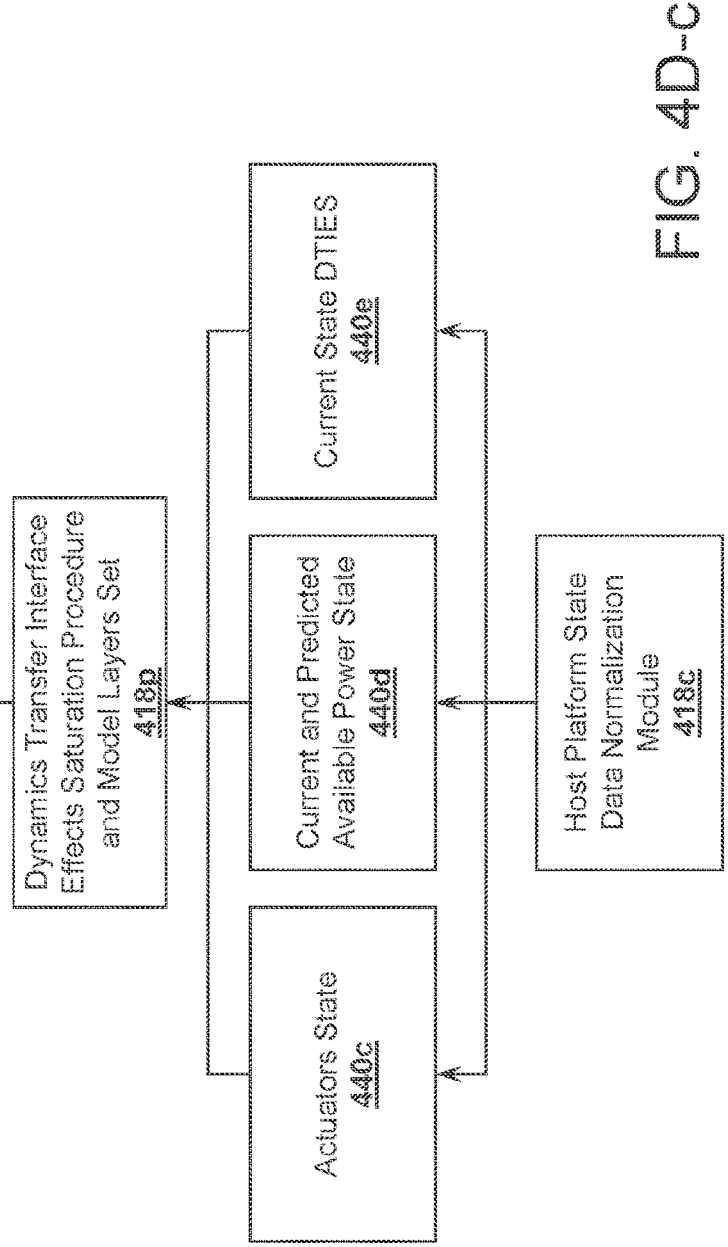

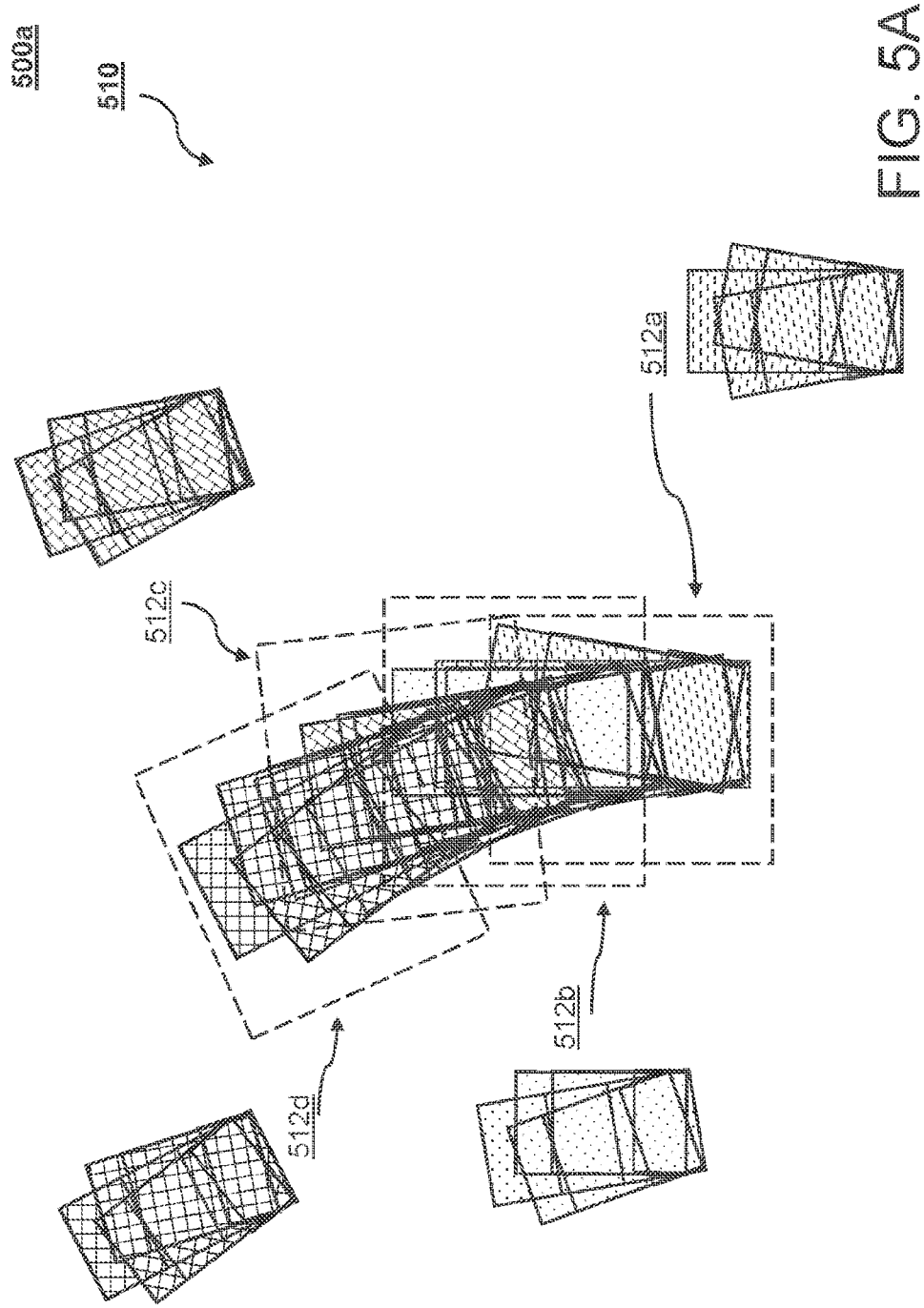

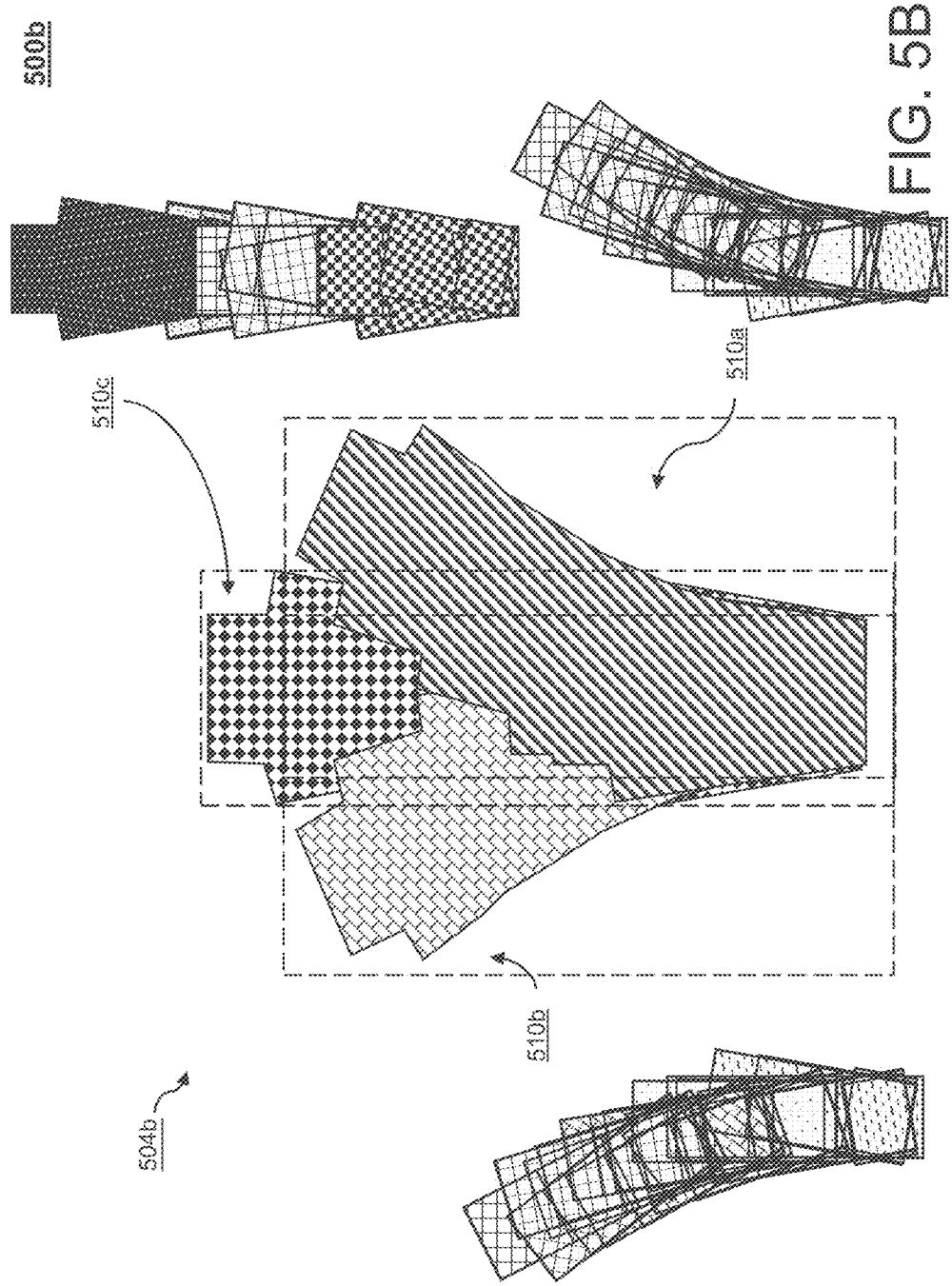

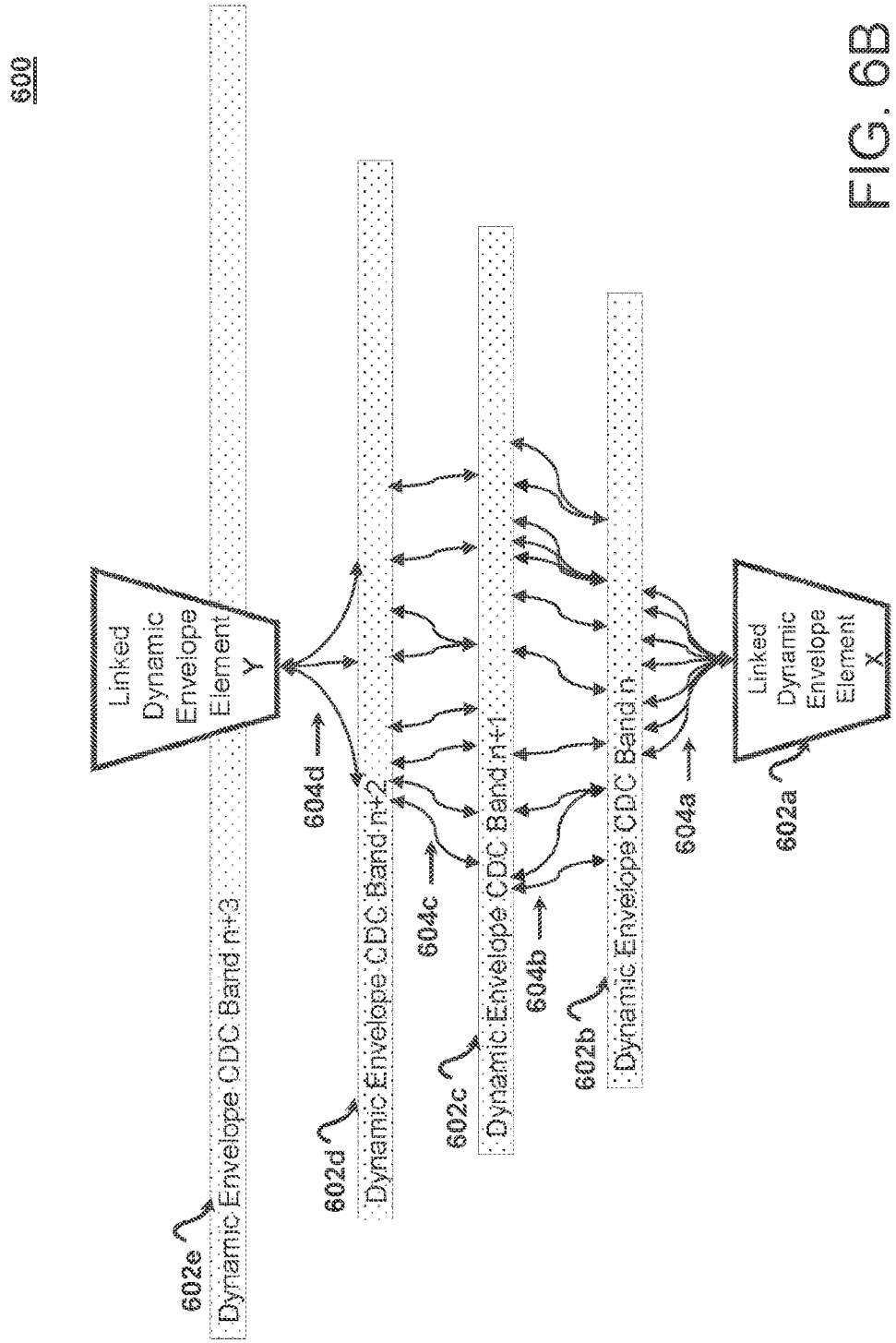

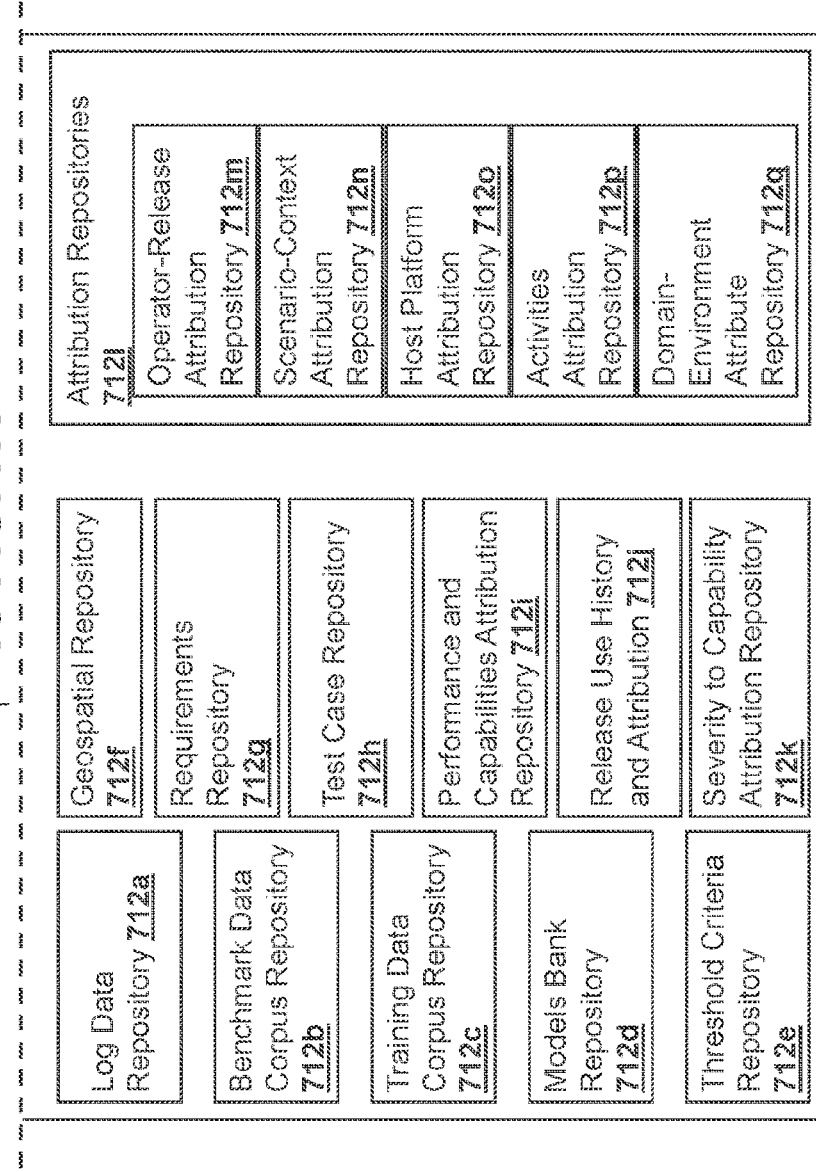

METHOD, SYSTEM, AND COMPUTER PROGRAM PRODUCT FOR AUTONOMOUS CONTROL OF DYNAMICAL SYSTEMS

CROSS REFERENCE TO RELATED APPLICATIONS

This application is the United States national phase of International Application No. PCT/US2020/015264 filed Jan. 27, 2020, and claims priority to U.S. Provisional Patent Application Nos. 62/796,961, filed on Jan. 25, 2019, and 62/796,935, filed on Jan. 25, 2019, the disclosures of which are hereby incorporated by reference in their entirety.

BACKGROUND

1. Field

This disclosed subject matter relates generally to methods, systems, and products for control of dynamical systems and, in some particular embodiments, to a method, system, and computer program product for autonomous control of dynamical systems.

2. Technical Considerations

A self-driving vehicle may be a vehicle (e.g., a car, a bus, a train, etc.) configured to navigate (e.g., advance, stop, turn, etc.) with little or no input from a user that may operate the self-driving vehicle. A self-driving vehicle may include a computing device and one or more sensors in communication with the computing device, the one or more sensors configured to transmit data associated with an environment in which the self-driving vehicle is disposed in to the computing device. The one or more sensors may include, for example, an optical sensors, a radio detection and ranging (RADAR) sensor, a light detection and ranging (LIDAR) sensor, a sound navigation ranging (SONAR) sensor, a global positioning sensor (GPS), a motion sensor, and/or the like. The environment may include, for example, other vehicles, a surface of a road, road signs, and/or the like.

During navigation, a self-driving vehicle may receive data associated with one or more measurements measured by one or more sensors included in the self-driving vehicle. The vehicle may navigate (e.g., adjust a navigation route) based on the data associated with the one or more measurements from the one or more sensors. For example, a self-driving vehicle may receive proximity data associated with a proximity of the self-driving vehicle to a second vehicle relative to the self-driving vehicle from a LIDAR sensor at a computing device. The self-driving vehicle may determine it is within a predetermined distance from the second vehicle and the computing device may transmit a control signal to a braking system of the self-driving vehicle to cause the self-driving vehicle to stop (e.g., to prevent a collision).

However, a self-driving vehicle may not be configured to transmit control signals to cause the vehicle to adjust navigation based on context derived from the data associated with the one or more measurements from the one or more sensors. For example, the self-driving vehicle may not be configured to determine that one or more other vehicles are moving relative to the self-driving vehicle (e.g., at a lesser rate of speed, at a greater rate of speed, etc.) and, in turn, the computing device may not be configured to transmit control signals to a braking assembly of the self-driving vehicle to cause the self-driving vehicle to slow down or speed up (e.g., instead of stopping) based on data associated with the one or more measurements from the one or more sensors. As a result, the self-driving vehicle may navigate less accurately (e.g., to stop instead of slowing down and/or the like). Further, resources associated with navigating the self-driving vehicle (e.g., brake pads) may be consumed inefficiently based on the navigation of the self-driving vehicle. Even further, the self-driving vehicle may expend energy (e.g., fuel, electricity, etc.) navigating based on the control signals transmitted by the computing device.

SUMMARY

Accordingly, it is an object of the presently disclosed subject matter to provide methods, systems, and computer program products for autonomous control of dynamical systems. Further non-limiting embodiments are set forth in the following numbered clauses:

Clause 1: A system comprising: one or more processors programmed or configured to: receive data associated with a host platform; construct a run-time dynamic envelope based on the data associated with the host platform, wherein, when constructing the run-time dynamic envelope, the one or more processors are programmed and configured to: construct an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with an entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform; determine data associated with a state of the host platform based on data associated with a host platform; construct an idealized dynamic envelope based on the initialization dynamic envelope, the data associated with a state of the host platform, and data associated with a perception envelope; and construct the run-time dynamic envelope based on the idealized dynamic envelope; and construct a Worldview Relational Interaction Map (WRIM) based on the run-time dynamic envelope, wherein the WRIM comprises a coordinate system corresponding to an area (e.g., a volume associated with the area) of an environment of the host platform, wherein the coordinate system comprises a plurality of elements, wherein each element of the plurality of elements comprises: one or more data attributes associated with a predicted momentum exchange resulting from the host platform co-occupying the element with an entity.

Clause 2: The system of clause 1, wherein the one or more processors are further programmed or configured to: determine the one or more data attributes associated with predicted momentum exchange of the host platform with regard to the entity associated with the element based on a machine learning model associated with a predicted transformation of perception.

Clause 3: The system of clauses 1 or 2, wherein, when constructing the run-time dynamic envelope, the one or more processors are programmed or configured to: construct the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium.

Clause 4: The system of any of clauses 1-3, wherein when constructing the run-time dynamic envelope, the one or more processors are programmed or configured to: predict a state result of the host platform to actuator commands based on the data associated with CITIES; and generate an element of the run-time dynamic envelope based on the state result of the host platform.

Clause 5: The system of any of clauses 1-4, wherein the one or more processors are further programmed or configured to: identify an Reasonable Operating Envelope (ROE) based on each element of the WRIM; wherein when identifying the ROE, the one or more processors are programmed or configured to: compare the one or more data attributes associated with a momentum exchange of an element of the WRIM to a threshold; label the element with an indication that the host platform should not occupy the element based on determining that the one or more data attributes associated with a momentum exchange of the element satisfies the threshold; and label the element with an indication that the host platform can occupy the element based on determining that the one or more data attributes associated with a momentum exchange of the element does not satisfy the threshold.

Clause 6: The system of any of clauses 1-5, wherein each element of the plurality of elements comprises: one or more data attributes associated with a momentum exchange resulting from the host platform co-occupying the element with an entity; one or more data attributes associated with boundaries, constraints, and/or rules of an environment of the host platform for the element; and one or more data attributes associated with a metric of uncertainty of the host platform for the element; and wherein the one or more processors are further programmed or configured to: identify an Reasonable Operating Envelope (ROE) based on the data attributes of each element of the WRIM; wherein when identifying the ROE, the one or more processors are programmed or configured to: provide the one or more data attributes associated with a momentum exchange resulting from the host platform co-occupying the element with an entity as an input to a first machine learning model to generate an output that includes a prediction of a value of momentum exchange and an indication of whether the value of momentum exchange satisfies a first threshold; provide the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold; provide the one or more data attributes associated with a metric of uncertainty of the host platform for the element as an input to a third machine learning model to generate an output that includes a prediction of a value of uncertainty and an indication of whether the value of uncertainty satisfies a third threshold; label the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and label the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold.

Clause 7: The system of any of clauses 1-6, wherein the one or more processors are further programmed or configured to: receive data associated with a path of a second host platform, wherein the path of the second host platform comprises a plurality of elements that were occupied by the second host platform during a sequence of executed actuator commands; and compare the data associated with the path of the second host platform to the ROE; wherein, when comparing the data associated with the path of the second host platform along a second WRIM to the ROE, the one or more processors are programmed or configured to: compare a first element of the plurality of elements that were occupied by the second host platform during a sequence of executed actuator commands to an element of the ROE having a NO GO label, wherein the element of the ROE is in a nearest CDC band to the first element; and determine a CDC band margin between the first element of the plurality of elements and the element of the ROE having the NO GO label, wherein the CDC band margin is a number of CDC bands from the first element of the plurality of elements to the element of the ROE having the NO GO label.

Clause 8: The system of any of clauses 1-7, wherein the one or more processors are further programmed or configured to: determine a pattern associated with CDC band margin for an operator of the second host platform; assign a rating to an identifier of an operator of the second host platform based on the pattern associated with CDC band margin for the operator; and determine a classification of risk of the operator based on the rating of the identifier of the operator.

Clause 9: The system of any of clauses 1-8, wherein an output of a predicted momentum exchange machine learning model comprises the one or more data attributes associated with the predicted momentum exchange resulting from the host platform co-occupying the element with an entity, and wherein the one or more processors are further programmed or configured to: train the predicted momentum exchange machine learning model based on a training dataset associated with an actual momentum exchange resulting from the host platform co-occupying an element with an entity; validate the predicted momentum exchange machine learning model based on a validation dataset associated with an actual momentum exchange resulting from the host platform co-occupying an element with an entity; and use the predicted momentum exchange machine learning model to generate the one or more data attributes associated with a predicted momentum exchange resulting from the host platform co-occupying an element with an entity.

Clause 10: The system of any of clauses 1-9, wherein the one or more processors are further programmed or configured to: train a threshold machine learning model based on a training dataset associated with an actual momentum exchange and a severity of outcome associated with an actual momentum exchange event resulting from the host platform co-occupying an element with an entity; validate the threshold machine learning model based on a validation dataset associated with an actual momentum exchange and a severity of outcome associated with the actual momentum exchange event resulting from the host platform co-occupying an element with an entity; and use the threshold machine learning model to generate a prediction and an indication of whether the prediction satisfies a threshold.

Clause 11: The system of any of clauses 1-10, wherein the one or more processors are further programmed or configured to: determine a pattern associated with CDC band margin for an actual momentum exchange; generate a plurality of ranges of patterns of CDC band margins based on severity of outcome associated with a likelihood of momentum exchange event resulting from the host platform co-occupying an element with an entity, wherein each range of patterns of CDC band margins is associated with a classification of risk; determine a pattern associated with CDC band margin of the operator; determine a range of the plurality of ranges of patterns of CDC band margins for the operator based on the pattern associated with CDC band margin of an operator of a host platform; and determine a classification of risk of the operator based on the range.

Clause 12: The system of any of clauses 1-11, wherein each element of the plurality of elements comprises a plurality of data attributes, wherein the plurality of data attributes comprise: one or more data attributes associated with a momentum exchange resulting from the host platform co-occupying the element with an entity; one or more data attributes associated with boundaries, constraints, and/or rules of an environment of the host platform for the element; one or more data attributes associated with a metric of uncertainty of the host platform for the element; and wherein the one or more processors are further programmed or configured to: identify an Reasonable Operating Envelope (ROE) based on the plurality of data attributes of each element of the WRIM; and perform an action based on the ROE.

Clause 13: The system of any of clauses 1-12, wherein when performing the action based on the ROE, the one or more processors are programmed or configured to: identify a plurality of command strings that converge on an element that corresponds to a goal, wherein each command string comprises a plurality of elements that are linked, the plurality of elements include a first element that corresponds to an initial position of the host platform and a final element that corresponds to the goal; and select a command string from the plurality of command strings based on one or more parameters associated with the command string.

Clause 14: The system of any of clauses 1-13, wherein when performing the action based on the ROE, the one or more processors are programmed or configured to: issue an actuator command to the host platform based on the command string.

Clause 15: The system of any of clauses 1-14, wherein the one or more processors are further programmed or configured to: receive an input from a user associated with a strategic level goal on a geospatial map, generate a placeholder element for the strategic level goal based on the strategic level goal, wherein the placeholder element for the strategic level goal comprises criteria associated with velocity and acceleration of the host platform at the placeholder element; determine an operational level goal based on the strategic level goal; generate a placeholder element for the operational level goal based on the operational level goal, wherein the placeholder element for the operational level goal comprises criteria associated with velocity and acceleration of the host platform at the placeholder element; and determine a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

Clause 16: A method, comprising: receiving data associated with a host platform; constructing a run-time dynamic envelope based on the data associated with the host platform, wherein constructing the run-time dynamic envelope comprises: constructing an initialization dynamic envelope based on a set of actuator commands of the host platform, a response of the host platform to each actuator command of the set of actuator commands of the host platform; and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with an entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform; determining data associated with a state of the host platform based on data associated with a host platform; constructing an idealized dynamic envelope based on the initialization dynamic envelope, the data associated with a state of the host platform, and data associated with a perception envelope; and constructing the run-time dynamic envelope based on the idealized dynamic envelope; and constructing a Worldview Relational Interaction Map (WRIM) based on the run-time dynamic envelope, wherein the WRIM comprises a coordinate system corresponding to an area (e.g., a volume associated with the area) of an environment of the host platform, wherein the coordinate system comprises a plurality of elements, and wherein each element of the plurality of elements comprises: one or more data attributes associated with a predicted momentum exchange resulting from the host platform co-occupying the element with an entity.

Clause 17: The method of clause 16, further comprising: determining the one or more data attributes associated with predicted momentum exchange of the host platform with regard to the entity associated with the element based on a machine learning model associated with a predicted transformation of perception.

Clause 18: The method of clauses 16 or 17, wherein constructing the run-time dynamic envelope comprises: constructing the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium.

Clause 19: The method of any of clauses 16-18, wherein constructing the run-time dynamic envelope comprises: predicting a state result of the host platform to actuator commands based on the data associated with DTIES; and generating an element of the run-time dynamic envelope based on the state result of the host platform.

Clause 20: The method of any of clauses 16-19, further comprising: identifying an Reasonable Operating Envelope (ROE) based on each element of the WRIM; wherein identifying the ROE comprises: comparing the one or more data attributes associated with a momentum exchange of an element of the WRIM to a threshold; labeling the element with an indication that the host platform should not occupy the element based on determining that the one or more data attributes associated with a momentum exchange of the element satisfies the threshold; and labeling the element with an indication that the host platform can occupy the element based on determining that the one or more data attributes associated with a momentum exchange of the element does not satisfy the threshold.

Clause 21: The method of any of clauses 16-20, wherein each element of the plurality of elements comprises: one or more data attributes associated with a momentum exchange resulting from the host platform co-occupying the element with an entity; one or more data attributes associated with boundaries, constraints, and/or rules of an environment of the host platform for the element; and one or more data attributes associated with a metric of uncertainty of the host platform for the element, the method further comprising: identifying an Reasonable Operating Envelope (ROE) based on the data attributes of each element of the WRIM; wherein identifying the ROE comprises: providing the one or more data attributes associated with a momentum exchange resulting from the host platform co-occupying the element with an entity as an input to a first machine learning model to generate an output that includes a prediction of a value of momentum exchange and an indication of whether the value of momentum exchange satisfies a first threshold; providing the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold; providing the one or more data attributes associated with a metric of uncertainty of the host platform for the element as an input to a third machine learning model to generate an output that includes a prediction of a value of uncertainty and an indication of whether the value of uncertainty satisfies a third threshold; labeling the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and labeling the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold.

Clause 22: The method of any of clauses 16-21, further comprising: receiving data associated with a path of a second host platform, wherein the path comprises a plurality of elements that were occupied by the second host platform during a sequence of executed actuator commands; and comparing the data associated with the path of the second host platform to the ROE; wherein comparing the data associated with the path of the second host platform along a second WRIM to the ROE comprises: comparing a first element of the plurality of elements that were occupied by the second host platform during a sequence of executed actuator commands to an element of the ROE having a NO GO label, wherein the element of the ROE is in a nearest CDC band to the first element; and determining a CDC band margin between the first element of the plurality of elements and the element of the ROE having the NO GO label, wherein the CDC band margin is a number of CDC bands from the first element of the plurality of elements to the element of the ROE having the NO GO label.

Clause 23: The method of any of clauses 16-22, further comprising: determining a pattern associated with CDC band margin for an operator of the second host platform; assigning a rating to an identifier of an operator of the second host platform based on the pattern associated with CDC band margin for the operator; and determining a classification of risk of the operator based on the rating of the identifier of the operator.

Clause 24: The method of any of clauses 16-23, wherein an output of a predicted momentum exchange machine learning model comprises the one or more data attributes associated with the predicted momentum exchange resulting from the host platform co-occupying the element with an entity, the method further comprising: training the predicted momentum exchange machine learning model based on a training dataset associated with an actual momentum exchange resulting from the host platform co-occupying an element with an entity; validating the predicted momentum exchange machine learning model based on a validation dataset associated with an actual momentum exchange resulting from the host platform co-occupying an element with an entity; and using the predicted momentum exchange machine learning model to generate the one or more data attributes associated with a predicted momentum exchange resulting from the host platform co-occupying an element with an entity.

Clause 25: The method of any of clauses 16-24, further comprising: training a threshold machine learning model based on a training dataset associated with an actual momentum exchange and a severity of outcome associated with an actual momentum exchange event resulting from the host platform co-occupying an element with an entity; validating the threshold machine learning model based on a validation dataset associated with an actual momentum exchange and a severity of outcome associated with the actual momentum exchange event resulting from the host platform co-occupying an element with an entity; and using the threshold machine learning model to generate a prediction and an indication of whether the prediction satisfies a threshold.

Clause 26: The method of any of clauses 16-25, further comprising: determining a pattern associated with CDC band margin for an actual momentum exchange; generating a plurality of ranges of patterns of CDC band margins based on severity of outcome associated with a likelihood of momentum exchange event resulting from the host platform co-occupying an element with an entity, wherein each range of patterns of CDC band margins is associated with a classification of risk; determining a pattern associated with CDC band margin of the operator; determining a range of the plurality of ranges of patterns of CDC band margins for the operator based on the pattern associated with CDC band margin of an operator of a host platform; and determining a classification of risk of the operator based on the range.

Clause 27: The method of any of clauses 16-26, wherein each element of the plurality of elements comprises a plurality of data attributes, wherein the plurality of data attributes comprise: one or more data attributes associated with a momentum exchange resulting from the host platform co-occupying the element with an entity; one or more data attributes associated with boundaries, constraints, and/or rules of an environment of the host platform for the element; and one or more data attributes associated with a metric of uncertainty of the host platform for the element; the method further comprising: identifying an Reasonable Operating Envelope (ROE) based on the plurality of data attributes of each element of the WRIM; and performing an action based on the ROE.

Clause 28: The method of any of clauses 16-27, wherein performing the action based on the ROE comprises: identifying a plurality of command strings that converge on an element that corresponds to a goal, wherein each command string comprises a plurality of elements that are linked, the plurality of elements include a first element that corresponds to an initial position of the host platform and a final element that corresponds to the goal; and selecting a command string from the plurality of command strings based on one or more parameters associated with the command string.

Clause 29: The method of any of clauses 16-28, wherein performing the action based on the ROE comprises: issuing an actuator command to the host platform based on the command string.

Clause 30: The method of any of clauses 16-29, further comprising: receiving an input from a user associated with a strategic level goal on a geospatial map, generating a placeholder element for the strategic level goal based on the strategic level goal, wherein the placeholder element for the strategic level goal comprises criteria associated with velocity and acceleration of the host platform at the placeholder element; determining an operational level goal based on the strategic level goal; generating a placeholder element for the operational level goal based on the operational level goal, wherein the placeholder element for the operational level goal comprises criteria associated with velocity and acceleration of the host platform at the placeholder element; and determining a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

Clause 31: A computer program product comprising at least one non-transitory computer-readable medium including one or more instructions that, when executed by at least one processor, cause the at least one processor to: receive data associated with a host platform; construct a run-time dynamic envelope based on the data associated with the host platform, wherein the one or more instructions that cause the at least one processor to construct the run-time dynamic envelope cause the at least one processor to: construct an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with an entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform; determine data associated with a state of the host platform based on data associated with a host platform; construct an idealized dynamic envelope based on the initialization dynamic envelope, the data associated with a state of the host platform, and data associated with a perception envelope; construct the run-time dynamic envelope based on the idealized dynamic envelope; and construct a Worldview Relational Interaction Map (WRIM) based on the run-time dynamic envelope, wherein the WRIM comprises a coordinate system corresponding to an area (e.g., a volume associated with the area) of an environment of the host platform, wherein the coordinate system comprises a plurality of elements, and wherein each element of the plurality of elements comprises: one or more data attributes associated with a predicted momentum exchange resulting from the host platform co-occupying the element with an entity.

Clause 32: The computer program product of clause 31, wherein the one or more instructions further cause the at least one processor to: determine the one or more data attributes associated with predicted momentum exchange of the host platform with regard to the entity associated with the element based on a machine learning model associated with a predicted transformation of perception.

Clause 33: The computer program product of clauses 31 or 32, wherein the one or more instructions that cause the at least one processor to construct the run-time dynamic envelope cause the at least one processor to: construct the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium.

Clause 34: The computer program product of any of clauses 31-33, wherein the one or more instructions that cause the at least one processor to construct the run-time dynamic envelope cause the at least one processor to: predicting a state result of the host platform to actuator commands based on the data associated with DTIES; and generating an element of the run-time dynamic envelope based on the state result of the host platform.

Clause 35: The computer program product of any of clauses 31-34, wherein the one or more instructions further cause the at least one processor to: identify an Reasonable Operating Envelope (ROE) based on each element of the WRIM; wherein the one or more instructions that cause the at least one processor to identify the ROE cause the at least one processor to: compare the one or more data attributes associated with a momentum exchange of an element of the WRIM to a threshold; label the element with an indication that the host platform should not occupy the element based on determining that the one or more data attributes associated with a momentum exchange of the element satisfies the threshold; and label the element with an indication that the host platform can occupy the element based on determining that the one or more data attributes associated with a momentum exchange of the element does not satisfy the threshold.

Clause 36: The computer program product of any of clauses 31-35, wherein each element of the plurality of elements comprises: one or more data attributes associated with a momentum exchange resulting from the host platform co-occupying the element with an entity; one or more data attributes associated with boundaries, constraints, and/or rules of an environment of the host platform for the element; one or more data attributes associated with a metric of uncertainty of the host platform for the element; and wherein the one or more instructions further cause the at least one processor to: identify an Reasonable Operating Envelope (ROE) based on the data attributes of each element of the WRIM; wherein the one or more instructions that cause the at least one processor to identify the ROE cause the at least one processor to: provide the one or more data attributes associated with a momentum exchange resulting from the host platform co-occupying the element with an entity as an input to a first machine learning model to generate an output that includes a prediction of a value of momentum exchange and an indication of whether the value of momentum exchange satisfies a first threshold; provide the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold; provide the one or more data attributes associated with a metric of uncertainty of the host platform for the element as an input to a third machine learning model to generate an output that includes a prediction of a value of uncertainty and an indication of whether the value of uncertainty satisfies a third threshold; label the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and label the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold.

Clause 37: The computer program product of any of clauses 31-36, wherein the one or more instructions further cause the at least one processor to: receive data associated with a path of a second host platform, wherein the path comprises a plurality of elements that were occupied by the second host platform during a sequence of executed actuator commands; and compare the data associated with the path of the second host platform to the ROE; wherein the one or more instructions that cause the at least one processor to compare the data associated with the path of the second host platform along a second WRIM to the ROE cause the at least one processor to: compare a first element of the plurality of elements that were occupied by the second host platform during a sequence of executed actuator commands to an element of the ROE having a NO GO label, wherein the element of the ROE is in a nearest CDC band to the first element; and determine a CDC band margin between the first element of the plurality of elements and the element of the ROE having the NO GO label, wherein the CDC band margin is a number of CDC bands from the first element of the plurality of elements to the element of the ROE having the NO GO label.

Clause 38: The computer program product of any of clauses 31-37, wherein the one or more instructions further cause the at least one processor to: determine a pattern associated with CDC band margin for an operator of the second host platform; assign a rating to an identifier of an operator of the second host platform based on the pattern associated with CDC band margin for the operator; and determine a classification of risk of the operator based on the rating of the identifier of the operator.

Clause 39: The computer program product of any of clauses 31-38, wherein an output of a predicted momentum exchange machine learning model comprises the one or more data attributes associated with the predicted momentum exchange resulting from the host platform co-occupying the element with an entity, and wherein the one or more instructions further cause the at least one processor to: train the predicted momentum exchange machine learning model based on a training dataset associated with an actual momentum exchange resulting from the host platform co-occupying an element with an entity; validate the predicted momentum exchange machine learning model based on a validation dataset associated with an actual momentum exchange resulting from the host platform co-occupying an element with an entity; and use the predicted momentum exchange machine learning model to generate the one or more data attributes associated with a predicted momentum exchange resulting from the host platform co-occupying an element with an entity.

Clause 40: The computer program product of any of clauses 31-39, wherein the one or more instructions further cause the at least one processor to: train a threshold machine learning model based on a training dataset associated with an actual momentum exchange and a severity of outcome associated with an actual momentum exchange event resulting from the host platform co-occupying an element with an entity; validate the threshold machine learning model based on a validation dataset associated with an actual momentum exchange and a severity of outcome associated with the actual momentum exchange event resulting from the host platform co-occupying an element with an entity; and use the threshold machine learning model to generate a prediction and an indication of whether the prediction satisfies a threshold.

Clause 41: The computer program product of any of clauses 31-40, wherein the one or more instructions further cause the at least one processor to: determine a pattern associated with CDC band margin for an actual momentum exchange; generate a plurality of ranges of patterns of CDC band margins based on severity of outcome associated with a likelihood of momentum exchange event resulting from the host platform co-occupying an element with an entity, wherein each range of patterns of CDC band margins is associated with a classification of risk; determine a pattern associated with CDC band margin of the operator; determine a range of the plurality of ranges of patterns of CDC band margins for the operator based on the pattern associated with CDC band margin of an operator of a host platform; and determine a classification of risk of the operator based on the range.

Clause 42: The computer program product of any of clauses 31-41, wherein each element of the plurality of elements comprises a plurality of data attributes, wherein the plurality of data attributes comprise: one or more data attributes associated with a momentum exchange resulting from the host platform co-occupying the element with an entity; one or more data attributes associated with boundaries, constraints, and/or rules of an environment of the host platform for the element; and one or more data attributes associated with a metric of uncertainty of the host platform for the element, and wherein the one or more instructions further cause the at least one processor to: identify an Reasonable Operating Envelope (ROE) based on the plurality of data attributes of each element of the WRIM; and perform an action based on the ROE.

Clause 43: The computer program product of any of clauses 31-42, wherein the one or more instructions that cause the at least one processor to perform the action based on the ROE cause the at least one processor to: identify a plurality of command strings that converge on an element that corresponds to a goal, wherein each command string comprises a plurality of elements that are linked, the plurality of elements include a first element that corresponds to an initial position of the host platform and a final element that corresponds to the goal; and select a command string from the plurality of command strings based on one or more parameters associated with the command string.

Clause 44: The computer program product of any of clauses 31-43, wherein the one or more instructions that cause the at least one processor to perform the action based on the ROE cause the at least one processor to: issue an actuator command to the host platform based on the command string.

Clause 45: The computer program product of any of clauses 31-44, wherein the one or more instructions further cause the at least one processor to: receive an input from a user associated with a strategic level goal on a geospatial map, generate a placeholder element for the strategic level goal based on the strategic level goal, wherein the placeholder element for the strategic level goal comprises criteria associated with velocity and acceleration of the host platform at the placeholder element; determine an operational level goal based on the strategic level goal; generate a placeholder element for the operational level goal based on the operational level goal, wherein the placeholder element for the operational level goal comprises criteria associated with velocity and acceleration of the host platform at the placeholder element; and determine a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 3 is a flowchart of a non-limiting embodiment of a process for constructing a WRIM for the autonomous control of dynamical systems according to the principles of the presently disclosed subject matter;

FIGS. 4A-4G are diagrams of non-limiting embodiments of devices and/or systems according to the principles of the presently disclosed subject matter;

FIGS. 5A-5E are illustrations of non-limiting embodiments of implementations according to the principles of the presently disclosed subject matter;

FIGS. 6A-6B are illustrations of non-limiting embodiments of implementations according to the principles of the presently disclosed subject matter;

FIGS. 7A-7B diagrams of non-limiting embodiments of devices and/or systems according to the principles of the presently disclosed subject matter.

DESCRIPTION

Figure 1:
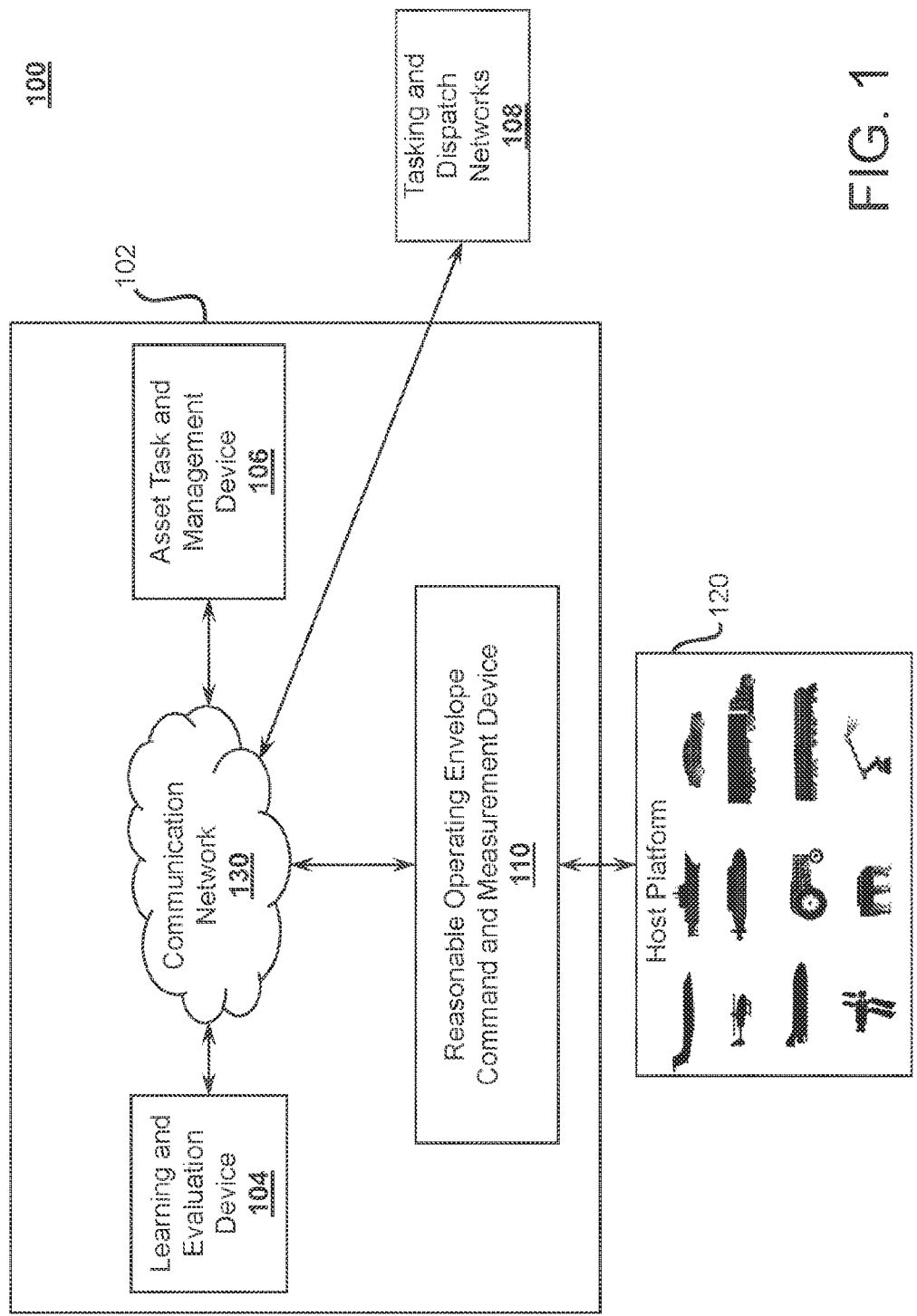
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one," Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Provided are improved systems, methods, and computer program products for constructing a reasonable operating envelope for the automated control of dynamical systems. In some non-limiting embodiments or aspects, systems, methods, and computer program products may include receiving data associated with a host platform; constructing a run-time dynamic envelope based on the data associated with the host platform, wherein constructing the run-time dynamic envelope comprises: constructing an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with an entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform; determining data associated with a state of the host platform based on data associated with a host platform; constructing an idealized dynamic envelope based on the initialization dynamic envelope, the data associated with a state of the host platform, and data associated with a perception envelope; and constructing the run-time dynamic envelope based on the idealized dynamic envelope; and constructing a Worldview Relational Interaction Map (WRIM) based on the run-time dynamic envelope, wherein the WRIM comprises a coordinate system corresponding to an area (e.g., a volume associated with the area) of an environment of the host platform, wherein the coordinate system comprises a plurality of elements, and wherein each element of the plurality of elements comprises: one or more data attributes associated with a predicted momentum exchange resulting from the host platform co-occupying the element with an entity.

In some non-limiting embodiments or aspects, each element of the plurality of elements may include a plurality of data attributes. The plurality of data attributes may include one or more data attributes associated with a momentum exchange resulting from the host platform co-occupying the element with an entity; one or more data attributes associated with boundaries, constraints, and/or rules of an environment of the host platform for the element; and/or one or more data attributes associated with a metric of uncertainty of the host platform for the element.

In some non-limiting embodiments or aspects, systems, methods, and computer program products may include identifying a Reasonable Operating Envelope (ROE) based on the plurality of data attributes of each element of the WRIM; and performing an action based on the ROE.

In some non-limiting embodiments or aspects, when performing the action based on the ROE, systems, methods, and computer program products may include identifying a plurality of command strings that converge on an element that corresponds to a goal. Each command string may include a plurality of elements that are linked. The plurality of elements may include a first element that corresponds to an initial position of the host platform and a final element that corresponds to the goal. In some non-limiting embodiments or aspects, systems, methods, and computer program products may include selecting a command string from the plurality of command strings based on one or more parameters associated with the command string.

In some non-limiting embodiments or aspects, systems, methods, and computer program products may include, when performing the action based on the ROE, issuing an actuator command to the host platform based on the command string.

By virtue of the implementation of systems, methods, and computer program products described herein, computing devices of self-driving vehicles may be configured to transmit control signals to cause the self-driving vehicles to adjust navigation based on context derived from data associated with the one or more measurements from the one or more sensors included in the self-driving vehicle. For example, the computing device may be configured to determine that one or more other vehicles are moving relative to the self-driving vehicle and, in turn, the computing device may be configured to transmit control signals to a braking assembly of the self-driving vehicle to cause the self-driving vehicle to slow down or speed up (e.g., instead of stopping) based on the rate of speed of the one or more other vehicles. As a result, the one or more computing devices may cause the self-driving vehicle to navigate more accurately (e.g., to slow down instead of stopping and/or the like). Further, resources associated with navigating the self-driving vehicle (e.g., brake pads and/or the like) as well as energy used by the self-driving vehicle when navigating may be conserved based on the computing device causing the self-driving vehicle to navigate more accurately.

For the purpose of illustration, in the following description, while the presently disclosed subject matter is described with respect to methods, systems, and computer program products for constructing a reasonable operating envelope, e.g., for the automated control of dynamical systems, one skilled in the art will recognize that the disclosed subject matter is not limited to the illustrative embodiments. For example, the methods, systems, and computer program products described herein may be used with a wide variety of settings, such as constructing a reasonable operating envelope in any setting suitable for using such reasonable operating envelopes, e.g., evaluating safe conduct by and/or rating (e.g., an insurance worthiness) of an operator of a dynamical system, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes reasonable operating envelope (ROE) system 102, learning and evaluation system 104, asset task and management system 106, tasking and dispatch networks 108, ROE command and measurement device 110, host platform 120, and network 130.

ROE management system 102 may include one or more devices capable of receiving information from and/or communicating information to learning and evaluation system 104, asset task and management system 106, tasking and dispatch networks 108, ROE command and measurement device 110, host platform 120, and/or the like (e.g., via network 130 and/or the like). For example, ROE management system 102 may include a computing device, such as a server, a group of servers, and/or other like devices. In some non-limiting embodiments, ROE management system 102 may be in communication with a data storage device, which may be local or remote to ROE management system 102. In some non-limiting embodiments, ROE management system 102 may be capable of receiving information from, storing information in, communicating information to, or searching information stored in the data storage device. In some non-limiting embodiments, ROE management system 102 may include at least one of learning and evaluation system 104, asset task and management system 106, ROE command and measurement device 110, and/or any combination thereof.

Learning and evaluation system 104 may include one or more devices capable of receiving information from and/or communicating information to ROE management system 102, asset task and management system 106, tasking and dispatch networks 108, ROE command and measurement device 110, host platform 120, and/or the like (e.g., via network 130 and/or the like). For example, learning and evaluation system 104 may include a computing device, such as a server, a group of servers, and/or other like devices. In some non-limiting embodiments, learning and evaluation system 104 may be in communication with a data storage device, which may be local or remote to learning and evaluation system 104. In some non-limiting embodiments, learning and evaluation system 104 may be capable of receiving information from, storing information in, communicating information to, or searching information stored in the data storage device. In some non-limiting embodiments, learning and evaluation system 104 may be included in and/or implemented by (e.g., completely, partially, and/or the like) ROE management system 102.

Asset task and management system 106 may include one or more devices capable of receiving information from and/or communicating information to ROE management system 102, learning and evaluation system 104, tasking and dispatch networks 108, ROE command and measurement device 110, host platform 120, and/or the like (e.g., via network 130 and/or the like). For example, asset task and management system 106 may include a computing device, such as a server, a group of servers, and/or other like devices. In some non-limiting embodiments, asset task and management system 106 may be in communication with a data storage device, which may be local or remote to asset task and management system 106. In some non-limiting embodiments, asset task and management system 106 may be capable of receiving information from, storing information in, communicating information to, or searching information stored in the data storage device. In some non-limiting embodiments, asset task and management system 106 may be included in and/or implemented by (e.g., completely, partially, and/or the like) ROE management system 102.

Tasking and dispatch networks 108 may include one or more devices capable of receiving information from and/or communicating information to ROE management system 102, learning and evaluation system 104, asset task and management system 106, ROE command and measurement device 110, host platform 120, and/or the like (e.g., via network 130 and/or the like). For example, tasking and dispatch networks 108 may include a computing device, such as a server, a group of servers, and/or other like devices. In some non-limiting embodiments, tasking and dispatch networks 108 may be in communication with a data storage device, which may be local or remote to tasking and dispatch networks 108. In some non-limiting embodiments, tasking and dispatch networks 108 may be capable of receiving information from, storing information in, communicating information to, or searching information stored in the data storage device.

ROE command and measurement device 110 may include one or more devices capable of receiving information from and/or communicating information to ROE management system 102, learning and evaluation system 104, asset task and management system 106, tasking and dispatch networks 108, host platform 120, and/or the like (e.g., via network 130 and/or the like). For example, ROE command and measurement device 110 may include a computing device, such as a computer, a group of computers, an embedded computer (e.g., embedded in host platform 120 and/or the like), a portable computer, a laptop computer, a tablet computer, a mobile device, a cellular phone, a server, a group of servers, and/or other like devices. In some non-limiting embodiments, ROE command and measurement device 110 may be in communication with a data storage device, which may be local or remote to ROE command and measurement device 110. In some non-limiting embodiments, ROE command and measurement device 110 may be capable of receiving information from, storing information in, communicating information to, or searching information stored in the data storage device. In some non-limiting embodiments, ROE command and measurement device 110 may be included in and/or implemented by (e.g., completely, partially, and/or the like) ROE management system 102. In some non-limiting embodiments, ROE command and measurement device 110 may be included in and/or implemented by (e.g., completely, partially, and/or the like) host platform 120. In some non-limiting embodiments, ROE command and measurement device 110 may or may not be capable of receiving information (e.g., from host platform 120, from another ROE command and measurement device 110, and/or the like) via a short-range wireless communication connection (e.g., an NFC communication connection, an RFID communication connection, a Bluetooth® communication connection, a Zigbee® communication connection, and/or the like), and/or communicating information (e.g., to host platform 120, to another ROE command and measurement device 110, and/or the like) via a short-range wireless communication connection.

Host platform 120 may include one or more devices capable of receiving information from and/or communicating information to ROE management system 102, learning and evaluation system 104, asset task and management system 106, tasking and dispatch networks 108, ROE command and measurement device 110, and/or the like (e.g., via network 130 and/or the like). For example, host platform 120 may include a computing device, such as a computer, a group of computers, an embedded computer, a portable computer, a laptop computer, a tablet computer, a mobile device, a cellular phone, a server, a group of servers, and/or other like devices. In some non-limiting embodiments, host platform 120 may be in communication with a data storage device, which may be local or remote to host platform 120. In some non-limiting embodiments, host platform 120 may be capable of receiving information from, storing information in, communicating information to, or searching information stored in the data storage device. In some non-limiting embodiments, host platform 120 may include and/or implement (e.g., completely, partially, and/or the like) ROE command and measurement device 110. In some non-limiting embodiments, host platform 120 may or may not be capable of receiving information (e.g., from ROE command and measurement device 110 and/or the like) via a short-range wireless communication connection (e.g., an NFC communication connection, an RFID communication connection, a Bluetooth® communication connection, a Zigbee® communication connection, and/or the like), and/or communicating information (e.g., to ROE command and measurement device 110 and/or the like) via a short-range wireless communication connection. In some non-limiting embodiments, host platform 120 may include a vehicle, such as an automobile (e.g., a car, a truck, and/or the like), an aircraft (e.g., airplane, drone aircraft, and/or the like), a boat, a submarine, a helicopter, a spacecraft (e.g., rocket ship, space shuttle, and/or the like), a tractor, a rail vehicle (e.g., a train and/or the like), a satellite, a robot (e.g., walking robot, wheeled robot, industrial robot, and/or the like), and/or the like.

Network 130 may include one or more wired and/or wireless networks. For example, network 130 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with ROE management system 102), an ad hoc network, an intranet, the Internet, a fiber optic-based network, a cloud computing network, and/or the like, and/or a combination of these or other types of networks.

In some non-limiting embodiments, ROE management system 102 may include by one or more of learning and evaluation system 104, asset task and management system 106, at least one ROE command and measurement device 110 (e.g., for constructing a ROE, as described herein), any combination thereof, and/or the like. Additionally or alternatively, ROE command and measurement device 110 may be onboard (e.g., embedded in, directly connected to, and/or the like) host platform 120.

In some non-limiting embodiments, ROE command and measurement device 110 and/or host platform 120 may include (e.g., be equipped with, connected to, and/or the like) sensors to perceive the operating environment and/or actuators to affect dynamic action, as described herein. Additionally or alternatively, ROE command and measurement device 110 may perform command and measurement operations, as described herein. For example, such operations may include any one of sensor data acquisition of the operating environment, data acquisition of the host platform 120, sensory data fusion and normalization, host platform dynamics normalization, worldview generation, predicted ROE generation, command(s), reconciliation and measurement, any combination thereof, and/or the like, as described herein.

In some non-limiting embodiments, learning and evaluation system 104 purposes may perform processes including at least one of ingesting log and simulation data; structuring and maintaining a data corpus for training and testing purposes; training and/or conduct model learning development; evaluating, validating, verifying the procedure-model layers set and module(s) used for command and measurement of host platform 120; analyzing performance and/or capability measurements and/or attributing these to various factors; determining criteria thresholds for ROE generation; managing the software and/or configuration releases used for development, testing, and/or production; hosting one or more virtualized instances of ROE command and measurement device 110 (e.g., for performing model training, evaluation, simulation, command and measurement operations, and/or the like), any combination thereof, and/or the like, as described herein.

In some non-limiting embodiments, asset task and management system 106 may perform processes including at least one of maintaining and/or managing status of assets (e.g., ROE command and measurement devices 110), generating tasks for and/or dispatching assets; maintaining communication connectivity with one or more assets (e.g., via network 130); monitoring the status and conditions of occupants and/or items in assets; coordinating and/or scheduling tasking of one or more assets; generating optimized and/or coordinated task routing and navigation guidance; running preventative and/or detective controls to ensure assets operate with equipment, software releases, and/or configuration approved for and/or compatible with the operating domains; interface with third-party networks (e.g., other tasking and dispatch networks 108) for asset tasking, any combination thereof; and/or the like; as described herein.

The number and arrangement of systems, devices, and/or networks shown in FIG. 1 are provided as an example. There may be additional systems, devices, and/or networks; fewer systems; devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
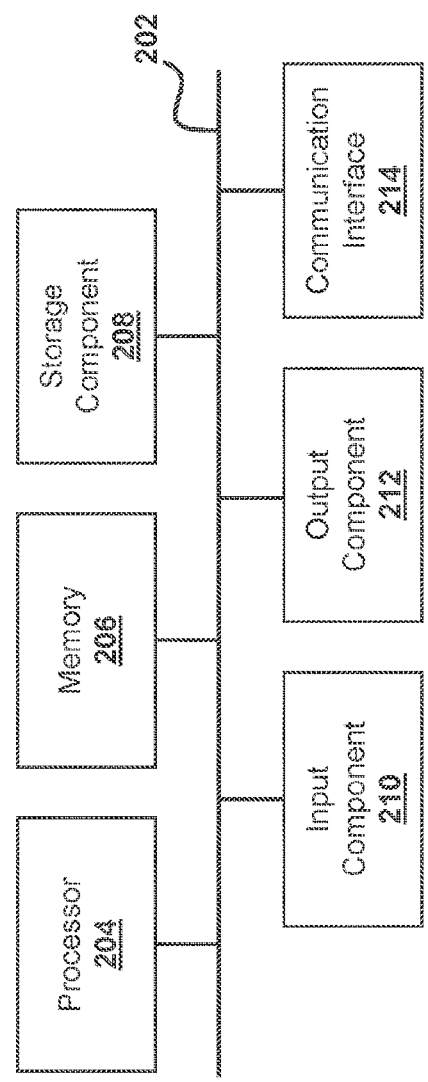
FIG. 2 is a diagram of a non-limiting embodiment of components of one or more devices and/or systems of FIG. 1.

Referring now to FIG. 2, FIG. 2 is a diagram of example components of a device 200. Device 200 may correspond to one or more devices of ROE management system 102, such as one or more devices of learning and evaluation device 104, asset task and management device 106, or reasonable operating envelope command and measurement device 110, and/or one or more devices of tasking and dispatch networks 108. In some non-limiting embodiments, each of learning and evaluation device 104, asset task and management device 106; tasking and dispatch networks 108; or reasonable operating envelope command and measurement device 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, FIG. 3 is a flowchart of a non-limiting embodiment of a process 300 for evaluation and automated control of a dynamical system. In some non-limiting embodiments, one or more of the steps of process 300 may be performed (e.g., completely, partially, and/or the like) by ROE management system 102 (e.g., one or more devices of ROE management system 102). In some non-limiting embodiments, one or more of the steps of process 300 may be performed (e.g., completely, partially, and/or the like) by another system, another device, another group of systems, or another group of devices, separate from or including ROE management system 102, such as learning and evaluation system 104, asset task management system 106, and/or tasking and dispatch system 108.

As shown in FIG. 3, at step 302, process 300 may include receiving data associated with a host platform. For example, ROE management system 102 may receive data associated with a host platform. In some non-limiting embodiments, the data associated with the host platform may include data associated with an environment of a host platform and/or data associated with a state (e.g., a dynamic state) of the host platform. The data associated with the environment of the host platform (e.g., the environment in which the host platform is operating) may include data associated with temperature of the environment, pressure of the environment, images of the environment, position of the host platform within the environment, position of objects or actors within the environment, a medium in the environment over or through which the host platform is travelling (e.g., a road, air, water, etc.). Additionally or alternatively, the data associated with the environment of the host platform may include data associated with one or more objects in the environment and/or data associated with one or more actors in the environment. An object may include an entity that is stationary (e.g., an entity that does not have direct control over the entity's dynamic state, such as a position of the entity) or that does not change dynamic states (e.g., move) in an intelligent fashion. Examples of objects may include a solid barrier, a light pole, a traffic indicator that provides informational states to communicate directions of travel, and/or the like. An actor may include an entity that possesses direct control or directly linked control of the entity's dynamic action. An actor may control or affect a dynamic state of an object and/or another actor. Examples of actors may include living beings (e.g., human beings, animals), vehicles, robots, and/or the like. In some non-limiting embodiments, a medium on which a host platform will interact may be an object or an actor. For example, the medium on which a road going vehicle will interact is a roadway and the roadway may be an object. In another example, the medium on which a watercraft will interact is a volume of water and the volume of water is an object.

In some non-limiting embodiments, the data associated with the state of the host platform may include data associated with a position, a velocity, an acceleration, and/or the like, of the host platform. Additionally or alternatively, data associated with the state of the host platform may include data associated with state response (e.g., a change of position, a velocity, an acceleration, etc.) of the host platform. Additionally or alternatively, data associated with the state of the host platform may include data associated with a state of control system of the host platform. For example, data associated with the state of the host platform may include data associated with an actuator system of the host platform, such as a throttle system (e.g., an accelerator) of the host platform, a braking system (e.g., a hydraulic braking system, an electromagnetic braking system, etc.) of the host platform, a directional control system (e.g., a steering control system) of the host platform, and/or the like.

In some non-limiting embodiments, ROE management system 102 may receive the data associated with a host platform from sensors associated with the host platform. For example, ROE management system 102 may receive the data associated with a host platform from one or more sensors on (e.g., mounted on) the host platform. In some non-limiting embodiments, a sensor may include an image sensor (e.g., a camera, a lidar system, a radar system, etc.), a proximity sensor, an inertial measurement sensor, an acoustic sensor (e.g., an acoustic transducer, an acoustic wave sensor, a sound detector, such as a microphone, etc.), a pressure sensor, a fluid flow sensor, an altimeter, a position sensor, a transponder for location or position, a compass, a global positioning system (GPS) sensor, and/or the like. Additionally or alternatively, a sensor may include an encoder on the host platform. For example, the sensor may include an encoder on the host platform to sense characteristics (e.g., rotations) of a wheel, characteristics of a track, characteristics of a steering mechanism, characteristics of an accelerator, and/or the like. Additionally or alternatively, a sensor may be associated with a pneumatic component, a hydraulic component, and/or the like of a host platform. Additionally or alternatively, a sensor may include a sensor that measures power, current, and/or voltage associated with an electrical component of a host platform. In some non-limiting embodiments, an electrical component may include an electric motor, a circuit, a circuit component (e.g., a resistor, a capacitor, an inductor, a diode, etc.), and/or the like.

In some non-limiting embodiments, ROE management system 102 may receive the data associated with a host platform from components of the host system. For example, ROE management system 102 may receive the data associated with the host platform from a bus system (e.g., an internal communications network) of the host system. In some non-limiting embodiments, the bus system may include a vehicle bus, such as a controller area network (CAN) bus.

In some non-limiting embodiments, a host platform may include a machine that is movable based on power received from a power source and that is remote controlled, semi-autonomous, or autonomous. In some non-limiting embodiments, a host platform may include a vehicle, a robot, (e.g., industrial robots, mobile robots, service robots, etc.), or combination of a vehicle and a robot. In some non-limiting embodiments, a vehicle may include an on-road vehicle, such as an automobile (e.g., a car, a truck, etc.), a tractor trailer, a delivery truck, and/or the like, or an off-road vehicle, such as a farm tractor, an all-terrain vehicle, a tracked vehicle (e.g., a tank), an articulated and/or segmented locomotive vehicle (e.g. a bipedal robot) and/or the like. In some non-limiting embodiments, a vehicle may include an aircraft (e.g., an airplane, a helicopter, an airship, etc.), a watercraft (e.g., a boat, ship, a submarine, etc.), a railway vehicle (e.g., a train, a locomotive, multiple unit train, etc.), a spacecraft, and/or the like. In some non-limiting embodiments, a vehicle may include a segmented and/or articulated arms (e.g. industrial material handling robot).

As shown in FIG. 3, at step 304, process 300 may include constructing a run-time dynamic envelope for the host platform. For example, ROE management system 102 may construct the run-time dynamic envelope for the host platform based on data associated with the host platform. In some non-limiting embodiments, the run-time dynamic envelope may include a plurality of elements that spatially divide an area (e.g., a two dimensional area or a three dimensional area) associated with an environment of the host platform and each element represents a dimension in space of the area associated with the environment such that each element may have a spatial relationship with other elements within the run-time dynamic envelope. In some non-limiting embodiments, an element may represent an amount of area based on an attribute of the host platform. For example, the element may have a geometry (e.g., size and shape) that is associated with a velocity of the host platform. In some non-limiting embodiments, a first element may have a geometry that includes a size (e.g., a size based on an area of an element) that is smaller than a size of a geometry of a second element, where the first element is associated with a first velocity of the host platform and the second element is associated with a second velocity of the host platform. The size of the first element may be smaller than the size of the second element based on the first velocity being less than the second velocity. In some non-limiting embodiments, the area that constitutes the run-time dynamic envelope may contain a plurality of pixels and each element of the run-time dynamic envelope may be represented by a pixel.

In some non-limiting embodiments, ROE management system 102 may construct a run-time dynamic envelope based on a perception envelope. For example, ROE management system 102 may generate the perception envelope based on data associated with the environment of the host platform and ROE management system 102 may construct the dynamic envelope based on the perception envelope. In some non-limiting embodiments, the perception envelope includes a representation of perceptible aspects (e.g., all perceptible aspects) of an environment (e.g., an environment in which the host platform is operating) that may be perceived (e.g., sensed and classified) by ROE management system 102 based on sensors associated with the host platform. Examples of perceptible aspects of the environment may include street signs, lane markings, crosswalks, barriers, individuals (e.g., a human being), and/or the like within or near a roadway upon which the host platform is traveling. In some non-limiting embodiments, a perception envelope may include a representation of a field of view of what an operator (e.g., a hypothetical operator) of a host platform can and cannot observe in the environment of the host platform. For example, the perception envelope may include a representation of an individual that is positioned behind a barrier such that the individual is not able to be observed by the operator of the host platform.

In some non-limiting embodiments, ROE management system 102 may generate a perception envelope based on data associated with perception of an environment of a host platform. In one example, ROE management system 102 may receive data associated with the environment of the host platform from sensors associated with the host platform. ROE management system 102 may generate data associated with perception of the environment based on the data received from the sensors and ROE management system 102 may generate the perception envelope based on the data associated with perception of the environment. In some non-limiting embodiments, ROE management system 102 may generate the data associated with perception of the environment based on data associated with images of the environment. For example, ROE management system 102 may identify the aspects of the roadway upon which the host platform is traveling and the surrounding area based on data associated with images of the roadway and the surrounding area.

In some non-limiting embodiments, ROE management system 102 may generate a perception envelope based on data associated with the environment of the host platform. For example, ROE management system 102 may receive data associated with the environment of the host platform and ROE management system 102 may process the data to generate a fused environmental dataset. In some non-limiting embodiments, ROE management system 102 may normalize the data associated with the environment of the host platform to generate the fused environmental dataset. For example, ROE management system 102 may align, adjust, synchronize (e.g., synchronize time of arrival), and/or structure data formats of the data associated with the environment of the host platform and ROE management system 102 may use the normalized data to provide the fused environmental dataset. In some non-limiting embodiments, ROE management system 102 may normalize the data associated with the environment of the host platform by structuring a plurality of data formats from different types of sensors and/or sensors from different manufacturers into a common data format to be used by ROE management system 102. In the example above, ROE management system 102 may generate the perception envelope based on the fused environmental sensor dataset and ROE management system 102 may generate the dynamic envelope based on the perception envelope.

In some non-limiting embodiments, ROE management system 102 may align, adjust, synchronize (e.g., synchronize time of arrival), and/or structure the data associated with the environment of the host platform to generate a fused environmental dataset. For example, ROE management system 102 may combine (e.g., stich) images of an environment of the host platform by establishing overlapping elements of the images and placing the images together accordingly to generate the fused environmental dataset.

In some non-limiting embodiments, ROE management system 102 may control one or more sensors to capture data associated with the environment of a host platform and data associated with a state of the host platform. For example, ROE management system 102 may control the one or more sensors to rotate, zoom, focus, and/or slew to capture data associated with the environment of a host platform and data associated with a state of the host platform.

In some non-limiting embodiments, each element of a run-time dynamic envelope may include a plurality of data attributes. One or more data attributes of the plurality of data attributes may be based on operations (e.g., operations that result in dynamic actions) that may be performed by the host platform during one or more command decision cycles (CDCs) and/or objects and actors in an environment of the host platform. In some non-limiting embodiments, a CDC may include an amount of time required for (e.g., that is elapsed when) ROE management system 102 to receive an input (e.g., an input associated with a state of the host platform and/or a state of the environment of the host platform), to make a determination associated with a command (e.g., a command of an actuator command set), to issue a command to the host platform, and for the host platform to execute the command. In some non-limiting embodiments, a spatial relationship between a first element within the dynamic envelope and a second element adjacent (e.g., linked to) the first element within the dynamic envelope may be represented such that a host platform may move from the first element to the second element during a CDC.

In some non-limiting embodiments, one or more data attributes of the plurality of data attributes may based on a predetermined response in perception of a host platform. In some non-limiting embodiments, the predetermined response in perception of a host platform is based on an output of a machine learning model associated with a predicted transformation of perception and the output is associated with a predicted transformation of perception at all positions of the host platform relative to a first position of the host platform after executing an actuator command. The predicted transformation of perception is based on a notional entity (e.g., a hypothetical entity positioned at an element) as a reference point that is perceived by the host platform in a field of view of the host platform. The predicted transformation of perception may be based on a perceived state of an entity according to a position of the host platform. For example, as an entity is positioned closer to the host platform, the entity may appear (e.g., be perceived to be) larger and that as the entity is positioned farther from the host platform, the entity may appear smaller. Additionally, the entity may have a first appearance if positioned near a first side of the host platform, and the entity may have a second appearance if positioned near a second side of the host platform.

In some non-limiting embodiments, a CDC may be associated with a single command. For example, each CDC may be associated with a single command that is determined by ROE management system 102 to be issued to a host platform, that is to be issued to the host platform, and/or that is to be executed by the host platform. In some non-limiting embodiments, ROE management system 102 may select a command from an actuator command set or an available actuator command set. In some non-limiting embodiments, an actuator command set may include actuator commands, which are a set of inputs (e.g., a set of input commands, etc.) that can be issued to and/or executed by an actuator system of a host platform during a CDC. An input may cause an actuator system of the host platform to actuate, for example, by executing an actuator event (e.g., applying an increment of power to a throttle system, applying an increment of power to a directional control system, applying an increment of power to braking system, etc.) or an input may cause an actuator system of the host platform to forego actuation, for example, by not executing an actuator event (e.g., forego applying an increment of power to a throttle system, forego applying an increment of power to a directional control system, forego applying an increment of power to a braking system, etc.). In some non-limiting embodiments, the set of inputs may include all dynamic degrees of freedom that can be actuated (e.g., actuated in increments) by an actuator system of a host platform within a CDC. For example, the set of inputs may include an input for actuation of a throttle system of the host platform, an input for actuation of a braking system of the host platform, and/or an input for actuation of a directional control system of the host platform. In some non-limiting embodiments, a plurality of inputs may be actuated by one or more actuator systems of the host platform within a CDC (e.g., a single CDC). For example, a braking system of the host platform and a directional control system of the host platform may be actuated based on respective inputs during the same CDC.

In some non-limiting embodiments, an available actuator command set may include a set of inputs that can be issued to and/or executed by an actuator system of a host platform during a CDC based on a state (e.g., a current state) of a host platform. In some non-limiting embodiments, the available actuator command set may include available actuator commands, which is a subset of a set of inputs that make up an actuator command set. In some non-limiting embodiments, an input of the set of inputs that make up the actuator command set may be unavailable based on a state of the host platform. In such an example, an actuator system of the host platform may be at a maximum position in a first direction, such as a steering mechanism of a vehicle that is turned as far as possible to a right or left position, that prevents further actuation in the first direction.

In some non-limiting embodiments, ROE management system 102 may construct a dynamic envelope based on a plurality of CDC bands (e.g., 10 CDC bands, 100 CDC bands, 1000 CDC bands, etc.). In some non-limiting embodiments, a CDC band may include a group of elements that are selected by ROE management system 102 based on actuator commands. For example, a CDC band may include a group of elements that are selected based on the host platform executing an actuator command to move from occupying a first element to occupying a second element. The CDC band may include the group of elements (e.g., the group of all potential second elements) to which the host platform may occupy based on executing each actuator command of a set of actuator commands. A CDC band may be associated with an implied time interval. For example, a CDC band may be include an implied amount of time (e.g., an elapsed time associated with a CDC) that is based on an amount of time it takes for a host platform occupying a first element to occupy a second element (e.g., to move from a first element to a second element).

In some non-limiting embodiments, ROE management system 102 may construct the dynamic envelope by selecting an element from a first CDC band that is linked to an initial element (e.g., an initial element that represents a first position of the host platform) based on an actuator command. For example, ROE management system 102 may construct the dynamic envelope by selecting the element from the first CDC band that is linked to the initial element based on the host platform occupying the element of the first CDC band after executing an actuator command that would move the host platform from the initial element to the element of the first CDC band. ROE management system 102 may repeat this process by selecting an element from a second CDC band that is linked to the element of the first CDC band based on an actuator command (e.g., a same actuator command or a different actuator command) for a number of CDC bands as appropriate.

In some non-limiting embodiments, ROE management system 102 may construct the dynamic envelope based on a first element (e.g., an initial element) of a first CDC band that may be linked to a second element (e.g., a successive element that is adjacent the first element) of a second CDC band based on a host platform executing a first actuator command to move from occupying the first element to occupying the second element (e.g., according to an actuation event associated with the first actuator command). A third element of a third CDC band may be linked to the second element of the second CDC band based on the host platform executing a second actuator command to move from occupying the second element to occupying the third element (according to an actuation event associated with the second actuator command). A final element of a final CDC band may be linked to a prior element of a prior CDC band based on the host platform executing an actuator command to move from occupying the prior element to occupying the final element (according to an actuation event associated with the actuator command).

In some non-limiting embodiments, ROE management system 102 may construct the dynamic envelope based on a plurality of strings of linked elements. For example, ROE management system 102 may construct the dynamic envelope based on the plurality of strings of elements, where each element in a string of linked elements are linked according to successive actuator commands. In such an example, ROE management system 102 may select a first element of a string of linked elements from a first CDC band based on an actuator command, ROE management system 102 may select a second element of the string of linked elements from a second CDC band (e.g., the second element is adjacent the first element based on position) and ROE management system 102 may select a third element of the string of elements from a third CDC band. The first element and the second element of the string of elements are linked based on an actuator command that, when executed by the host platform, would cause the host platform to move from occupying the first element to occupying the second element. The second element and the third element of the string of elements are linked based on an actuator command that, when executed by the host platform, would cause the host platform to move from occupying the second element to occupying the third element. In such an example, every element, except a final element, of a CDC band is linked to a successive element based on predicting dimensional relations of states of a host platform according to position, velocity, and/or acceleration for adjacent elements that result from an actuator command that is executed by the host platform during a CDC (e.g., a time-forward CDC). In some non-limiting embodiments, a string of linked elements may include a number of elements as appropriate, such as, for example, 10 elements, 100 elements, 1000 elements, and/or the like.

In some non-limiting embodiments, ROE management system 102 may determine a CDC band based on an initial element (e.g., an initial element that corresponds to an initial position of a host platform). For example, ROE management system 102 may determine the initial element of the CDC band and ROE management system 102 may determine a successive element of the CDC band based on the initial element. ROE management system 102 may determine each successive element of the CDC band based on each prior element up to a final element that is determined by ROE management system 102 based on a number of elements in a CDC band. In some non-limiting embodiments, ROE management system 102 may determine a CDC band based on a goal (e.g., a final element that corresponds to a position of a goal in the environment of the host platform). For example, ROE management system 102 may determine the initial element of the CDC band and ROE management system 102 may determine a successive element of the CDC band based on the initial element. ROE management system 102 may determine each successive element of the CDC band based on each prior element up to a final element that is determined by ROE management system 102 based on a position of the goal in the environment of the host platform.

In some non-limiting embodiments, ROE management system 102 may generate a plurality of strings of linked elements of a dynamic envelope based on a position of a host platform. For example, ROE management system 102 may generate a first string of linked elements by determining elements that correspond to positions of the host platform based on successive actuator commands of an actuator command set. In such an example, ROE management system 102 may determine an initial position of the host platform (e.g., an initial element) of the first string of linked elements as a first element and determine a second element of the first string of linked elements based on the host platform moving from the first element to the second element according to a first actuator command of the actuator command set. ROE management system 102 may determine a group of other elements that are linked to the second element based on a position of the host platform as the host platform moves to occupy other elements according to the first actuator command of the actuator command set. In some non-limiting embodiments, ROE management system 102 may start at the first element and determine a second element of the first string of linked elements based on the host platform moving from the first element to occupy the second element according to a second actuator command of the actuator command set. ROE management system 102 may determine a group of other elements that are linked to the second element based on a position of the host platform as it moves to other elements according to the second actuator command of the actuator command set. Additional strings of linked elements of the dynamic envelope may be determined in the same or similar fashion. In some non-limiting embodiments, ROE management system 102 may generate the dynamic envelope based on a plurality of CDC bands, where the plurality of strings of linked elements correspond to all possible positions of the host platform within an area of the environment (e.g., a number of dimensions corresponding to a number of data attributes of an element) that corresponds to the dynamic envelope. ROE management system 102 may generate the plurality of strings of linked elements based on all combinations of actuator commands in an actuator command set (e.g., an available actuator command set) that result in the host platform moving to occupy an element from occupying a previous element within the dynamic envelope. In some non-limiting embodiments, ROE management system 102 may generate each element of a string of linked elements such that each element has a geometry according to an actuator command that results in the host platform moving to occupy a successive element from a previous element.

In some non-limiting embodiments, ROE management system 102 may generate a plurality of strings of linked elements of a dynamic envelope based on a position of a host platform and data associated with the host platform using a neural network. For example, ROE management system 102 may determine a start of a string of linked elements as a first element and determine a second element of the string of linked elements based on the host platform moving from the first element to occupy the second element according to an actuator command of an actuator command set. In such an example, ROE management system 102 may use a neural network to determine the second element of the first CDC band that is adjacent (e.g., linked) to the first element. In some non-limiting embodiments, ROE management system 102 may provide data associated with a state of the host platform at the first element (e.g., criteria associated with position, velocity, and/or acceleration of the host platform at the first element, such as one or more data attributes of the host platform at the first element) and data associated with the actuator command as an input to the neural network and produce an output of the neural network that includes data associated with position, velocity, and/or acceleration of the host platform at the second element (e.g., with regard to a position of the first element). ROE management system 102 may determine a position and/or a geometry of the second element based on the output of the neural network (e.g., data associated with position, velocity, and/or acceleration of the host platform at the second element). In the example above, ROE management system 102 may determine a third element of the first CDC band based on the host platform moving from the second element to the third element according to another actuator command (e.g., the same actuator command or a different actuator command) of the actuator command set. ROE management system 102 may use the neural network to generate the third element of the first CDC band that is adjacent to the second element. In some non-limiting embodiments, ROE management system 102 may provide the data associated with the state of the host platform at the second element (e.g., position, velocity, and acceleration of the host platform at the second element) and data associated with the actuator command as an input to the neural network and produce an output that includes data associated with position, velocity, and/or acceleration of the host platform at the third element (e.g., with regard to a position of the second element). ROE management system 102 may determine a position and/or a geometry of the third element based on the output of the neural network (e.g., data associated with position, velocity, and/or acceleration of the host platform at the third element). ROE management system 102 may use the neural network to generate successive elements of the first CDC band that are adjacent to each prior element of the first CDC band in the same or similar fashion and ROE management system 102 may generate the other CDC bands of the plurality of CDC bands in the same or similar fashion. In some non-limiting embodiments, ROE management system 102 may provide data associated with a state of the host platform at an element (e.g., position, velocity, and acceleration of the host platform at the second element) as an input to the neural network independent of data associated with an actuator command as ROE management system 102 may not issue and the host platform may not execute an actuator command in all instances.

In some non-limiting embodiments, ROE management system 102 may determine data associated with a state of the host platform at an element. For example, ROE management system 102 may determine data associated with the state of the host platform at the element based on data associated with the state of the host platform received from one or more sensors (e.g., one or more sensors on the host platform). In some non-limiting embodiments, the data associated with the state of the host platform may include data associated with a measurement (e.g., an inertial measurement) of the host platform by a sensor and/or data associated with the state of the host platform (e.g., position, velocity, and acceleration of the host platform) in relation to a perception envelope (e.g., in relation to an entity, such as an object or an actor in a perception envelope). In some non-limiting embodiments, ROE management system 102 may determine the data associated with the state of the host platform in relation to the perception envelope based on an output from a neural network. For example, the data associated with the state of the host platform in relation to the perception envelope may include the output of a neural network (e.g., an Entity Extrinsic neural network), which may include a prediction of a characteristic of an entity that is directly measured (e.g., an extrinsic characteristic of an entity) by a sensor, based on the input to the neural network, which may include a measurement of the sensor. In some non-limiting embodiments, the output of the neural network may include a prediction of a characteristic of a dynamic interaction medium with which a host platform interacts. For example, the output of the neural network may include a prediction of a surface of a road upon which the host platform is traveling.

In another example, the data associated with the state of the host platform in relation to the perception envelope may include the output of a neural network (e.g., an Entity Intrinsic neural network), which may include a prediction of a characteristic of an entity that is indirectly measured (e.g., an intrinsic characteristic of an entity) by a sensor, based on the input to the neural network, which may include a current measurement of the sensor and/or a previous measurement of the sensor, and/or previous predictions associated with the characteristic of the entity. In some non-limiting embodiments, the output of the neural network may include a prediction of a characteristic that is not directly measured by sensors (e.g., sensors associated with the host platform) of an entity in a prediction envelope. For example, the output of the neural network may include a prediction of a mass, density, and/or deformation elasticity of the entity.

In another example, the data associated with the state of the host platform in relation to the perception envelope may include the output of a neural network (e.g., an Entity Intrinsic neural network), which may include a prediction of a characteristic associated with a boundary, constraint, and/or rule in the environment of the host platform, based on the input to the neural network, which may include a current measurement of the sensor and/or a previous measurement of the sensor. In some non-limiting embodiments, the output of the neural network may include a prediction of whether a boundary, constraint, and/or rule is present and/or a prediction of an identification of a boundary, constraint, and/or rule in the environment of the host platform. For example, the output of the neural network may include a prediction of whether lane markings are present on a road upon which the host platform is traveling and/or a prediction of the type of lane markings that may be present.

In some non-limiting embodiments, ROE management system 102 may determine a plurality of data attributes of an element of a dynamic envelope, where the plurality of data attributes are based on a state of the host platform at the element. In some non-limiting embodiments, the plurality of data attributes may include a data attribute associated with a predicted transformation of perception of the element based on the host platform at the element, a data attribute associated with boundaries, constraints, and/or rules of an environment of the host platform at the element, a data attribute associated with a metric of uncertainty of perception of the element based on the host platform at the element, and/or a data attribute associated with momentum exchange (e.g., momentum exchange that happens during a momentum exchange event within the element) between an entity (e.g., an object or an actor) and a host platform at the element. In some non-limiting embodiments, momentum exchange may include a relationship of probability that a host platform and an entity would occupy the element during a CDC, a mass of the host platform and a mass of the entity, a velocity of the host platform and a velocity of the entity, and/or an acceleration of the host platform and an acceleration of the entity.

A data attribute associated with the predicted transformation of perception of the element based on the host platform at the element may include an attribute associated with a predicted state of an entity (e.g., an object or an actor), which was perceived (e.g., sensed and classified) by ROE management system 102, if the host platform was to occupy that element (e.g., simultaneously occupy the element with the entity). In some non-limiting embodiments, an element may include data associated with a probability that the entity may be perceived at (e.g., perceived to occupy, perceived to be positioned in, etc.) the element of a dynamic envelope as the host platform occupies that element. In some non-limiting embodiments, the data associated with a probability that the entity may be perceived at the element may include a predetermined response in perception of the host platform to a dynamic action associated with an entity. In some non-limiting embodiments, the predetermined response in perception of the host platform is based on an output of a machine learning model associated with a predicted transformation of perception and the output is associated with a predicted transformation of perception at all positions of the host platform relative to a first position of the host platform after executing an actuator command. The predicted transformation of perception is based on a notional entity (e.g., a hypothetical entity positioned at an element) as a reference point that is perceived by the host platform in a field of view of the host platform. The predicted transformation of perception may be based on a perceived state of an entity according to a position of the host platform. For example, as an entity is positioned closer to the host platform, the entity may appear (e.g., be perceived to be) larger and that as the entity is positioned farther from the host platform, the entity may appear smaller. Additionally, the entity may have a first appearance if positioned near a first side of the host platform, and the entity may have a second appearance if positioned near a second side of the host platform.

A data attribute associated with boundaries, constraints, and/or rules of an environment of the host platform may include an attribute associated with prohibited or permitted operations of a host platform in the environment. For example, a data attribute associated with boundaries, constraints, and/or rules of the environment may include an indication that the host platform cannot move from a first element to a second element based on a characteristic of the environment. In some non-limiting embodiments, the characteristic may include a lane marking (e.g., a double solid line), a traffic indicator (e.g., a traffic light, a traffic sign, such as a stop sign, etc.) that prevents movement of the host platform from the first element to the second element based on a condition (e.g., a condition related to moving from the first element to the second element after a time period or after an entity (e.g., an object or an actor), such as a vehicle, has moved out of another element of the dynamic envelope). In some non-limiting embodiments, a data attribute associated with boundaries, constraints, and/or rules of the environment may be associated with a boundary, constraint, and/or rule imposed by a party independent of the operator of a host platform to synchronize, deconflict, provide right-of-way, to provide state guidance, and/or to provide a restriction to a dynamic envelope for a host platform that is otherwise unconstrained but to which the host platform should or must comply.

A data attribute associated with a metric of uncertainty of perception of the element based on the host platform at the element may include an attribute associated with a level of uncertainty (e.g., a level of surety, a surety level, etc.) of perception (e.g., identification and classification) of an entity (e.g., an object or an actor) associated with an element. In some non-limiting embodiments, ROE management system 102 may determine the data attribute associated with the metric of uncertainty of perception of the element based on a measure of quality of data received from a sensor, such as an amount of distortion, optical glare, and/or noise in data received from the sensor, obstructed or obfuscated volumes or depths occurring in a field of view where an entity (e.g., an object or actor) could reside but is not observed (e.g., perceived), initial perception of a new entity (e.g., a new object or a new actor not previously perceived) where a history of a behavior (e.g., a characteristic of one or more states, a characteristic of movement, a path of movement, etc.) of the entity has not been determined (e.g., is not present), and/or the like. In some non-limiting embodiments; the data attribute associated with the level of uncertainty may include one or more values pertaining to a dedicated purpose of an entity associated with an element, where the one or more values may include probabilities associated with the confidence in the probabilities and/or the uncertainty accompanying the probabilities.

A data attribute associated with momentum exchange between an entity (e.g., an object or an actor) and a host platform for the element may include an attribute associated with a probability (e.g., a probability distribution) that a momentum exchange event may happen between the entity and the host platform at the element during a CDC. In some non-limiting embodiments, ROE management system 102 may determine the data attribute associated with predicted momentum exchange of the host platform with regard to the entity associated with the element based on a machine learning model associated with a predicted transformation of perception. For example, the data attribute associated with predicted momentum exchange of the host platform with regard to the entity associated with the element may be based on an output of the machine learning model associated with a predicted transformation of perception, where an input to the machine learning model (e.g., that results in the output) includes data associated with a state of the host platform at the element and data associated with a state of an entity (e.g., an object or an actor) at the element.

In some non-limiting embodiments, ROE management system 102 may determine one or more data attributes of the plurality of data attributes based on an output from a neural network. For example, a data attribute may include the output of a neural network (e.g., a Momentum Exchange Determination neural network), which may include a prediction of a characteristic of an entity that is directly measured (e.g., an extrinsic characteristic of an entity) by a sensor, based on the input to the neural network, which may include a measurement of the sensor. In some non-limiting embodiments, the output of the neural network may include a prediction of a characteristic of an entity, such as spatial dimensions of the entity, a position, velocity, and/or acceleration of the entity, a behavior (e.g., a behavior associated with movement) of the entity, and/or the like. In one example, the output of the neural network may include a prediction associated with momentum exchange at an element.

In some non-limiting embodiments, ROE management system 102 may construct an initialization dynamic envelope that is used to construct a run-time dynamic envelope. For example, ROE management system 102 may construct the initialization dynamic envelope based on a set of actuator commands of the host platform, a response of the host platform to each actuator command of the set of actuator commands, and a predetermined response in perception of the host platform to a dynamic action associated with an entity. In some non-limiting embodiments, the initialization dynamic envelope may include a machine learning model associated with a predicted transformation of perception that provides an output that includes the predetermined response in perception of the host platform to a dynamic action associated with an entity. The output may be associated with a predicted transformation of perception at all positions of the host platform relative to a first position of the host platform after executing an actuator command. In addition, ROE management system 102 may determine the predicted transformation of perception based on a notional entity (e.g., a hypothetical entity placed at a position) as a reference point that is perceived by the host platform in a field of view of the host platform.

In some non-limiting embodiments, ROE management system 102 may construct an idealized dynamic envelope based on an initialization dynamic envelope and the idealized dynamic envelope is used to construct a run-time dynamic envelope. For example, ROE management system 102 may construct an idealized dynamic envelope based on an initialization dynamic envelope, data associated with a state of the host platform, and/or data associated with a perception envelope. In some non-limiting embodiments, the idealized dynamic envelope may include a plurality of data attributes based on a state of the host platform at the element according to idealized conditions of an environment of the host platform. In some non-limiting embodiments, the plurality of data attributes may include a data attribute associated with a predicted transformation of perception of the element based on the host platform at the element according to idealized conditions of an environment of the host platform, a data attribute associated with boundaries, constraints, and/or rules of an environment of the host platform at the element according to idealized conditions of an environment of the host platform, a data attribute associated with a metric of uncertainty of perception of the element based on the host platform at the element according to idealized conditions of an environment of the host platform, and/or a data attribute associated with momentum exchange between an entity and a host platform at the element according to idealized conditions of an environment of the host platform.

In some non-limiting embodiments, ROE management system 102 may construct the run-time dynamic envelope based on the idealized dynamic envelope and data associated with Dynamics Transfer Interface Effects Saturation (DTIES). In some non-limiting embodiments, the data associated with DTIES comprises a factor associated with an interaction between a Dynamics Transfer Interface (e.g., a tire, a track, a surface of a wing, etc.) of the host platform and a Dynamics Interaction Medium (e.g., a surface of a road, a surface of a railroad track, air, etc.) of an element of the idealized dynamic envelope associated with an environment of the host platform. The factor may represent an energy transfer from the Dynamics Transfer Interface of the host platform to the Dynamics Interaction Medium and a resulting efficiency of output to the Dynamics Interaction Medium. Additionally or alternatively, ROE management system 102 may predict a state result of the host platform to an actuator command based on the data associated with DTIES and ROE management system 102 may construct the run-time dynamic envelope based on the state result of the host platform. In some non-limiting embodiments, ROE management system 102 may generate an element (e.g., generate one or more data attributes of an element) of the run-time dynamic envelope based on the state result of the host platform.

As shown in FIG. 3, at step 306, process 300 may include constructing a Worldview Relational Interaction Map (WRIM) for the host platform. For example, ROE management system 102 may construct the WRIM for the host platform based on a run-time dynamic envelope. In some non-limiting embodiments, the WRIM may include a coordinate system corresponding to an area (e.g., a two dimensional area or a three dimensional area) of an environment of the host platform, where the coordinate system comprises a plurality of elements. In some non-limiting embodiments, each element of the plurality of elements may include one or more data attributes associated with a predicted momentum exchange resulting from the host platform co-occupying the element with an entity. Additionally or alternatively, each element of the plurality of elements may include a data attribute associated with a predicted transformation of perception of the element based on the host platform at the element, a data attribute associated with boundaries, constraints, and/or rules of an environment of the host platform at the element, and/or a data attribute associated with a metric of uncertainty of perception of the element based on the host platform at the element.

In some non-limiting embodiments, ROE management system 102 may identify a Reasonable Operating Envelope (ROE) based on a WRIM. For example, ROE management system 102 may identify an ROE (e.g., a predictive ROE) based on each element (e.g., one or more data attributes of each element) of the WRIM. In some non-limiting embodiments, ROE management system 102 may compare the one or more data attributes associated with a momentum exchange of an element of the WRIM to a threshold. In some non-limiting embodiments, ROE management system 102 may label the element with an indication that the host platform should not occupy the element (e.g., label the element as a "NO GO" element) based on determining that the one or more data attributes associated with a momentum exchange of the element satisfies the threshold. Additionally or alternatively, ROE management system 102 may label the element with an indication that the host platform can occupy the element (e.g., label the element as a "GO" element) based on determining that the one or more data attributes associated with a momentum exchange of the element does not satisfy the threshold. Additionally or alternatively, ROE management system 102 may label the element with an indication that the host platform can conditionally occupy the element (e.g., label the element as a "CONDITIONAL" element) based on determining that the one or more data attributes associated with a momentum exchange of the element does not satisfy the threshold within a predetermined range.

In some non-limiting embodiments, ROE management system 102 may identify an ROE, for example, by providing one or more data attributes associated with a momentum exchange resulting from the host platform co-occupying an element with an entity as an input to a first machine learning model (e.g., a machine learning model of a Momentum Exchange Determination Procedure and Model Layers Set) to generate an output that includes a prediction of a value of momentum exchange and an indication of whether the value of momentum exchange satisfies a first threshold. Additionally, ROE management system 102 may provide one or more data attributes associated with boundaries, constraints, and/or rules of an environment of the host platform for an element as an input to a second machine learning model (e.g., a machine learning model of a Boundaries/Constraints/Rules Procedure and Model Layers Set) to generate an output that includes a prediction of whether the element includes a flag condition and an indication of whether the flag condition satisfies a second threshold. Additionally, ROE management system 102 may provide one or more data attributes associated with a metric of uncertainty of the host platform for the element as an input to a third machine learning model (e.g., a machine learning model of Confidence and Uncertainty Procedure and Model Layers Set) to generate an output that includes a prediction of a value of uncertainty and an indication of whether the value of uncertainty satisfies a third threshold. In the example above, ROE management system 102 may label the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold. Additionally, ROE management system 102 may label the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold.

In some non-limiting embodiments, ROE management system 102 may identify an ROE based on a plurality of data attributes of each element of the WRIM and ROE management system 102 may perform an action based on the ROE. In some non-limiting embodiments, ROE management system 102 may identify a plurality of command strings (e.g., a bundle of command strings) that converge on an element of the ROE that corresponds to a goal (e.g., a tactical level goal, an operational level goal, a waypoint, etc.), where each command string comprises a plurality of elements that are linked from an initial element to a final element (e.g., an element corresponding to a goal), the plurality of elements include a first element that corresponds to an initial position of the host platform and a final element that corresponds to the goal, and select a command string from the plurality of command strings based on one or more parameters associated with the command string. The parameters of the command string may be associated with a characteristic of the host platform while the host platform is moving (e.g., a characteristic associated with energy efficiency, a characteristic associated with minimum accelerations, a characteristic associated with occupying the goal in a shortest amount of time, etc.). In some non-limiting embodiments, ROE management system 102 may issue an actuator command to the host platform based on an ROE. For example, ROE management system 102 may issue the actuator command to the host platform based on a command string of a plurality of command strings and a path of elements (e.g., a string of linked elements) in the ROE.

In some non-limiting embodiments, ROE management system 102 may perform an action based on the ROE and a path of a host platform. For example, ROE management system 102 may receive data associated with a path of a host platform along a WRIM (e.g., a WRIM that includes updates to a previous WRIM), such as a run-time path of the host platform (e.g., a path of a host platform traveled by the host platform that corresponds to a plurality of elements in a run-time dynamic envelope). In some non-limiting embodiments, the path may include a plurality of elements that were occupied by the host platform during a sequence of executed actuator commands. ROE management system 102 may compare the data associated with the path of the second host platform to the ROE. In some non-limiting embodiments, when comparing the data associated with the path of the host platform along the WRIM to the ROE, ROE management system 102 may compare a first element of the plurality of elements that were occupied by the second host platform during a sequence of executed actuator commands to an element (e.g., the element of the ROE is in a nearest CDC band to the first element) of the ROE having an indication that the host platform should not occupy the element (e.g., "NO GO" label), and determine a CDC band margin between the first element of the plurality of elements and the element of the ROE having the indication. In some non-limiting embodiments, the CDC band margin may include a number of CDC bands from the first element of the plurality of elements to the element of the ROE having the indication.

In some non-limiting embodiments, ROE management system 102 may receive an input from a user associated with a strategic level goal on a geospatial map, generate a placeholder element for the strategic level goal based on the strategic level goal (e.g., data associated with the strategic level goal, such as a location of the strategic level goal), wherein the placeholder element for the strategic level goal comprises criteria associated with velocity and acceleration of the host platform at the placeholder element, determine an operational level goal based on the strategic level goal, generate a placeholder element for the operational level goal based on the operational level goal, wherein the placeholder element for the operational level goal comprises criteria associated with velocity and acceleration of the host platform at the placeholder element, and determine a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

In some non-limiting embodiments, ROE management system 102 may place a strategic level goal outside of a WRIM by generating a placeholder element for the strategic level goal. In some non-limiting embodiments, ROE management system 102 may place one or more waypoints between the strategic level goal and a position of a host platform on a WRIM or outside of a WRIM. In some non-limiting embodiments, a waypoint may include an operational level goal. In some non-limiting embodiments, ROE management system 102 may control the host platform to occupy elements associated with waypoints in succession to travel to a strategic level goal. In some non-limiting embodiments, an operational level goal may include data associated with a state of a host platform. For example, the operational level goal may include data associated with an orientation of the platform, data associated with a direction of the platform, data associated with a velocity of the platform (e.g., data associated with a velocity of the platform that includes direction), data associated with an acceleration of the host platform. Additionally or alternatively, the operational level goal may include data associated with a characteristic of the host platform (e.g., whether to have doors locked or unlocked, whether to have an arm locked or unlocked, whether to have goods loaded or unloaded, etc.).

In some non-limiting embodiments, a tactical level goal may include a goal that is placed by ROE management system 102 on an element within a WRIM (e.g., a current WRIM or an updated WRIM), the goal is in an element within an ROE. In some non-limiting embodiments, a WRIM may include a plurality of tactical level goals. Each tactical level goal may coincide with an operational goal of the WRIM. For example, a tactical level goal may be placed on a string of linked elements which include an operational level goal as a final element of the string of linked elements. In some non-limiting embodiments, a tactical level goal and an operational level goal may occupy an element (e.g., the same element) of a run-time dynamic envelope. In some non-limiting embodiments, ROE management system 102 may construct a WRIM to include a first tactical level goal of a plurality of tactical level goals and ROE management system 102 may construct an updated WRIM to include a second tactical level goal of the plurality of tactical level goals. In some non-limiting embodiments, ROE management system 102 may construct a WRIM (e.g., an updated WRIM) to include each tactical level goal of the plurality of tactical level goals as the host platform travels to each tactical level goal.

In some non-limiting embodiments, an output of a predicted momentum exchange machine learning model (e.g., a machine learning model of a Momentum Exchange Determination Procedure and Model Layers Set) may include a data attribute associated with a predicted momentum exchange resulting from a host platform co-occupying an element with an entity. ROE management system 102 may train the predicted momentum exchange machine learning model based on a training dataset associated with actual momentum exchange events resulting from the host platform co-occupying an element with an entity, validate the predicted momentum exchange machine learning model based on a validation dataset associated with actual momentum exchange events resulting from the host platform co-occupying an element with an entity, and use the predicted momentum exchange machine learning model to generate the one or more data attributes associated with a predicted momentum exchange resulting from the host platform co-occupying an element with an entity.

In some non-limiting embodiments, ROE management system 102 may train a threshold machine learning model (e.g., a machine learning model of a Momentum Exchange Threshold Procedure and Model Layers Set, a machine learning model of a Confidence-Uncertainty Threshold Procedure and Model Layers Set, or a Boundaries/Constraints/Rules Threshold Procedure and Model Layers Set) based on a training dataset associated with actual momentum exchange events and a severity of outcome associated with each actual momentum exchange event (e.g., an indication of an amount of damage or injury resulting from each actual momentum exchange event, an indication of cost associated with an amount of damage or injury resulting from each actual momentum exchange event, etc.) resulting from the host platform co-occupying an element with an entity, validate the threshold machine learning model based on a validation dataset associated with actual momentum exchange events and a severity of outcome associated with each actual momentum exchange event resulting from the host platform co-occupying an element with an entity, and use the threshold machine learning model to generate a prediction and an indication of whether the prediction satisfies a threshold.

In some non-limiting embodiments, ROE management system 102 may determine a pattern of CDC band margin associated with each actual momentum exchange event of a plurality of actual momentum exchange events, generate a plurality of ranges of patterns of CDC band margins based on severity of outcome associated with a likelihood of momentum exchange event resulting from a host platform co-occupying an element with an entity, where each range of patterns of CDC band margins is associated with a classification of risk, determine a pattern associated with CDC band margin of for an operator (e.g., a human operator, a machine operator, such as an autonomous machine operator, or a combination thereof), determine a range of the plurality of ranges of patterns of CDC band margins for the operator based on the pattern associated with CDC band margin of the operator, and determine a classification of risk of the operator based on the range of CDC band margins for the operator. In some non-limiting embodiments, a CDC band margin includes a number of CDC bands between an element that is occupied by the host platform and an element of a CDC Band that is labeled with an indication that the host platform should not occupy that element (e.g., labeled as "NO GO") in an ROE and that is nearest to the element occupied by the host platform.

Referring now to FIGS. 4A-4G, FIGS. 4A-4G are diagrams of an exemplary implementation 400 of a non-limiting embodiment relating to process 300 shown in FIG. 3. As shown in FIGS. 4A-4G, implementation 400 may include ROE command and measurement device 410, host platform controlled dynamical system 420, and network 430. In some non-limiting embodiments, ROE command and measurement device 410 may be the same as or similar to ROE command and measurement device 110. In some non-limiting embodiments, host platform controlled dynamical system 420 may be the same as or similar to host platform controlled dynamical system 120. In some non-limiting embodiments, network 430 may be the same as or similar to network 130.

Figure 4A:
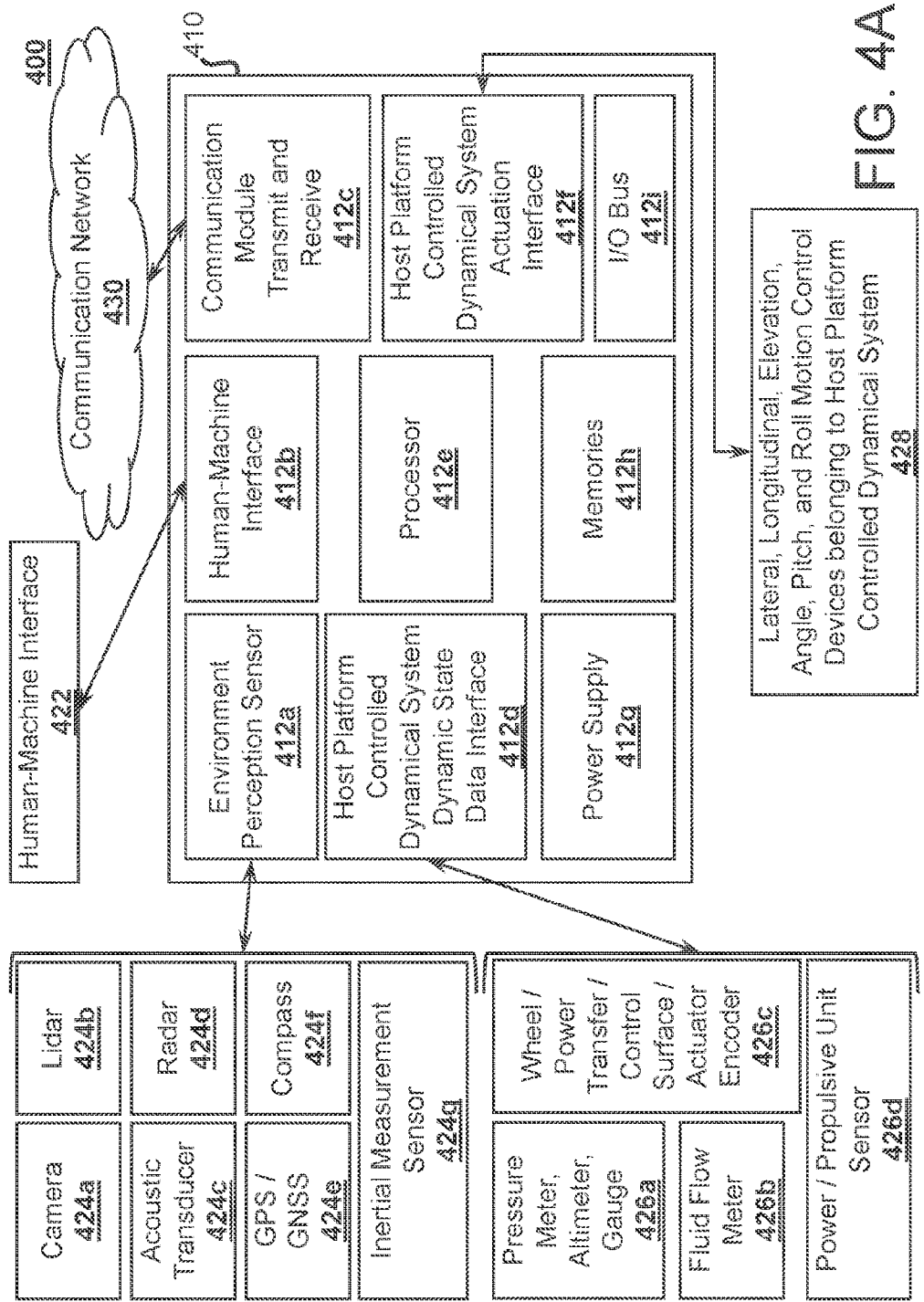

Referring to FIG. 4A, in some non-limiting embodiments, ROE command and measurement device 410 may include a plurality of components. For example, ROE command and measurement device 410 may include environment perception sensor interface 412a, human machine interface 412b, communication module 412c, host platform controlled dynamical system dynamic state data interface 412d, processor 412e, host platform controlled dynamical system actuation interface 412f, power supply 412g, memory 412h, bus 412i, any combination thereof, and/or the like. Additionally or alternatively, ROE command and measurement device 410 may include any of or any combination of the components of device 200.

In some non-limiting embodiments, ROE command and measurement device 410 and/or host platform controlled dynamical system 420 may include a plurality of sensors 424. For example, sensors 424 may include at least one of electro-optical sensor/camera 424a, lidar 424b, acoustic sensor 424c (e.g., transducer), radar 424d, location sensor 424e (e.g., global positioning system (GPS), Global Navigation Satellite System (GLASS), and/or the like), compass 424f, inertial measurement sensor 424g, any combination thereof, and/or the like.

In some non-limiting embodiments, host platform controlled dynamical system 420 may include a plurality of state sensors 426. For example, state sensors 426 may include at least one of pressure meter/altimeter/gauge 426a, fluid flow meter 426b, wheel/power transfer/control surface/actuator encoder 426c, power/propulsive unit sensor 426d, any combination thereof, and/or the like. Additionally or alternatively, host platform controlled dynamical system 420 may include at least one motion control device 428 (e.g., lateral, longitudinal, elevation, angle, pitch, roll, any combination thereof, and/or the like motion control devices). In some non-limiting embodiments, host platform controlled dynamical system 420 may include human machine interface 422.

Figure 4B:
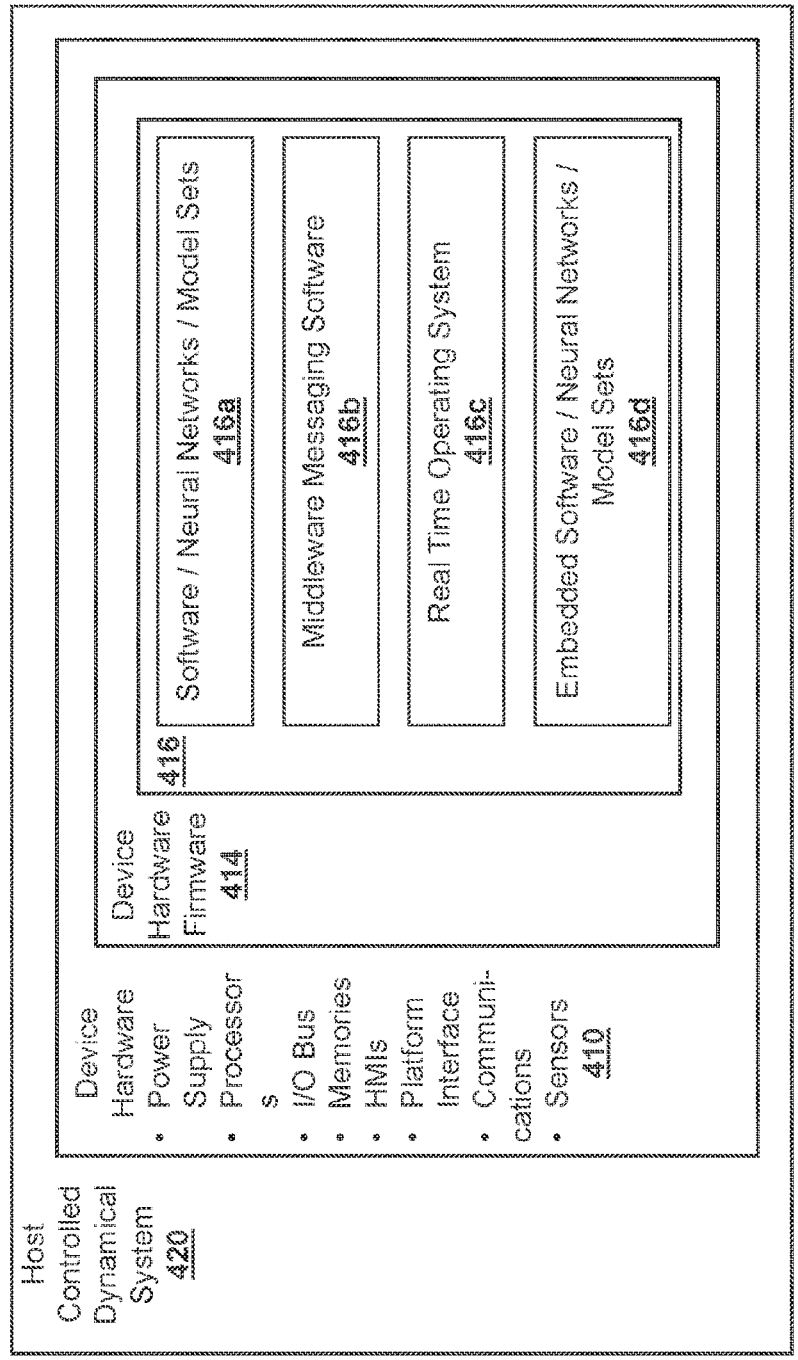

Referring to FIG. 4B, in some non-limiting embodiments, host platform controlled dynamical system 420 may include (e.g., have connected thereto, embedded therein, and/or the like) ROE command and measurement device 410. Additionally or alternatively, ROE command and measurement device 410 may include device hardware firmware 414 associated with any one of and/or any combination of the components thereof (e.g., components 412a-i, 422, 424a-g, 426a-428, 430, and/or the like). Additionally or alternatively, ROE command and measurement device 410 may include software 416 (e.g., executable instruction and/or the like). For example, the software 416 may include software/ neural networks/model sets 416a, middleware messaging software 416b, real time operating system 416c, embedded software/neural networks/model sets 416d, any combination thereof, and/or the like.

Figure 4C:
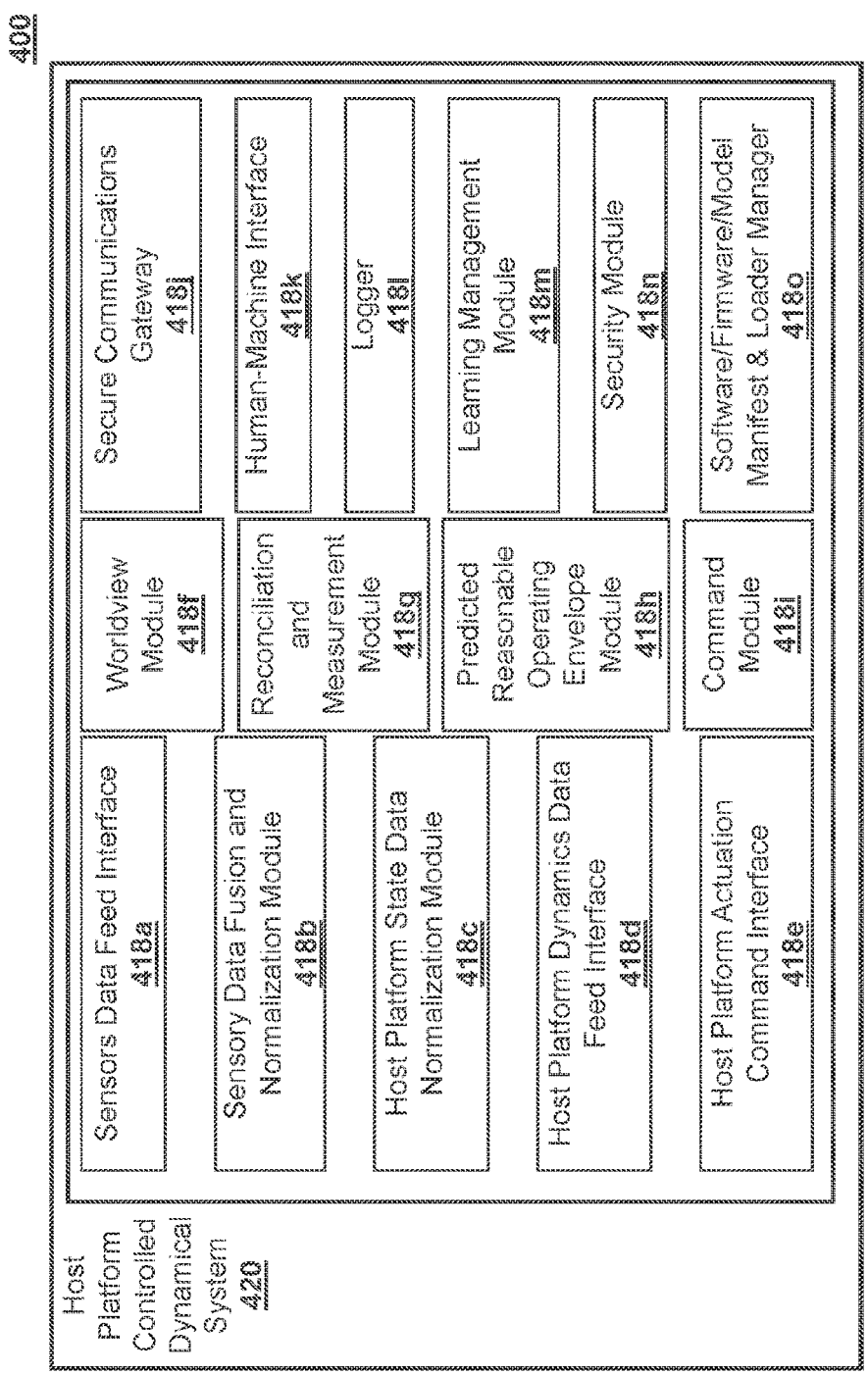

Referring to FIG. 4C, in some non-limiting embodiments, software 416 may be implemented (e.g., completely, partially, and/or the like) by modules 418. For example, modules 418 may include sensors data feed interface module 418a, sensory data fusion and normalization module 418b, host platform state data normalization module 418c, host platform dynamics data feed interface module 418d, host platform actuation command interface module 418e, worldview module 418f, reconciliation and measurement module 418g, predicted reasonable operating envelope module 418h, command module 418i, secure communications gateway module 418j, human-machine interface module 418k, logger module 418l, learning management module 418m, security module 418n, software/firmware/model manifest and loader manager 418o, any combination thereof, and/or the like.

In some non-limiting embodiments, sensors data feed interface module 418a may be connected to at least one sensor. Additionally or alternatively, each sensor may be tuned to at least on spectrum for detecting and/or acquiring data about the operating environment (e.g., around host platform controlled dynamical system 420). For example, sensors may include at least one of camera(s), lidar(s), radar(s), inertial measurement unit(s), an acoustic transducer(s), pressure meter(s), fluid flow meter(s), power/ propulsive unit sensor(s), wheel/power transfer/control surface encoder(s), altimeters, gauges, compasses, location and/or position transponders and/or beacons, global positioning systems, any combination thereof, and/or the like.

In some non-limiting embodiments, sensor data may be transmitted to sensors data feed interface module 418a, which may use the frames and/or synchronized buckets of continuous feed sensor data of the sensor(s) to construct a view, which may be referred to as a perception envelope (e.g., of what the operator of the host platform controlled dynamical system 420 can and/or cannot perceive (e.g., occluded, obstructed, and/or otherwise out of the operator's field of view)). For example, such a perception envelope may account for space dimensionality with respect to dynamic actions occurring in command decision cycles (CDCs). In some non-limiting embodiments, sensors data feed interface module 418a may send the normalized data to sensory data fusion and normalization module 418b.

In some non-limiting embodiments, host platform dynamics data feed interface module 418d may be connected to at least one sensor. Additionally or alternatively, each sensor may be tuned to at least one spectrum for detecting and/or acquiring data about the operating environment (e.g., around host platform controlled dynamical system 420) and/or feeds from other processors (e.g., of host platform controlled dynamical system 420 and/or independent of the ROE command and measurement device 410) that process sensor and/or other information about the host platform controlled dynamical system 420. Such data regarding host platform controlled dynamical system 420 may be provided based on information pertaining to the state of host platform controlled dynamical system 420 via domain controllers, onboard computers, gauges, encoders, Controller Area Network (CAN) bus, Aeronautical Radio, Incorporated (ARINC) standard messaging devices, other messaging standard devices, any combination thereof, and/or the like. Additionally or alternatively, sensor data may include data from sensors including camera(s), lidar(s), radar(s), inertial measurement unit(s), acoustic transducer(s), pressure meter(s), fluid flow meter(s), power/propulsive unit sensor(s), wheel/power transfer/control surface encoder(s), altimeter(s), gauge(s), compass(es), location and/or position transponder(s) and/or beacon(s), and global positioning system(s), any combination thereof, and/or the like. In some non-limiting embodiments, host platform dynamics data feed interface module 418d may send the normalized data to host platform state data normalization module 418c.

In some non-limiting embodiments, sensory data fusion and normalization module 418b and/or host platform state data normalization module 418c may receive and/or access data from host platform controlled dynamical system 420 and/or data about the operating environment acquired from sensors on and/or around host platform controlled dynamical system 420. Additionally or alternatively, additional sensory data may be acquired by off-board sensors, and such additional sensory data may be transmitted to the ROE command and measurement device 410 to provide information on the operating environment and/or host platform controlled dynamical system 420 thereto. In some non-limiting embodiments, sensory data fusion and normalization module 418b may align, adjust, synchronize time arrival, and/or structure the data formats of sensory data elements to produce fused environment sensor data 440g (further described below), which may capture the combined field of view available to ROE command and measurement device 410. Additionally or alternatively, sensory data fusion and normalization module 418b may perform extraction, transformation, and/or loading processes on the one or more data streams and/or messages sent from the sensors data feed interface module 418a. In some non-limiting embodiments, the normalization process of sensory data fusion and normalization module 418b may include structuring data formats from different sensor variants and manufacturers. For example, sensory data fusion and normalization module 418b may structure and/or converts the data format used by the sensor variant into a normalized data format for common use within ROE command and measurement device 410. In some non-limiting embodiments, sensory data fusion and normalization module 418b may also receive messages from worldview module 418f, command modules 418i, and/or the like. For example, such message may instruct sensors to rotate, zoom, focus, slew, and/or otherwise actuate, synthetically actuate, and/or tune to aid the processes of ROE command and measurement device 410. In some non-limiting embodiments, sensory data fusion and normalization module 418b may send such messages and/or instructions based thereon to the sensors data feed interface 418a (e.g., in a format useable by the sensor or sensor actuator(s)). In some non-limiting embodiments, sensory data fusion and normalization module 418b may output fused environment sensor data 440g to the worldview module 418f (e.g., for use by the sub-modules and/or the like of the worldview module 418f to generate the worldview map, as described herein).

In some non-limiting implementations, more than one sensor may be used. Additionally or alternatively, sensory data fusion and normalization module 418b may perform operations to fuse sensor data so that a signal pixel, ray, quantity, magnitude value, other type of sensory data element any combination thereof, and/or the like may be aligned to a common field of view. For example, a stereoscopic camera array may be used, and where sensory data fusion and normalization module 418b may perform fusion operations to determine and/or represent that a first pixel (e.g., pixel a from) a first camera (e.g., camera 1) may correspond to and/or overlap with a second pixel (e.g., pixel b) from a second camera (e.g., camera 2) in the same area of a combined field of view (e.g., of ROE command and measurement device 410). Additionally or alternatively, data elements from sensors capturing differing spectrums may be aligned, e.g., by sensory data fusion and normalization module 418b may performing fusion operations to determine and/or represent that a first pixel (e.g., pixel a from) a first camera (e.g., camera 1) corresponds to and/or overlaps with the same area of a combined field of view (e.g., of ROE command and measurement device 410) as a returned signal value from a radar.

In some non-limiting embodiments, learning management module 418m may access realized classifications, outcomes, and/or probability collapse information, e.g., associated with elapsed command decision cycles. Additionally or alternatively, learning management module 418m may perform operations to structure a record of elapsed outcomes of CDCs (e.g., recording updates, difference values, and/or the like). In some non-limiting embodiments, learning management module 418m may add realized classifications, outcomes, and/or probability precision refinement and/or collapse information to the stored records of worldview relational interaction maps (WRIMs) preceding CDCs, e.g., for use by procedure-model learning processes as structured and/or labeled data training sets. Additionally or alternatively, learning management module 418m determine (and/or assist in determining) areas where model refinement is merited. In some non-limiting embodiments, learning management module 418m may provide output (e.g., as annotations and/or the like), which may be sent to logger module 418l for incorporation with (e.g., into) logged data. In some non-limiting embodiments, learning management module 418m may manage active model training for live updates to the procedure-model layers sets in ROE command and measurement device 410 (and/or ROE system 102), e.g., independent of other systems of ROE system 102, together with at least some such other systems (e.g., learning and evaluation system 104), and/or the like.

In some non-limiting embodiments, logger module 418l may receive (e.g., retrieve, access, request, receive via communication, and/or the like) information from the modules 418 of ROE command and measurement device 410. Additionally or alternatively, logger module 418l may structure such information into data records for transmission to and/or use by the other systems of ROE system 102 (e.g., learning and evaluation system 104). For example, such data records may include raw sensor data, at least one WRIM (and/or subsets of information therein), predicted and/or realized ROEs (and/or subsets of information therein), operating system messages (e.g., from real time operating system 416c), structured outcomes information (e.g., from learning management module 418m), any combination thereof, and/or the like. In some non-limiting embodiments, logger module 418l may manage the transmission (e.g., upload, offload, and/or the like) of such log data to other systems of ROE system 102, together with at least some such other systems (e.g., learning and evaluation system 104 and/or the like).

In some non-limiting embodiments, secure communications gateway module 418j may connect ROE command and measurement device 410 to at least one communications network (e.g., network 130 and/or the like). Additionally or alternatively, secure communications gateway module 418j may receive data (e.g., software, firmware, geospatial reference map data, tasking and advisory data (e.g., instructions and/or the like), any combination thereof, and/or the like), transmit data (e.g., statuses, requests (e.g., associated with at least one of a task, an instruction, guidance, and/or the like), logger data (e.g., from logger module 418l), performance measurements data, any combination thereof, and/or the like), any combination thereof, and/or the like.

In some non-limiting embodiments, human-machine interface module 418k may allow a user to view and/or interact with information of ROE command and measurement device 410, task ROE command and measurement device 410, any combination thereof, and/or the like.

In some non-limiting embodiments, software/firmware/model manifest and loader manager module 418o may manage the loading of software and/or firmware release updates to various ROE command and measurement device 410 modules. Additionally or alternatively, software/firmware/model manifest and loader manager module 418o may maintain records of ROE command and measurement device 410 and/or host platform controlled dynamical system 420 (e.g., configurations thereof and/or the like). Additionally or alternatively, software/firmware/model manifest and loader manager module 418o may execute preventative and/or detective control processes to ensure configuration parameters match actual onboard hardware and/or software versions and/or capabilities.

In some non-limiting embodiments, security module 418n may execute preventative and/or detective control processes (e.g., authenticate, validate, monitor, protect, any combination thereof, and/or the like) ROE command and measurement device 410 and/or the use thereof. Additionally or alternatively, security module 418n may interface with and/or monitor at least some of (e.g., all of) the other modules 418 of ROE command and measurement device 410 and/or host platform controlled dynamical system 420. In some non-limiting embodiments, security module 418n may monitor messages (e.g., incoming, intermediary, outgoing, any combination thereof, and/or the like messages). In some non-limiting embodiments, security module 418n may execute processes for the encryption and/or decryption of data and/or messages (e.g., of ROE command and measurement device 410, ROE system 102, and/or the like).

Referring to FIGS. 4D1-3, in some non-limiting embodiments, worldview module 418f may receive at least on input. For example, worldview module 418f may receive at least one of command goals and limits guidance data 440a associated with command goals, limits guidance, and/or the like; geospatial map data 440b associated with at least one geospatial map; any combination thereof; and/or the like. Additionally or alternatively, worldview module 418f may receive (e.g., from host platform state data normalization module 418c) actuators state data 440c associated with a state of at least one actuator (e.g., of host platform controlled dynamical system 420 and/or the like); current and predicted available power state data 440d associated with at least one of a current available power state, a predicted available power state, and/or the like; current state dynamics transfer interface effects saturation (DTIES) data 440e associated with associated with at least one current state of DTIES; any combination thereof; and/or the like. Additionally or alternatively, worldview module 418f may receive and/or have stored therein current worldview relational interaction map data 450a associated with a current (e.g., most recent as of the last update and/or the like) version of a worldview relational interaction map. Additionally or alternatively, worldview module 418f may receive (e.g., from sensory data fusion and normalization module 418b) fused environment sensor data 440g associated with data from at least one sensor (e.g., sensing the environment around host platform controlled dynamical system 420 and/or the like).

In some non-limiting embodiments, worldview module 418f may include a plurality of modules (e.g., sub-modules and/or the like). For example, worldview module 418f may include at least one of DTIES procedure and model layers set 418p, object-actor extrinsic procedure and model layers set 418fa, object-actor intrinsic procedure and model layers set 418fb, object-actor behavior procedure and model layers set 418fc, boundaries/constraints/rules procedure and model layers set 418fd, confidence and uncertainty procedure and model layers set 418fe, momentum exchange determination procedure and model layers set 418ff, goal placement module 418fg, element limits module 418fh, geospatial map to worldview map orientation manager 418fi, dynamics interaction medium procedure and model layers set 418fj, dynamic envelope element-command string linker 418fk, worldview map aggregate emergence procedure and model layers set 418fl, any combination thereof, and/or the like.

In some non-limiting embodiments, DTIES procedure and model layers set 418p may receive (e.g., as inputs) at least a subset of the inputs to worldview module 418f. For example, DTIES procedure and model layers set 418p may receive as inputs actuators state data 440c, current and predicted available power state data 440d, current state DTIES data 440e, and/or the like. Additionally, DTIES procedure and model layers set 418p may generate at least one output based on the inputs thereto. For example, DTIES procedure and model layers set 418p may generate (e.g., as output) predicted actuator command set (ACS)-DTIES-velocity-acceleration command adjacent increments data 440f based on the inputs thereto.

In some non-limiting embodiments, at least a subset of the modules (e.g., sub-modules and/or the like) of worldview module 418f may receive at least a subset of the inputs (and/or the predicted ACS-DTIES-velocity-acceleration command adjacent increments data 440f output from DTIES procedure and model layers set 418p) and generate outputs based thereon. For example, each of object-actor extrinsic procedure and model layers set 418fa, object-actor intrinsic procedure and model layers set 418fb, object-actor behavior procedure and model layers set 418fc, and/or boundaries/constraints/rules procedure and model layers set 418fd may receive fused environment sensor data 440g as input. Additionally or alternatively, each of object-actor extrinsic procedure and model layers set 418fa, object-actor intrinsic procedure and model layers set 418fb, object-actor behavior procedure and model layers set 418fc, boundaries/constraints/rules procedure and model layers set 418fd, confidence and uncertainty procedure and model layers set 418fe, momentum exchange determination procedure and model layers set 418ff, goal placement module 418fg, element limits module 418fh, geospatial map to worldview map orientation manager 418fi, dynamics interaction medium procedure and model layers set 418fj, and/or dynamic envelope element-command string linker 418fk may receive current worldview relational interaction map 450a as input. Additionally or alternatively, goal placement module 418fg and/or element limits module 418fh may receive command goals and limits guidance data 440a as input. Additionally or alternatively, geospatial map to worldview map orientation manager 418fi may receive geospatial map data 440b as input. Additionally or alternatively, dynamic envelope element-command string linker 418fk may receive predicted ACS-DTIES-velocity-acceleration command adjacent increments data 440f as input. Additionally or alternatively, the outputs of any of the modules (e.g., sub-modules and/or the like) of worldview module 418f may be provided as inputs to any of the other modules (e.g., sub-modules and/or the like) of worldview module 418f.

In some non-limiting embodiments, the outputs of at least a subset of the modules (e.g., sub-modules and/or the like) of worldview module 418f may be provided as inputs to worldview map aggregate emergence procedure and model layers set 418fl, which may generate at least one output based thereon. For example, the outputs of each of object-actor extrinsic procedure and model layers set 418fa, object-actor intrinsic procedure and model layers set 418fb, object-actor behavior procedure and model layers set 418fc, boundaries/constraints/rules procedure and model layers set 418fd, confidence and uncertainty procedure and model layers set 418fe, momentum exchange determination procedure and model layers set 418ff, goal placement module 418fg, element limits module 418fh, geospatial map to worldview map orientation manager 418fi, dynamics interaction medium procedure and model layers set 418fj, and/or dynamic envelope element-command string linker 418fk may be provided as inputs to worldview map aggregate emergence procedure and model layers set 418fl, which may generate at least one output based thereon. For example, worldview map aggregate emergence procedure and model layers set 418fl may generate updated worldview relational interaction map data 450b associated with an updated (e.g., refreshed, regenerated, and/or the like based on the current inputs to worldview map aggregate emergence procedure and model layers set 418fl) version of the worldview relational interaction map. In some non-limiting embodiments, updated worldview relational interaction map data 450b may replace current worldview relational interaction map data 450a (e.g., updated worldview relational interaction map data 450b may now be considered the current worldview relational interaction map data 450a).

In some non-limiting embodiments, to generate a worldview (e.g., WRIM) from the inputs (e.g., received fused environment sensor data 440g and/or the like), worldview module 418f may perform operations that account for, classify, and/or otherwise consider the entities that make up or constitute the operating environment. These entities may be referred to as object-actors. For example, objects may include non-intelligently acting and/or stationary entities, which may not have direct control over the dynamic states thereof. Additionally or alternatively, actors may include entities which possess (e.g., direct and/or directly linked) control of the dynamic action thereof. In some non-limiting embodiments, actors may control and/or affect the dynamic states of other objects and/or actors. In some non-limiting embodiments, objects may include informational states that communicate external direction. For example, traffic control signaling devices (e.g., stop lights, caution lights, railroad crossing lights, and/or the like) and/or signs (e.g., road signs and/or the like). In some non-limiting embodiments, the medium with which host platform controlled dynamical system 420 will interact dynamically may be an object and/or an actor.

In some non-limiting embodiments, host platform state data normalization module 418c may access data (e.g., messages, streams, and/or the like) from host platform controlled dynamical system 420, e.g., to perform operations to collect and/or structure such data (e.g., current and predicted power available power state data 440d, actuator state data 440c, current state DTIES data 440e, and/or the like of host platform controlled dynamical system 420). Additionally or alternatively, host platform state data normalization module 418c may performs processes (e.g., extract, transform, load, and/or the like processes) on the aforementioned data (e.g., messages, streams, and/or the like) communicated from host platform dynamics data feed interface 418d. In some non-limiting embodiments, host platform state data normalization module 418c may perform a normalization process, which may include structuring data formats of data received from different actuators and/or sensors having different variants and/or manufacturers. In some non-limiting embodiments, host platform state data normalization module 418c may structure (e.g., convert and/or the like) the data format used by such actuators and/or sensors into a normalized data format for common use within the ROE command and measurement device 410 (and/or ROE system 102). In some non-limiting embodiments, host platform state data normalization module 418c may include a procedure-model layers set, which may perform operations to determine a normalized view of the current and predicted available power state data 440d associated with host platform controlled dynamical system 420 and/or the corresponding mapped probable result of actuator commands delivering the available power to DTIES procedure and model layers set 418p (e.g., to send for use to other procedure-model layers sets in worldview module 418f). For example, such a procedure-model layers set of host platform state data normalization module 418c may communicate normalized output about current and predicted power available power state data 440d, actuator state data 440c, current state DTIES data 440e, and/or the like of host platform controlled dynamical system 420 to DTIES procedure and model layers set 418p.

In some non-limiting embodiments, an actuator command set (ACS) may include a specific (e.g., exclusive and/or the like) combination of actuator command increment inputs to be commanded in a CDC. Additionally or alternatively, a combinations set may include all dynamic degrees of freedom that can be acted on in the elapse of a CDC. For example, host platform controlled dynamical system 420 may include steering and/or throttle actuators, each of which may be commanded to increment in the same CDC.

In some non-limiting embodiments, an available ACS may include the combination of available actuator command increment inputs (e.g., of host platform controlled dynamical system 420), e.g., for all actuators and/or corresponding degrees of actuation thereof available to the operator (e.g., of host platform controlled dynamical system 420) in a given state that can be issued in one CDC. For example, an ACS may be unavailable to a host platform controlled dynamical system 420 when a steering actuator is already at the maximum radian limit to left of its degree of freedom. In such an example, an ACS that includes increments for the steering actuator to turn further left may be unavailable.

In some non-limiting embodiments, a dynamics transfer interface (DTI) may include the system component(s) (e.g., of host platform controlled dynamical system 420) upon which actuator force may be applied in order to maintain and/or affect the dynamic state of host platform controlled dynamical system 420. For example, DTIs may include tires for wheeled systems; tracks for an off-road vehicle; propulsion force exit manifold for ships and/or aircrafts; wing flaps, rudders, and/or ailerons as the control surface for an aircraft, any combination thereof, and/or the like.

In some non-limiting embodiments DTIES may include a factor of energy transfer to the DTI (e.g., of host platform controlled dynamical system 420) and/or the resulting efficiency of output to the dynamics interaction medium (DIM). Additionally or alternatively, DTIES factors may be used by the worldview module 418f to predict dynamic state response to ACSs.

In some non-limiting embodiments, DTIES may be effected by the medium in which and/or surface on which the DTI (e.g., of host platform controlled dynamical system 420) may interact. Additionally or alternatively, the DIM may be the medium, space and/or surface upon which the DTI (e.g., of host platform controlled dynamical system 420) may make contact and/or with which the DTI may interact to maintain and/or affect the dynamic state (e.g., of host platform controlled dynamical system 420). In some non-limiting embodiments, a DIM may possess attributes (e.g., properties and/or the like) that may affect the efficiency of the DTI(s) to maintain and/or alter the dynamic state of host platform controlled dynamical system 420. For example, such attributes may include viscosity, density, gradients, grades, friction, any combination thereof, and/or the like (e.g., that may assist and/or resist the energy transferred from and/or into the DTI(s)).

In some non-limiting embodiments, host platform state data normalization module 418c may perform operations, e.g., to determine a normalized view of the current command actuator(s) state(s) to determine when actuator command increments reach limits (e.g., minimums, maximums, and/or the like). For example, a steering rudder control surface actuator may reaches port or starboard maximum angle, which may prevent further commands to increment the rudder further to port (e.g., with the result that available power is limited from delivery to further affect dynamic state with respect to the steering rudder control surface actuator, although other adjustments to other actuators and/or external medium attributes may otherwise affect a response to the port direction). In some non-limiting embodiments, host platform state data normalization module 418c may measure current state DTIES data 440e (e.g., associated with host platform controlled dynamical system 420 and/or DTIs thereof) and/or communicate such data to the dynamics transfer interface effects saturation procedure and model layers set 418p.

In some non-limiting embodiments, a worldview (e.g., WRIM) may be generated by worldview module 418f, e.g., based on environmental sensor data (e.g., fused environment sensor data 440g and/or the like), other dynamic data streams, as previously generated worldview(s) (e.g., current worldview relational interaction map data 450a), and/or the like. For example, worldview module 418f may determine the relational responses (e.g., interactions and/or the like) shared between perception and dynamic features, and/or a fused relational interaction may emerge at the worldview map aggregate emergence procedure and model layers set 418fl.

In some non-limiting embodiments, worldview module 418f may residing on (e.g., be implemented on, stored on, and/or the like) ROE command and measurement device 410. Additionally or alternatively, worldview module 418f may include (e.g., encapsulate and/or the like) one or more instances of object-actor extrinsic procedure and model layers set 418fa, object-actor intrinsic procedure and model layers set 418fb, object-actor behavior procedure and model layers set 418fc, boundaries/constraints/rules procedure and model layers set 418fd, confidence and uncertainty procedure and model layers set 418fe, momentum exchange determination procedure and model layers set 418ff, goal placement module 418fg, element limits module 418fh, geospatial map to worldview map orientation manager 418fi, dynamics interaction medium procedure and model layers set 418*fj*, dynamic envelope element-command string linker 418*fk*, worldview map aggregate emergence procedure and model layers set 418*fl*, any combination thereof, and/or the like. Additionally or alternatively, worldview module 418*f* may use (e.g., some of, all of, and/or the like) these modules (e.g., procedure-model layers sets, sub-modules, and/or the like) to generates a WRIM based on, e.g., preceding updates (e.g., current worldview relational interaction map data 450*a*), other dynamic state and/or environmental sensor data, and/or the like. In some non-limiting embodiments, a WRIM may include a coordinate system capturing the operating domain context incorporating the perceived and predicted relationships between the controlled dynamical system's current and potential dynamic states over a time horizon and the perceived operating environment.

In some non-limiting embodiments, WRIM may include a dynamic operating envelope and/or a perception envelope. In some non-limiting embodiments, each of the dynamic envelope and the perception envelopes may include respective elements. Additionally or alternatively, a dynamic envelope element may include the caused probability states and rate of probability states change of a perception envelope in relation to dynamic actions of the host platform controlled dynamical system 420 and the actions of object-actors perceived in the operating environment. In some non-limiting embodiments, worldview module 418*f* may generate (e.g., construct and/or the like) a map of the relationships of dynamic states to predicted change in the perception envelope, and/or may also account for object-actor actions independent of the host platform controlled dynamical system 420. In some non-limiting embodiments, dynamic states may be the result of commanded ACSs and ensuing effects on the energy transferred from the controlled dynamical system to the operating environment.

In some non-limiting embodiments, the Worldview (e.g., WRIM) may include a generated map representing the relationship between the perception envelope, and/or may also account for object-actor actions independent of the actual and potential (e.g., as probabilistically determined) dynamic action of host platform controlled dynamical system 420 and/or the environment context in which host platform controlled dynamical system 420 may operate over the course of time horizon. In some non-limiting embodiments, a time horizon may include a predetermined number of CDCs (e.g., an arbitrary number of CDCs, an empirically determined relevant number of CDCs, and/or the like), which may include current and future CDCs for which the ROE command and measurement device 410 (e.g., worldview module 418*f*) develops a dynamic envelope in a WRIM. In some non-limiting embodiments, a tactical level command decision (as described herein) may be contained within the time horizon, and/or an operational command decision and/or strategic command decision may be beyond the time horizon.

In some non-limiting embodiments, worldview (e.g., WRIM) dynamic envelope elements may elastically expand and/or contract in proportion to the time horizon and dynamic state of host platform controlled dynamical system 420 and/or the environment thereof. Additionally or alternatively, such expansion and/or contraction may causes the WRIM to be an elastic reference coordinate system. In some non-limiting embodiments, elasticity may be resultant of dynamic envelope elements expanding and/or contracting in relation to the current dynamic state and subsequent potential dynamic states resultant from commands in transpiring dynamic state changes in preceding CDC Bands. In some non-limiting embodiments, such elasticity may be a feature that impacts CDC ROE margin (as described herein), which may be a normalized and/or objective measure of operator performance. For example, CDC ROE margin may account for what the operator of the controlled dynamical system can and cannot dynamical affect.

In some non-limiting embodiments, a CDC Band may include a collection of all developed dynamic envelope elements for a respective CDC. Additionally or alternatively, the dynamic envelope elements in a given CDC Band may succeed the dynamic envelope elements in the previous CDC Band. Additionally or alternatively, the dynamic envelope elements in a given CDC band may precede dynamic envelope elements of the next subsequent CDC band. Additionally or alternatively, command adjacent dynamic elements may include the elements preceding and/or succeeding each other sequentially from preceding CDC band to given CDC band and/or from given CDC band to succeeding CDC band.

In some non-limiting embodiments, DTIES procedure and model layers set 418*p* may receive (e.g., access and/or the like) current state DTIES data 440*e*, actuators state data 440*c*, and/or current and predicted available power state data 440*d* output from the Host Platform State Data Normalization Module 418*c*, and/or DTIES procedure and model layers set 418*p* may perform operations to provide a map accounting for the current state of the host platform controlled dynamical system 420 that provides predicted relationships between ACSs, DTIES, and resultant acceleration and velocity states. In some non-limiting embodiments, position may be excluded as the dynamic envelope element-command string linker 418*fk* may be responsible to use the map relational velocity and acceleration to positions within the dynamic envelope elements linked thereby for generation of the worldview (e.g., WRIM). In some non-limiting embodiments, predicted ACS-DTIES-velocity-acceleration command adjacent increments data 440*f* may be sent to the dynamic envelope element-command string linker 418*fk*.

In some non-limiting embodiments, dynamics interaction medium procedure and model layers set 418*fj* may access current worldview relational interaction map data 450*a* and/or performs operations to determine the effect of the DIM on DTIES. Additionally or alternatively, based on the object-actor classifications in current worldview relational interaction map data 450*a*, the dynamics interaction medium procedure and model layers set 418*fj* may identify the DIM adjustment gradient factors that affect DTIES. For example, a rougher patch of road surface may increase road surface friction and/or affect an automobile's DTIES. In some non-limiting embodiments, dynamics interaction medium procedure and model layers set 418*fj* may employ use of elapsed worldviews (e.g., WRIM) and the current worldview relational interaction map data 450*a* to perform operations that use changes occurring with respect to features of interest as significant inputs to operations thereof. In some non-limiting embodiments, dynamics interaction medium procedure and model layers set 418*fj* may communicate the identified new and adjusted DIM effect factors to dynamic envelope element-command string linker 418*fk* and/or the worldview map aggregate emergence procedure and model layers set 418*fl* (e.g., for incorporation onto CDC demarcated dynamic envelope elements in the next worldview (e.g., updated worldview relational interaction map data 450*b*).

In some non-limiting embodiments, a command string may include a series of linked actuator commands corresponding to dynamic envelope elements that, if commanded, may move (e.g., with a predicted probability) the host platform controlled dynamical system 420 from an origin worldview dynamic envelope element to a terminal worldview dynamic envelope element (e.g., directly and/or through intermediary worldview dynamic envelope elements). In some non-limiting embodiments, a command string bundle may include a collection of all processed command strings that emanate from one worldview dynamic envelope element in one WRIM CDC band and subsequently diverge over predicted resultant dynamic envelope elements and then converge on a terminal worldview dynamic envelope element in another WRIM CDC band. In some non-limiting embodiments, dynamic envelope element-command string linker 418*fk* may be responsible for managing the collection of available command strings and command string bundles in the worldview.

In some non-limiting embodiments; dynamic envelope element-command string linker 418*fk* may access predicted ACS-DTIES-velocity-acceleration command adjacent increments data 440*f*, element limits module 418*fh* (e.g., the output thereof), goal data output from the goal placement module 418*fg*, and/or current worldview relational interaction map data 450*a* to perform operations to predict command adjacent element dimensional relations of position, velocity, and acceleration states resulting from ACSs from over the elapse of time forward CDCs. In some non-limiting embodiments, dynamic envelope element-command string linker 418*fk* may employ use of elapsed worldviews (e.g., WRIMs) and current worldview relational interaction map data 450*a* to perform operations that may use changes occurring in respect to features of interest as significant inputs to operations thereof. In some non-limiting embodiments, dynamic envelope element-command string linker 418*fk* may incorporate use of the dynamic translation interaction medium saturation effects gradient factor contained in the current worldview relational interaction map data 450*a* to adjust the parameters used in operations performed on the predicted ACS-DTIES-velocity-acceleration command adjacent increments data 440*f*. In some non-limiting embodiments, dynamic envelope element-command string linker 418*fk* may purge dynamic envelope elements that may be no longer attainable resulting from the last chosen command of the command decision of the last cycle, and/or the available dynamic envelope elements in approaching CDC bands may reduce as a result. In some non-limiting embodiments, dynamic envelope element-command string linker 418*fk* may output new and/or updated dynamic envelope elements including the ACSs, position, velocity, acceleration, and/or carrying momentum with corresponding command adjacent references (e.g., command strings and command string bundles), and/or the output may be communicated to the worldview map aggregate emergence procedure and model layers set 418*fl* (e.g., for incorporation onto CDC demarcated dynamic envelope elements in the next worldview (e.g., updated worldview relational interaction map data 450*b*). In some non-limiting embodiments, carrying momentum may include the free (e.g., un-exchanged) momentum of host platform controlled dynamical system 420 related by the host platforms mass and velocity. In some non-limiting embodiments, dynamic envelope element-command string linker 418*fk* may work incrementally from the current dynamic envelope element in which host platform controlled dynamical system 420 resides, and/or the dynamic envelope element-command string linker 418*fk* may increment CDC forward from the current dynamic envelope element in which host platform controlled dynamical system 420 resides as well as incrementally CDC backwards from intermediary elements and/or the goal element(s). In some non-limiting embodiments, logic and/or instructions from the element limits module 418*fh* may set the criteria for element incrementing.

In some non-limiting embodiments, dynamic envelope elements may be elastic, e.g., expanding and/or contracting according to the command adjacent dynamic envelope elements states. Additionally or alternatively, position in the worldview (e.g., WRIM) may be treated as the volume occupied during the execution elapse of the command decision cycle (e.g., due to elastic effects). Additionally or alternatively, at higher energy states, the host platform controlled dynamical system 420 may occupy a volume greater than its stationary volume dimensions. In some non-limiting embodiments, occupation spread may refer to this characteristic of position in elastic dynamic envelope elements. In some non-limiting embodiments, dynamic envelope element-command string linker 418*fk* may determine the relational dimensions of dynamic envelope elements, which, as the elements are linked together in CDC Bands, produce the expanding and/or contracting dynamic envelope of the worldview.

In some non-limiting embodiments, the element limits module 418*fh* may maintain the time horizon CDC instance number and/or criteria for the setting the number of CDC iterations predictions that should be accounted for by worldview module 418*f* (e.g., dynamic envelope element-command string linker 418*fk*). In some non-limiting embodiments, command module 418*i* may communicate implementer and/or user directed constraints and/or time horizon CDC count for worldview generation and tactical level operating performance characteristics to element limits module 418*fh*. In some non-limiting embodiments, element limits module 418*fh* may process the instructions and place corresponding limits on the applicable procedure-model layers sets in worldview module 418*f*. For example, an implementer and/or user may issue instructions to only develop dynamic envelope elements that do not exceed a threshold acceleration, and element limits module 418*fh* may instruct dynamic envelope element-command string linker 418*fk* to not further develop prediction iterations for dynamic envelope elements violating threshold criteria, in this example surpassing dynamic states where the acceleration exceeds the set acceleration threshold.

In some non-limiting embodiments, device applications, computational power, and/or the like may place a requirement to limit the number of Dynamic Envelope Elements that ROE command and measurement device 410 may perform operations to compute. Additionally or alternatively, element limits module 418*fh* may accommodate such requirements with one or more combinations of time horizon parameter adjustments, goal command spread constraints, dynamic state constraints, adjustable precision tolerance ranges, and/or the like. In some non-limiting embodiments, ROE command and measurement device 410 may use a combination of two or more of these methods. In some non-limiting embodiments, model learning and/or refinement may be used to identify effective and/or optimized adjustments, tolerances, limits, constraints settings, and/or the like for meeting computation requirements.

In some non-limiting embodiments, time horizon parameter adjustment may enables reduction of dynamic envelope element numbers by decreasing the number of CDCs that constitute the WRIM.

In some non-limiting embodiments, goal command spread constraints may limit worldview module 418*f* to constructing dynamic envelope elements to a limited spread range that may be based on dynamic state parameters and/or a fixed allocation number of elements that should be developed. Additionally or alternatively, knowing the goal dynamic state requirements may enables worldview module 418*f* to link from both current host platform controlled dynamical system 420 CDS state as well as the goal in the future CDC in which such goal resides. Additionally or alternatively, the goal may be a pre-positioned reference dynamic envelope element. Additionally or alternatively, by possessing the goal required position, velocity, and acceleration state set, the worldview module 418*f* may perform operations from the future CDC dynamic envelope element. In some non-limiting embodiments, where the forward and backward operations produce a tolerably similar dynamic envelope element, the operations can stop divergent development of dynamic envelope element elements. In some non-limiting embodiments, the spread can be set to capture spatial constraints, dynamic state constraints (e.g. do not develop dynamic envelope elements exceeding goal set dynamic state).

In some non-limiting embodiments, dynamic state constraints may limit the iterated development of dynamic envelope elements that are above or below set dynamic state limits. Additionally or alternatively, this type of constraint may instructs dynamic envelope element-command string linker 418*fk* to not evaluate elements command adjacent to reference elements not compliant with dynamic state threshold criteria.

In some non-limiting embodiments, adjustable precision tolerance range constraint limits may include tightening and/or loosening the precision tolerance on dynamic state resultant from actuator commands based on specified criteria. Additionally or alternatively, specified criteria may include a future CDC's proximity to the current CDC, a proximity from a zone, object-actor behavior, any combination thereof, and/or the like. In some non-limiting embodiments, CDC proximity-based limits may be placed to enable dynamic envelope element-command string linker 418*fk* for dynamic envelope elements in CDC bands farther out in the future to be developed in bucketed ACS increments and resultant dynamic state with wider spreads or distributions of probability and thus constructing less precise dynamic envelope elements that represent multiple ACS commands and dynamic states. For zone proximity-based limits, element limits module 418*fh* may interpret implementer and/or user issued criteria and evaluates current worldview relational interaction map data 450*a* to identify zones that meet the zone proximity criteria and accordingly updates limit instruction to the Linker. For example, a zone proximity limit may be a user instruction that full dynamic envelope element incrementing be conducted backward from any human residing within thirty (30) CDC bands from the last generated dynamic envelope (e.g., with any and/or no limits already in effect). In some non-limiting embodiments, object-actor behavior-based limits identify behaviors meeting threshold criteria in current worldview relational interaction map data 450*a*. For example, an object-actor directionally approaching at above threshold velocity and/or acceleration, an object-actor whose behavior prediction is assigned a high uncertainty, and/or the like may result in element limits module 418*fh* specifying increased precision tolerance in developing and linking dynamic envelope elements in proximity to the object-actor.

In some non-limiting embodiments, the worldview's perception envelope may be developed by mapping the dynamic relationships assembled by dynamic envelope element-command string linker 418*fk* with the outputs of object-actor extrinsic procedure and model layers set 418*fa*, the object-actor intrinsic procedure and model layers set 418*fb*, the object-actor behavior procedure and model layers set 418*fc*, the boundaries/constraints/rules procedure and model layers set 418*fd*, and/or the like.

In some non-limiting embodiments, object-actor extrinsic procedure and model layers set 418*fa* may access and/or perform operations on the in-memory fused environment sensor data 440*g* and current worldview relational interaction map data 450*a*, e.g., in order to perform operations that generate output that may be communicated to worldview map aggregate emergence procedure and model layers set 418*fl*. In some non-limiting embodiments, object-actor extrinsic procedure and model layers set 418*fa* may classify the object-actors comprising the environment and/or provide outputs including information about the object-actor and/or tracking assignment. In some non-limiting embodiments, object-actor geometries and/or other related dimension types may be added as information assigned to worldview map elements. In some non-limiting embodiments, object-actor extrinsic procedure and model layers set 418*fa* may employ use of elapsed worldviews and current worldview relational interaction map data 450*a* to perform operations that use changes occurring in respect to features of interest as inputs to operations thereof. In some non-limiting embodiments, object-actor extrinsic procedure and model layers set 418*fa* may update the worldview map elements with the classifications. In some non-limiting embodiments, worldview map aggregate emergence procedure and model layers set 418*fl* may receive extrinsic classifications and/or attributes updates and/or incorporate with assignment to worldview map elements in the worldview map update (e.g., updated worldview relational interaction map data 450*b*).

In some non-limiting embodiments, object-actor intrinsic procedure and model layers set 418*fb* may access fused environment sensor data 440*g* and current worldview relational interaction map data 450*a*, e.g., to perform operations that generate output that may be sent to worldview map aggregate emergence procedure and model layers set 418*fl*. In some non-limiting embodiments, object-actor intrinsic procedure and model layers set 418*fb* may look up the object-actor classification assignments on the elements of current worldview relational interaction map 450*a* and/or reference precomputed intrinsic parameters and characteristics of the object-actors. For example, such parameters may include object-actor mass, density, and/or deformation elasticity. In some non-limiting embodiments, object-actor intrinsic procedure and model layers set 418*fb* may cross-reference corresponding object-group element assignments on the worldview with corresponding unabstracted elements in fused environment sensor data 440*g* to infer intrinsic attributes. In some non-limiting embodiments, object-actor intrinsic procedure and model layers set 418*fb* may employ elapsed worldviews (e.g., WRIMs) and current worldview relational interaction map 450*a* to perform operations that use changes occurring with respect to features of interest as inputs to operations thereof. In some non-limiting embodiments, object-actor intrinsic procedure and model layers set 418*fb* may communicate intrinsic attributes of object-actors to worldview elements across all in time horizon command decision cycles to worldview map aggregate emergence procedure and model layers set 418*fl* for incorporation onto command decision cycle demarcated dynamic envelope elements and perception envelope elements in the next worldview map update.

In some non-limiting embodiments, object-actor behavior procedure and model layers set 418*fc* may access fused environment sensor data 440g and current worldview relational interaction map data 450a in order to perform operations to generate output that may be sent to worldview map aggregate emergence procedure and model layers set 418fl. In some non-limiting embodiments, object-actor behavior procedure and model layers set 418fc may retain object-actor dispositions from the worldviews of elapsed command decision cycles. In some non-limiting embodiments, object-actor behavior procedure and model layers set 418fc may use the disposition state to track live behavior consisting of the current and recent, as well as the precomputed possible and likely future predicted state of an object-actor. In some non-limiting embodiments, object-actor behavior procedure and model layers set 418fc may employ use of elapsed worldviews (e.g., WRIMS) and current worldview relational interaction map data 450a to perform operations that use changes occurring in respect to features of interest as inputs to operations thereof. In some non-limiting embodiments, object-actor behavior procedure and model layers set 418fc may use the current worldview relational interaction map data 450a to determine available dynamic envelope elements representing the dynamic state spread over CDCs, and such use and determination may enable behavior prediction to perform operations accounting for the dynamic state of host platform controlled dynamical system 420. Additionally or alternatively, producing prediction outputs capturing observer-effect may be shaped in relation to the dynamic potential of the host platform. In some non-limiting embodiments, object-actor behavior procedure and model layers set 418fc may communication a probabilities distribution of an object-actor occupying a dynamic envelope element along with the dynamic state(s) the object-actor is predicted to hold in occupying the dynamic envelope element. In some non-limiting embodiments, this object-actor dynamic state occupation probabilities distribution may be assigned to all applicable dynamic envelope elements across all in time horizon command decision cycles to worldview map aggregate emergence procedure and model layers set 418fl for incorporation into dynamic envelope elements in the next worldview map update. In some non-limiting embodiments, object-actor behavior procedure and model layers set 418fc may distribute object-actor disposition probabilities across the worldview map CDC demarcated dynamic envelope elements and perception envelope elements. In some non-limiting embodiments, consistent with the nature of the WRIM, object-actors' dynamic states may be relative to the host platform controlled dynamical system 420 (e.g., object-actors' dynamic states may be occupying a dynamic envelope element).

In some non-limiting embodiments, boundaries, constraints, and/or rules may be imposed constraints, conditions, and/or boundaries that require, limit, and/or advise on the prohibited and/or permitted use and operation of host platform controlled dynamical system 420. For example, rule constraints, conditions, and/or boundaries may be imposed by parties independent of the operator of host platform controlled dynamical system 420, e.g., to synchronize, de-conflict, provide right-of-way, and/or provide dynamic state guidance and/or restrictions to host platform controlled dynamical system 420 (e.g., that may otherwise have unconstrained dynamic envelope) to which it should and/or must comply.

In some non-limiting embodiments, boundaries/constraints/rules procedure and model layers set 418fd may access fused environment sensor data 440g and/or current worldview relational interaction map data 450a in order to perform operations that generate output that may be sent to worldview map aggregate emergence procedure and model layers set 418fl. In some non-limiting embodiments, boundaries/constraints/rules procedure and model layers set 418fd may use classification information in current worldview relational interaction map data 450a and/or perform operations to determine the presences of extrinsically expressed and/or otherwise inferred (e.g., implicit and/or the like) boundaries, constraints, and/or rules in the operating environment. In some non-limiting embodiments, boundaries/constraints/rules procedure and model layers set 418fd may employ use of elapsed worldviews (e.g., WRIMs) and/or current worldview relational interaction map data 450a to perform operations that may use changes occurring with respect to features of interest as inputs to its operations. In some non-limiting embodiments, boundaries/constraints/rules procedure and model layers set 418fd, during or after determining the presence of any boundaries, constraints, and/or rules, may determine the applicability of any present boundaries, constraints, and/or rules. Additionally or alternatively, upon making determination of presence and/or applicability, boundaries/constraints/rules procedure and model layers set 418fd may communicate boundary, constraints, and/or rules to worldview map aggregate emergence procedure and model layers set 418fl for incorporation onto command decision cycle demarcated dynamic envelope elements and perception envelope elements in the next worldview map update.

In some non-limiting embodiments, momentum exchange determination procedure and model layers set 418ff may access current worldview relational interaction map data 450a in order to perform operations that generate output that may be communicated to worldview map aggregate emergence procedure and model layers set 418fl. In some non-limiting embodiments, momentum exchange determination procedure and model layers set 418ff may use the information about object-actor classification, intrinsic attributes, and/or behavior probability distribution contained in the dynamic envelope elements of current worldview relational interaction map data 450a to perform operations to determine the probabilities and magnitudes of resultant momentum exchange in the event that the host platform controlled dynamical system 420 and an object-actor both occupy a dynamic envelope element in the same CDC, relating probabilities of co-occupation, masses, and/or velocities of host platform controlled dynamical system 420 and the object-actor. In some non-limiting embodiments, momentum exchange determination procedure and model layers set 418ff may perform operations that handle behavior predictions as occupation probabilities, where momentum exchange may be the relationship of occupancy probability, masses, and velocities. In some non-limiting embodiments, momentum exchange determination procedure and model layers set 418ff may employ elapsed worldviews (e.g., WRIMs) and current worldview relational interaction map data 450a to perform operations that use changes occurring with respect to features of interest as inputs to its operations. In some non-limiting embodiments, momentum exchange determination procedure and model layers set 418ff may spread the object-actor's probability distribution over a greater number of dynamic envelope elements, and if so, the momentum exchange event probability may be spread in manner that results in lesser exchange levels being achieved. In some non-limiting embodiments, as CDCs elapse and probability distribution tightens, the threshold passing dynamic envelope elements may increase and/or may have a more limited distribution. In some non-limiting embodiments, momentum exchange determination procedure and model layers set 418*ff* may, upon making determination of resultant momentum exchange, communicate momentum exchange information to the worldview map aggregate emergence procedure and model layers set 418*fl*.

In some non-limiting embodiments, geospatial map to worldview map orientation manager 418*fi* may perform operations to relate a geospatial reference map, which may be used by ROE command and measurement device 410 for strategic and/or operational level command(s), e.g., to the WRIM. In some non-limiting embodiments, geospatial map to worldview map orientation manager 418*fi* may access the current worldview relational interaction map data 450*a* and in-memory sections of a geospatial reference map from the command module 418*i*. In some non-limiting embodiments, geospatial map to worldview map orientation manager 418*fi* may perform operations on current worldview relational interaction map data 450*a* using attributes classified by the boundaries/constraints/rules procedure and model layers set 418*fd* and object-actor extrinsic procedure and model layers set 418*fa* that embody boundaries and geometries that can be used to align and/or match with features in the geospatial reference map. In some non-limiting embodiments, geospatial map to worldview map orientation manager 418*fi* may also use GPS, GNSS, another available beacon or transponder type location reference system, and/or the like to orient a geospatial reference map in relation to the WRIM.

In some non-limiting embodiments, geospatial map to worldview map orientation manager 418*fi* may relate the WRIM to a geospatial map in a manner to enable lower precision requirements for geospatial map position localization (e.g., compared to certain other approaches to autonomy in which motion planning processes require high precision such that GPS/GNSS is not sufficient and require use of a high definition three-dimensional Map constructed for localization reference to achieve the required position precision). In some non-limiting embodiments, this may include a high computational cycle cost.

In some non-limiting embodiments, in the absence or loss of geospatial reference map or external positioning systems, ROE command and measurement device 410 may still maintain localization and pose in relation to the worldview (e.g., WRIM). In some non-limiting embodiments, ROE command and measurement device 410 may still able to generate a ROE and execute command within the ROE. In some applications no geospatial reference map may be required or provided. In some non-limiting embodiments, in applications where strategic and operational goals including routing and navigation require use of a geospatial reference map, ROE command and measurement device 410 may detect a loss and/or absence of a geospatial reference map, external communications, and/or positioning system (e.g. GPS, GNSS, and/or the like) network connectivity, and/or ROE command and measurement device 410 may still be able to determine implied goals to maintain operation by means of use of the ROE and, within the ROE and with a set of contingency handling instructions stored in the safety and operating performance, optimization threshold guidance manager 418*if*, may either seek to position host platform controlled dynamical system 420 in a safe-seek mode holding position until communications are reestablished and/or continue in a connectivity-seek mode to command the host platform within the ROE in order to move out of the communications loss area and reestablish communications and/or positioning system network connectivity in another area.

In some non-limiting embodiments, goal placement module 418*fg* may receive and/or accesses geospatial map data, command goals and limits guidance data 440*a* (e.g., from command module 418*i*), current worldview relational interaction map 450*a*, and/or the like to perform operations to set active goals in the dynamic envelope element(s) that meet goal state criteria. In some non-limiting embodiments, goal placement module 418*fg* may communicate goal dynamic occupation element assignment and state conditions output to the worldview map aggregate emergence procedure and model layers set 418*fl* for incorporation onto dynamic envelope elements and/or perception envelope elements in the next worldview map update (e.g., updated worldview relational interaction map 450*b*). In some non-limiting embodiments, dynamic envelope element-command string linker 418*fk* and element limits module 418*fh* may use the output in subsequent CDCs to identify command string bundles for the command module and/or to prioritize the element development to achieve the goal.

In some non-limiting embodiments, for measurement uses, ROE command and measurement module 410 may be able to develop a WRIM and ROE without known goals. Additionally or alternatively, the ROE command and measurement module 410 may perform operations to infer what the goal was based on computing the where the controlled dynamical system is located as the goal of elapsed CDCs.

In some non-limiting embodiments, confidence-uncertainty values may capture the level of developed confidence (e.g., certainty, probability, lack of uncertainty, surety, and/or the like) ROE command and measurement device 410 (and/or modules 418 thereof), e.g., with the current CDC and/or as a matter of a pattern the change of confidence (e.g., certainty, probability, lack of uncertainty, surety, and/or the like) levels over the course of elapsed CDCs in a prediction, classification, and/or probability distribution constituting elements and/or attributed to elements of worldview. For example, factors affecting confidence and uncertainty levels may include sensor data quality, distortion/optical glare/noise in sensor data, obstructed, obfuscated volumes depths, and/or the like occurring in the field of view, e.g., where other object-actors could reside but are otherwise unobserved; initial perception of a new object-actor where no track history is present; DTIES values from past CDCs deviating from the prediction; and/or the like. In some non-limiting embodiments worldview module 418*f* may assign values pertaining to dedicated purpose that may include probabilities with the confidence in the probability and/or the uncertainty accompanying the issued probability. For example, confidence and uncertainty procedure and model layers set 418*fe* may perform operations to aggregate the set of probability confidence and uncertainty levels along with operations that may increase confidence/lower uncertainty, and/or the like.

In some non-limiting embodiments, confidence and uncertainty procedure and model layers set 418*fe* may receive current worldview relational interaction map 450*a* to perform operations to determine (e.g., sum and/or the like) the confidence-uncertainty reported and assigned to elements in the WRIM by other modules of ROE command and measurement device 410 and/or worldview module 418*f*. In some non-limiting embodiments, confidence and uncertainty procedure and model layers set 418*fe* may weight confidence-uncertainty from other modules of ROE command and measurement device 410 and/or worldview module 418*f*. In some non-limiting embodiments, confidence and uncertainty procedure and model layers set 418*fe* may output a combined confidence-uncertainty classification for elements in the worldview to the worldview map aggregate emergence procedure and model layers set 418*fl*.

In some non-limiting embodiments, worldview map aggregate emergence procedure and model layers set 418*fl* may receive and/or accesses the current worldview relational interaction map data 450*a* and the outputs of all or some of the other modules (e.g., sub-modules) of worldview modules 418*f* to performs operations including combining the updated dynamic envelope and perception envelope elements with update relational dimensions, geometries, classifications, attributes, properties, and probabilities. In some non-limiting embodiments, the combined output worldview map aggregate emergence procedure and model layers set 418*fl* may include the updated worldview relational interaction map 450*b*.

In some non-limiting embodiments, at device start up and/or turning on (e.g., of ROE command and measurement device 410), worldview module 418 and/or the modules (e.g., sub-modules) thereof may initialize off of received normalized sensor feed information of senses environment and state of host platform controlled dynamical system 420 (e.g., when the device initializes at startup and there is no current worldview relational interaction map 450*a*).

In some non-limiting embodiments, updated worldview relational interaction map 450*b* may be made available to the worldview module 418*f* as the current worldview relational interaction map 450*a*, which may also be communicated and/or otherwise made available to predicted reasonable operating envelop module 418*h*.

Figure 4E:
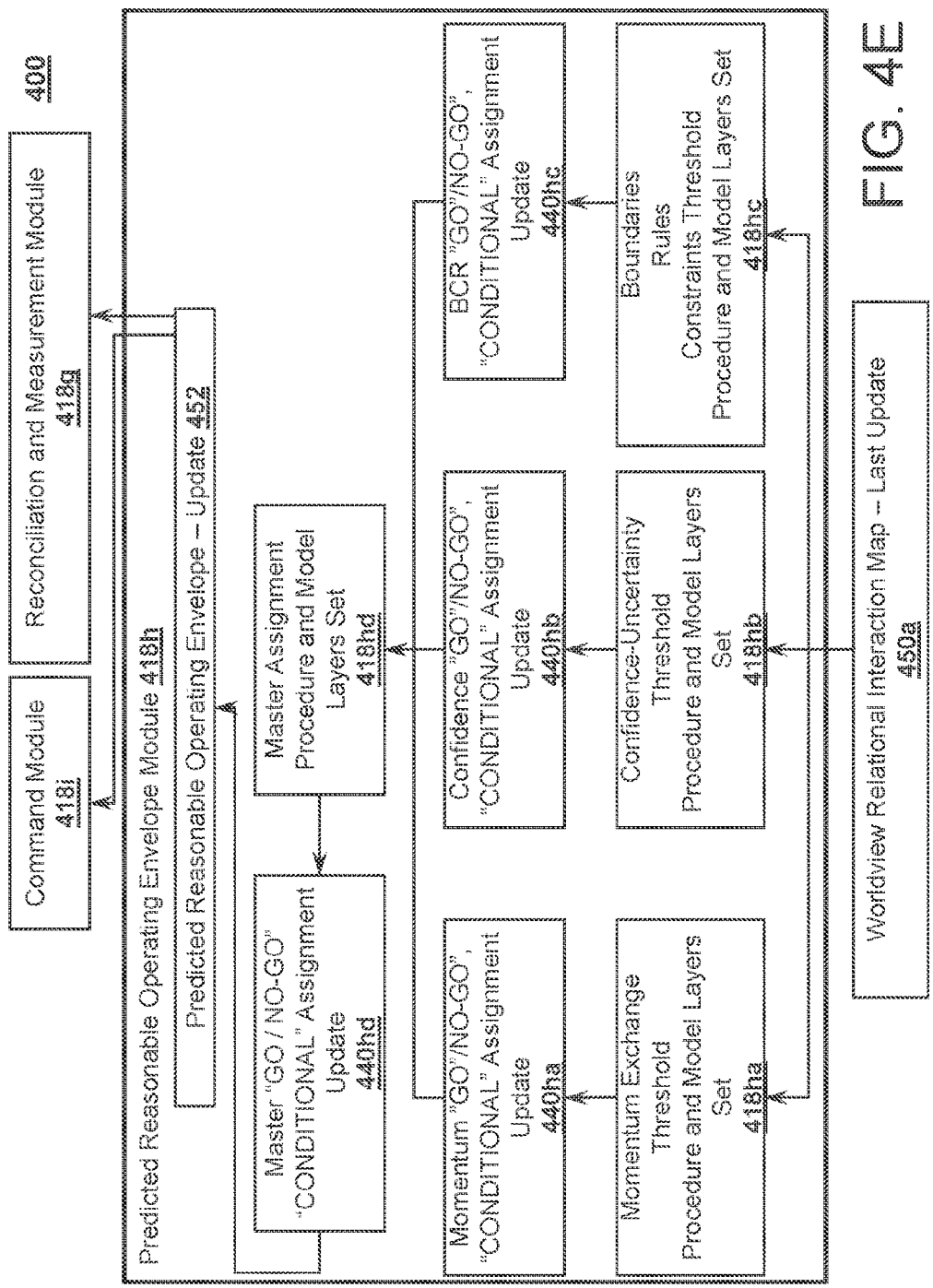

Referring to FIG. 4E, in some non-limiting embodiments, predicted reasonable operating envelope module 418*h* may receive at least on input. For example, predicted reasonable operating envelope module 418*h* may receive current worldview relational interaction map data 450*a* as input. In some non-limiting embodiments, predicted reasonable operating envelope module 418*h* may include a plurality of modules (e.g., sub-modules and/or the like). For example, predicted reasonable operating envelope module 418*h* may include at least one of momentum exchange threshold procedure and model layers set 418*ha*, confidence-uncertainty threshold procedure and model layers set 418*hb*, boundaries rules constraints (BRC) threshold procedure and model layers set 418*hc*, master assignment procedure and model layers set 418*hd*, any combination thereof, and/or the like.

In some non-limiting embodiments, at least a subset of the modules (e.g., sub-modules and/or the like) of predicted reasonable operating envelope module 418*h* may receive at least a subset of the inputs (e.g., current worldview relational interaction map data 450*a*) and generate outputs based thereon. For example, each of momentum exchange threshold procedure and model layers set 418*ha*, confidence-uncertainty threshold procedure and model layers set 418*hb*, and/or BRC threshold procedure and model layers set 418*hc* may receive current worldview relational interaction map data 450*a* as input. Additionally or alternatively, momentum exchange threshold procedure and model layers set 418*ha* may generate momentum go/no-go/conditional assignment update data 440*ha* (e.g., as output) based on the input thereto. Additionally or alternatively, confidence-uncertainty threshold procedure and model layers set 418*hb* may generate confidence go/no-go/conditional assignment update data 440*hb* (e.g., as output) based on the input thereto. Additionally or alternatively, BRC threshold procedure and model layers set 418*hc* may generate BRC go/no-go/conditional assignment update 440*hc* (e.g., as output) based on the input thereto.

In some non-limiting embodiments, the outputs of at least a subset of the modules (e.g., sub-modules and/or the like) of predicted reasonable operating envelope module 418*h* may be provided as inputs to master assignment procedure and model layers set 418*hd*, which may generate at least one output based thereon. For example, the outputs of each of momentum exchange threshold procedure and model layers set 418*ha*, confidence-uncertainty threshold procedure and model layers set 418*hb*, and/or boundaries rules constraints (BRC) threshold procedure and model layers set 418*hc* may be provided as inputs to master assignment procedure and model layers set 418*hd*, which may generate at least one output based thereon. For example, master assignment procedure and model layers set 418*hd* may generate predicted reasonable operating envelope data 452 associated with a predicted reasonable operating envelope based on the inputs thereto. In some non-limiting embodiments, the output (e.g., predicted reasonable operating envelope data 452) of master assignment procedure and model layers set 418*hd* may be provided (e.g., as input) to other modules 418 of ROE command and measurement device 410. For example, the output (e.g., predicted reasonable operating envelope data 452) of master assignment procedure and model layers set 418*hd* may be provided to reconciliation and measurement module 418*g* and/or command modules 418*i*.

In some non-limiting embodiments, a threshold momentum exchange event may include a collision, interaction between the host platform controlled dynamical system 420 and another entity (e.g., object-actor) in the operating environment, and/or the like for which resultant momentum exchange satisfies a threshold that causes an unacceptable dynamic state, failure in use case goals, undesirable bodily and/or property damage, any combination thereof, and/or the like. For example, in some non-limiting embodiments, ROE command and measurement device 410 may seek to affect a desired momentum exchange event, and the aforementioned techniques may be applied and/or tailored to achieving a goal of the desired momentum exchange and/or still otherwise avoid momentum exchange events which would impede host platform controlled dynamical system 420 from obtaining its goal. In some non-limiting embodiments, thresholds may have a predetermined value (e.g., set arbitrarily, set based on experienced based learned models, and/or the like).

In some non-limiting embodiments, the predicted ROE module 418*h* may access current worldview relational interaction map data 450*a* to performs operations using the momentum exchange probabilities, confidence-uncertainty, and/or boundary/constraints/rules information in the WRIM mapped dynamic envelope elements. In some non-limiting embodiments, momentum exchange threshold procedure and model layers set 418*ha*, confidence-uncertainty threshold procedure and model layers set 418*hb*, and/or boundaries rules constraints threshold procedure and model layers set 418*hc* may reference stored threshold criteria for momentum exchange, confidence-uncertainty, and/or boundary/constraints/rules, respectively, to perform operations to set "GO," "NO-GO," and/or "CONDITIONAL" assignments to dynamic envelope elements. Additionally or alternatively, dynamic envelope elements may be evaluated to determine if they meet threshold acceptable criteria. Additionally or alternatively, those acceptable are assigned "GO", those unacceptable are assigned "NO-GO," and "CONDITIONAL" may be assigned for threshold criteria pertaining to constraint-boundary-rule and confidence-uncertainty. For example, "CONDITIONAL" assignment dynamic envelope elements remain as reasonable dynamic envelope elements to occupy under certain conditional criteria, e.g., no other "GO" dynamic envelope elements being available. In some non-limiting embodiments, the corresponding command strings belonging to those "NO-GO" dynamic envelope elements may be marked as "NO-GO" and/or may be purged from viable command strings available for active command issuance, along with CDC future dynamic envelope elements. Additionally or alternatively, the dynamic envelope elements with "GO" values and their corresponding command strings may be predicted to be in the ROE. Additionally or alternatively, the predicted ROE may be passed to the command module 418$i$, probability collapse capture module 418$ga$ of reconciliation and measurement module 418$g$, operator measurement module 418$gc$ of reconciliation and measurement module 418$g$, and/or the like. In some non-limiting embodiments, predicted ROE module 418$h$ may operate conservatively such that all dynamic envelope elements default to "NO-GO" assignments and require positive assignment to a "GO" status. Additionally or alternatively, the module may operate more permissively with an initial status of "GO" (and/or "CONDITIONAL"). In some non-limiting embodiments, the ROE may reside only in the dynamic envelope including the dynamic envelope elements in the WRIM.

In some non-limiting embodiments, with respect to the ROE, spatial areas and/or volumes may be presented that are constrained by time requirements. For example, traffic lights (e.g., red and/or green lights) may have such constrained time requirements. Additionally or alternatively, with such requirements, the ROE may only assign the "GO/NO-GO" statuses to the CDCs (a reference to event-time context) where the constraining requirement is determined to be in effect.

In some non-limiting embodiments, additional sub-envelopes may be generated based on the same and/or similar method by which the ROE is generated, e.g., using other criteria. For examples, dynamic envelope elements may be evaluated for threshold criteria such as least travel time, least energy expended, least distance, passenger-occupant ride comfort, and/or the like. Additionally or alternatively, such additional sub-envelopes may use the "CONDITIONAL" assignment for dynamic envelope elements unacceptable to the threshold criteria.

Figure 4F:
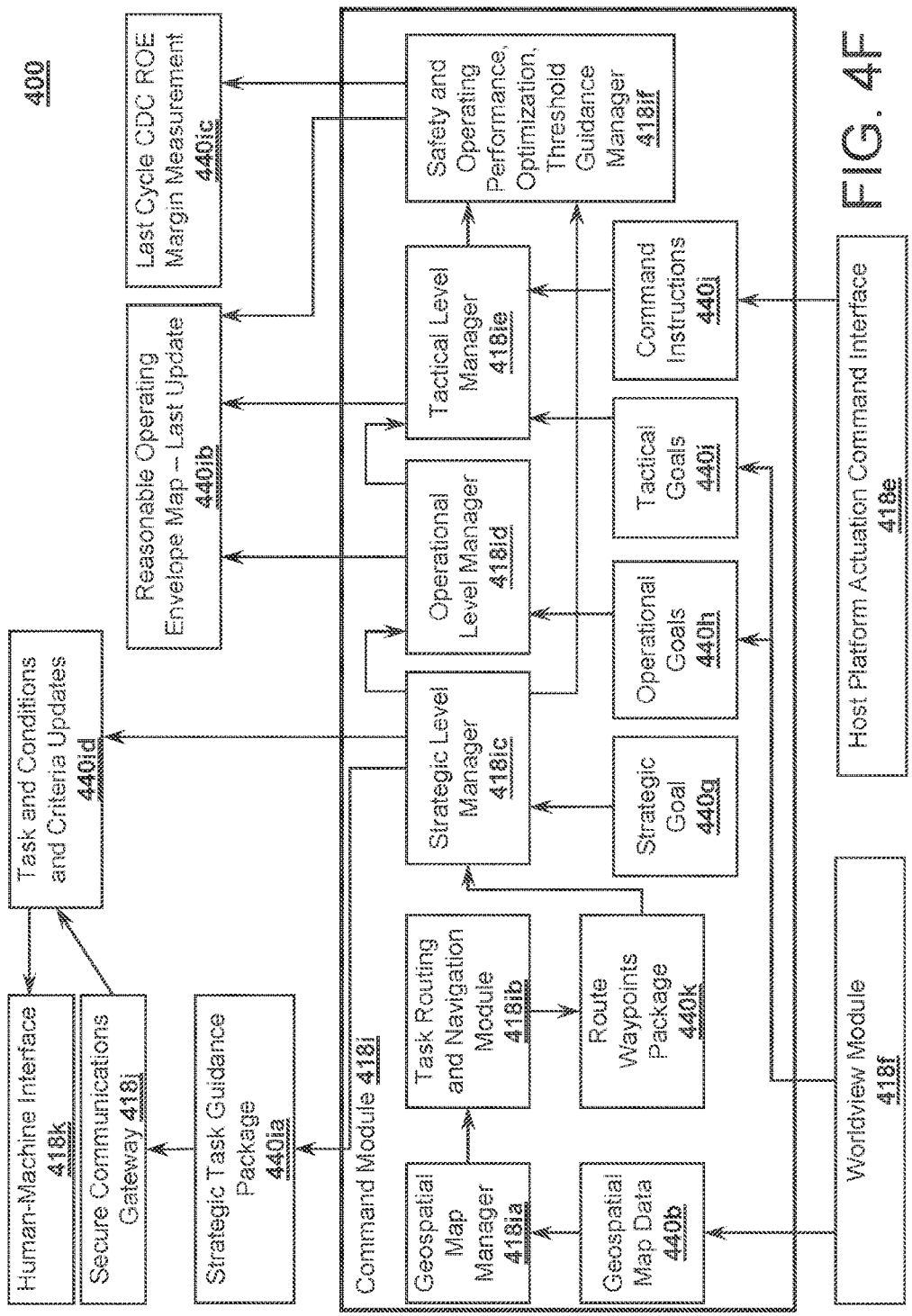

Referring to FIG. 4F, in some non-limiting embodiments, command module 418$i$ may receive at least on input. For example, command module 418$i$ may receive the output (e.g., current worldview relational interaction map data 450$a$) of worldview module 418$f$, data from host platform actuation command interface 418$e$, any combination thereof, and/or the like as inputs. Additionally or alternatively, command module 418$i$ may receive geospatial map data 440$b$, strategic goal data 440$g$ associated with at least one strategic goal, operational goals data 440$h$ associated with at least one operational goal, tactical goals data 440$i$ associated with at least one tactical goal, command instructions data 440$j$ associated with at least one command instruction, last cycle command decision cycle (CDC) ROE margin measurement data 440$gc$ associated with at least a CDC ROE margin measurement of a most recent previous cycle, any combination thereof, and/or the like as inputs.

In some non-limiting embodiments, command module 418$i$ may include a plurality of modules (e.g., sub-modules and/or the like). For example, command module 418$i$ may include at least one of geospatial map manager 418$ia$; task routing and navigation 418$ib$; strategic level manager 418$ic$; operational level manager 418$id$; tactical level manager 418$ie$; safety and operating performance, optimization, threshold guidance manager 418$if$; any combination thereof, and/or the like.

In some non-limiting embodiments, at least a subset of the modules (e.g., sub-modules and/or the like) of command module 418$i$ may receive at least a subset of the inputs and generate outputs based thereon. For example, geospatial map manager 418$ia$ may receive geospatial map data 440$b$ and generate an output based thereon. Additionally or alternatively, task routing and navigation module 418$ib$ may receive the output of geospatial map manager 418$ia$ and/or the like as input and generate an output (e.g., route waypoints package data 440$k$ associated with at least one route waypoint) based thereon. Additionally or alternatively, strategic level manager 418$ic$ may receive the output (e.g.; route waypoints package data 440$k$ and/or the like) of task routing and navigation module 418$ibm$ and/or strategic goal data 440$g$ as input. Additionally or alternatively, operational level manager 418$id$ may receive operational goals data 440$h$ as inputs. Additionally or alternatively, tactical level manager 418$ie$ may receive tactical goals data 440$i$ and/or command instructions data 440$j$ as inputs. Additionally or alternatively, safety and operating performance, optimization, threshold guidance manager 418$if$ may receive last cycle CDC ROE margin measurement data 440$gc$ as input. Additionally or alternatively, the outputs of any of the modules (e.g., sub-modules and/or the like) of command module 418$i$ may be provided as inputs to any of the other modules (e.g., sub-modules and/or the like) of command module 418$i$.

In some non-limiting embodiments, strategic level manager 418$ic$ may generate at least one output based on the inputs thereto. For example, strategic level manager 418$ic$ may generate (e.g., as outputs) strategic task guidance package data 440$ia$, task and conditions and criteria updates data 440$id$, any combination thereof, and/or the like. Additionally or alternatively, the outputs (e.g., strategic task guidance package data 440$ia$ and/or task and conditions and criteria updates data 440$id$) may be provided to at least one of secure communications gateway module 418$j$ and/or human-machine interface 418$k$.

In some non-limiting embodiments, ROE map data 440$ib$ associated with at least one ROE map may be generated. For example, command module 418$i$ may generate ROE map data 440$ib$ based on the outputs of at least one of operational level manager 418$id$; tactical level manager 418$ie$; safety and operating performance, optimization, threshold guidance manager 418$if$; any combination thereof, and/or the like.

In some non-limiting embodiments, command module 418$i$ receives predicted reasonable operating envelope 452, user tasks with conditions and criteria (e.g., from onboard human-machine interface 418$k$ and/or over secure communications gateway module 418$j$ and/or the like), and/or the like. In some non-limiting embodiments, an onboard machine-to-machine interface may be used for other systems independent of ROE system 102 (e.g., to send tasks to ROE system 102 and/or the like).

In some non-limiting embodiments, command module 418$i$ may identifies the command strings that converge and terminate at the time horizon of dynamic envelope in the WRIM that do not have any worldview dynamic envelope elements residing outside of the ROE. Additionally or alternatively, command modules 418$i$ may selects from the emergent tactical command plans available and selects at least one command string (e.g., the optimal command string(s)). Optimization parameters are determined by ROE system 102, ROE command and measurement device 410, and/or the implementer thereof and/or may be tailored to the domain use case. For example, parameters may include minimized energy expenditure, minimalized acceleration, maximum speed, minimum time (e.g., in the case of a tolerable range to reach a dynamic envelope element the set time goal horizon), and/or the like. Additionally or alternatively, once the (e.g., optimal) command string is selected, the command string may be it sent to the actuator interface to transmit to the actuators of host platform controlled dynamical system 420.

In some non-limiting embodiments, strategic level command may be the command and decision responsibility to the set goals-command decision pertaining to achieving the user set strategic task. Additionally or alternatively, strategic level command may be responsible for developing intermediate waypoints to accomplish the end state of the strategic goal. In some non-limiting embodiments, the strategic level sets waypoints for use by the operational level to translate into operational level goals.

In some non-limiting embodiments, strategic level manager 418*ic* may receive task and conditions and criteria updates 440*id* and/or strategic task guidance package data 440*ia* (e.g., from human machine interface 418*k*, asset task and management device 106 via secure communications gateway module 418*j*, and/or the like). In some non-limiting embodiments, the manager may performs operations to set a strategic level command goal (e.g., 440*g*) that meets the objective and desired end state of the assigned task, conditions and criteria, and/or instructed guidance. Additionally or alternatively, strategic level manager 418*ic* manager may disseminates applicable instructions to operational level manager 418*id*, tactical level manager 418*ie*, and/or safety and operating performance, optimization, threshold guidance manager 418*if*. In some non-limiting embodiments, strategic level manager 418*ic* may determine and/or set waypoints for operational level manager 418*id* to accomplish sending goal updates (e.g., operational goals 440*h*, task and conditions and criteria updates 440*id*, route waypoints package 440*k*, and/or the like), e.g., to the WRIM (e.g., worldview module 418*f*) and/or task routing and navigation module 418*ib* for tracking strategic level goals and waypoints in reference to a geospatial reference map (e.g., geospatial map data 440*b*) and the worldview (e.g., WRIM).

In some non-limiting embodiments, an operational level command may include the command and decision responsibility to the set goals within the predicted ROE at or near the time horizon CDC band(s) that further the achievement of the strategic goal 440*g*. Additionally or alternatively, the operational level may be responsible for translating strategic command level issued waypoints and end state into operational level goals (e.g., operational goals 440*h*) for incorporation in the WRIM.

In some non-limiting embodiments, operational level manager 418*id* may perform operations to determine implied tasks to achieve the strategic level waypoints and end state. In some non-limiting embodiments, operational level manager 418*id* may receive waypoints from strategic level manager 418*ic* and/or the predicted ROE. Additionally or alternatively, operational level manager 418*id* may perform operations to translate the waypoints into goals with WRIM/ROE related dynamic states and CDC-time-event occurrence that enable reaching (e.g., enable host platform controlled dynamical system 420 to reach) the strategic command level set waypoints and/or end goal. In some non-limiting embodiments; operational level manager 418*id* may affirm and/or updates the operational goal in and for each CDC, ensuring that the operational goal progresses towards the targeted waypoint. In some non-limiting embodiments; operational level manager 418*id* may communicate operational level goals as output to tactical level manager 418*ie* and/or worldview module 418*f*, e.g., as CDC bands elapse. In some non-limiting embodiments, operational level manager 418*id* the output of the operational level manager may include a set of worldview dynamic envelope elements that serve as operational level goals that meet the desired dynamic state. Additionally or alternatively, if tolerance is permitted, the set of worldview dynamic envelope elements may be of varying inclusive dynamic state and CDC band range tolerances.

In some non-limiting embodiments, goals may be placed on dynamic envelope elements already developed by worldview module 418*f*. In some non-limiting embodiments, the manager (e.g., strategic level manager 418*ic*, operational level manager 418*id*, and/or tactical level manager 418*ie*) may selects at least one (e.g., a group of) dynamic envelope element(s) that should be set as the goal and/or adopts the predicted dynamic state(s) of those element(s). In some non-limiting embodiments, the manager (e.g., strategic level manager 418*ic*, operational level manager 418*id*, and/or tactical level manager 418*ie*) may also place goals independent of a worldview developed dynamic envelope element. For example, the respective manager (e.g.; strategic level manager 418*ic*, operational level manager 418*id*, and/or tactical level manager 418*ie*) may place one or more element markers that contain the goal task and standards which may include the goal's position, velocity, acceleration, carrying momentum, CDC arrival corresponding to a user-determined time standard and/or a count of CDCs in which the goal must be obtained, and/or the like. In some non-limiting embodiments, the goal parameters may also include precision tolerance ranges for position velocity, acceleration, carrying momentum, and/or CDC arrival with tolerance priority.

In some non-limiting embodiments, a tactical level command may include the command and decision responsibility to adopt the operational goal as the tactical goal and/or otherwise set goals within the predicted reasonable operating envelope to select and/or issue the actuator command set instructions to achieve the current goal. In some non-limiting embodiments, by default, the operational level goal may also be the tactical level goal. Additionally or alternatively, tactical level manager 418*ie* may set tactical goals that precede the operational goal based on computational constraints and/or other criteria for meeting desired tactical level performance characteristics.

In some non-limiting embodiments, tactical level manager 418*ie* may perform operations to identify and/or down select to command strings with the ROE and connected to the current goal to issue actuator command set instructions to the host platform controlled dynamical system. In some non-limiting embodiments, tactical level manager 418*ie* may access the predicted ROE map data 440*ib*. Additionally or alternatively, tactical level manager 418*ie* may identify command strings that correspond to the worldview dynamic envelope elements overlapping with the assigned operational goal and/or otherwise set tactical goal. In some non-limiting embodiments, tactical level manager 418*ie* may exclude all command strings that violate the reasonable operating envelope. Additionally or alternatively, with remaining viable command strings, command module 418*i* may select at least one commend string (e.g., the command string that is optimal) as determined by set variable parameters (e.g., as determined by the strategic level manager 418*ic*, strategic goal 440*g*, operation level manager 418*id*, operational goals 440*h*, and/or tactical goals 440*i*). In some non-limiting embodiments, tactical level manager 418*ie* may parse the selected command string(s) to structure the string in CDC applicable actuator commands instructions 440*j*. In some non-limiting embodiments, tactical level manager 418*ie* may send the selected actuator command instructions 440*j* to host platform actuation command interface 418*e*. In some non-limiting embodiments, tactical level manager 418*ie* may output goal updates and/or selected command strings to worldview module 418*f*. In some non-limiting embodiments, tactical level manager 418*ie* may further down select ROE compliant command strings that meet additional criteria from the safety and operating performance, optimization, and threshold guidance manager 418*if*.

In some non-limiting embodiments, safety and operating performance, optimization, and threshold guidance manager 418*if* may maintain guidance instructions set by system implementers and/or users (e.g., via the secure communications gateway module 418*j* and/or human-machine interface 418*k*), e.g., that govern safety, operating performance, optimization, and/or thresholds. In some non-limiting embodiments, contingency handling instructions are stored for reference in case of a loss of external communication network connectivity, geospatial reference map, external positioning systems, and/or the like. In some non-limiting embodiments, command module 418*i* may act on instructions that may include seek-safe and/or connectivity-seek mode instructions. In some non-limiting embodiments, safety and operating performance, optimization, and threshold guidance manager 418*if* may include operations to monitor the CDC ROE margins and/or command ROE command and measurement device 410 to a seek-safe mode and/or critical mode goal. In some non-limiting embodiments, if the ROE system is used in hybrid command state and/or where another operator is in command of the host platform controlled dynamical system 420 and/or the ROE command and measurement device 410 retains an oversight and/or intervention command responsibility, safety and operating performance, optimization, and threshold guidance manager 418*if* may be configured to monitor CDC ROE margins for safety threshold criteria violations that merit the ROE command and measurement device 410 providing assistance and/or overriding command of host platform controlled dynamical system 420 in order to place host platform controlled dynamical system within an acceptable CDC ROE margin. In some non-limiting embodiments, safety and operating performance, optimization, and threshold guidance manager 418*if* may also maintain pre-configured and/or user updated performance and/or optimization criteria for reference by command module 418*i*. For example, performance and/or optimization criteria may be additional to the ROE threshold criteria and/or may include application specific considerations such as occupant comfort, customs and courtesies in maneuver behavior to other actors, energy efficiency, shortest distance, detection considerations, shortest time, velocity, and acceleration minimum and/or maximum limits, and/or the like. In some non-limiting embodiments, command level managers (e.g., strategic level manager 418*ic*, operational level manager 418*id*, and/or tactical level manager 418*ie*) may reference these criteria and/or adhere to such criteria if possible (e.g., if not overridden by the ROE in goal setting and command string instruction selection).

In some non-limiting embodiments, command module 418*i* may set context-based contingency goals determined in relation to the ROE. For example, a seek-safe mode goal may include a tactical level goal that takes priority and precedent over (e.g., may override) comfort and courtesy requirements and/or constraints and/or the operational and strategic goals in order to command the host platform controlled dynamical system 420 to reside in a dynamic envelope element within the ROE. Additionally or alternatively, a critical mode goal may include a tactical level goal that takes priority and precedent over (e.g., may override) legal, comfort, and/or courtesy requirements and/or constraints and/or the operational and/or strategic goals in order to command host platform controlled dynamical system 420 to reside in a dynamic envelope element within a ROE CDC margin in compliance with critical threshold criteria.

In some non-limiting embodiments, geospatial map manager 418*ia* may maintain geospatial map data 440*b* for strategic goal and/or operational waypoint and goal setting. For example, the geospatial map data 440*b* may be accessible to the strategic level manager 418*ic* and/or operational level manager 418*id* for route selection and/or goal and sub-goal setting, placement, and/or status tracking. Additionally or alternatively, geospatial map manager 418*ia* may communicate (e.g., serve) data for the command module 418*i* and/or communicate (e.g., serve) sections of geospatial map data 440*b* applicable to the context of the current WRIM to worldview module 418*f*. In some non-limiting embodiments, task routing and navigation module 418*ib* may be dedicated to developing criteria optimized routing and navigation packages (e.g., route waypoints package 440*k*) for use by the strategic level manager 418*ic* and/or operational level manager 418*id* to use for waypoint-goal development and/or tracking.

Figure 4G:
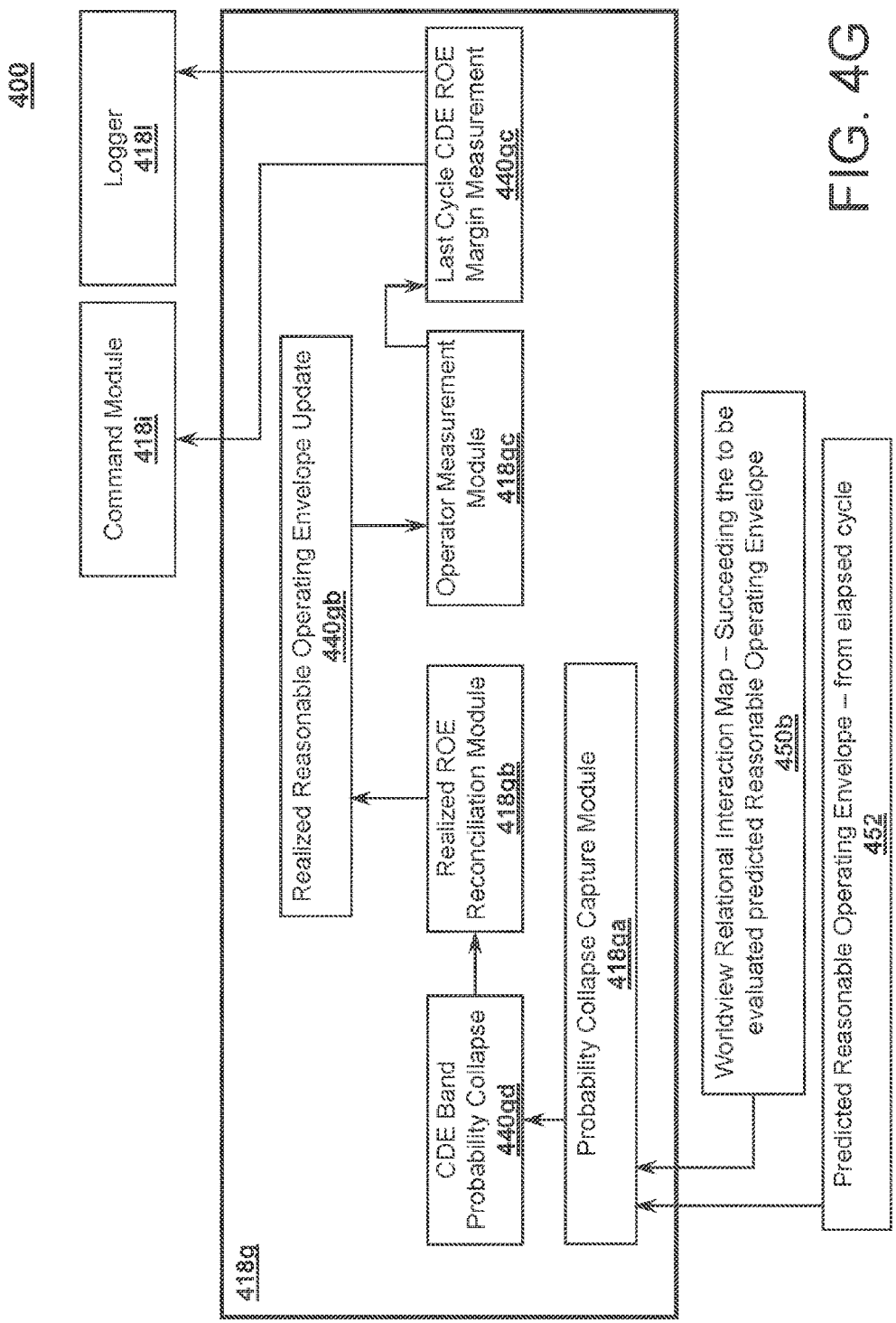

Referring to FIG. 4G, in some non-limiting embodiments, reconciliation and measurement module 418*g* may receive at least on input. For example, reconciliation and measurement module 418*g* may receive the output (e.g., current worldview relational interaction map data 450*a*) of worldview module 418*f*, the output (e.g., predicted reasonable operating envelope data 452) of predicted reasonable operating envelope module 418*h*, any combination thereof, and/or the like as inputs. In some non-limiting embodiments, reconciliation and measurement module 418*g* may include a plurality of modules (e.g., sub-modules and/or the like). For example, reconciliation and measurement module 418*g* may include at least one of probability collapse capture module 418*ga*, realized ROE reconciliation module 418*gb*, operator measurement module 418*gc*, any combination thereof, and/or the like.

In some non-limiting embodiments, at least a subset of the modules (e.g., sub-modules and/or the like) of reconciliation and measurement module 418*g* may receive at least a subset of the inputs and generate outputs based thereon. For example, probability collapse capture module 418*ga* may receive current worldview relational interaction map data 450*a* and/or predicted reasonable operating envelope data 452 and generate an output (e.g., CDC band probability collapse data 440*gd*) based thereon. Additionally or alternatively, realized ROE reconciliation module 418*gb* may receive the output (e.g., CDC band probability collapse data 440*gd*) of probability collapse capture module 418*ga* and generate an output (e.g., realized ROE update data 440*gb*) based thereon. Additionally or alternatively, operator measurement module 418*gc* may receive the output (e.g., realized ROE update data 440*gb*) of realized ROE reconciliation module 418*gb* and generate an output (e.g., last cycle CDC ROE margin measurement data 440*gc*) based thereon. Additionally or alternatively, the outputs of any of the modules (e.g., sub-modules and/or the like) of reconciliation and measurement module 418*g* may be provided as inputs to any of the other modules (e.g., sub-modules and/or the like) of reconciliation and measurement module 418*g*. In some non-limiting embodiments, the output (e.g., last cycle CDC ROE margin measurement data 440gc) of operator measurement module 418gc may be provided (e.g., as input) to other modules 418 of ROE command and measurement device 410. For example, the output (e.g., last cycle CDC ROE margin measurement data 440gc) of operator measurement module 418gc may be provided to command module 418i and/or logger 418l.

In some non-limiting embodiments, at completion of each CDC, the predicted probabilities in command decision elapsed CDC band of the WRIM may collapse. Additionally or alternatively, probability collapse capture module 418ga may perform operations on a sequence of information from at least one previous cycle of predicted ROE 452 to determine the actual dynamic envelope elements that were occupied and/or not occupied by object-actors in the elapse of the WRIM CDC band in the WRIM succeeding the WRIM on which the referenced predicted ROE 452 was generated. Additionally or alternatively, since the state of object-actors is now known for the elapsed cycle CDC band, the probabilities that previously existed may collapse in the elapsed CDC band. In some non-limiting embodiments, the probability collapse capture module 418ga may output probability collapsed information (e.g., CDC band probability collapse data 440ga) to realized ROE reconciliation module 418gb.

In some non-limiting embodiments, realized ROE reconciliation module 418gb may take the probability collapse values in the elapsed CDC band and/or update the dynamic envelope elements in the predicted ROE that have a dynamic envelope element realized occupation probability of zero to "GO." Additionally or alternatively, the dynamic envelope elements remaining with "go" values and their corresponding command strings may be included in the realized ROE (e.g., realized ROE envelope update data 440gb).

In some non-limiting embodiments, operator measurement module 418gc may counts the number of CDC bands that the controlled dynamical system was removed from the nearest CDC band occurring "NO-GO" dynamic envelope element in the realized ROE. The number of WRIM CDC bands the operator commanded and/or allowed the controlled dynamical system to occupy away and/or in the closest WRIM CDC band with a 'NO-GO" dynamic envelope element is the CDC ROE margin. In some non-limiting embodiments, performance may be measured for the elapsed CDC accounting for the operating environment context and/or dynamic state of host platform controlled dynamical system 420. In some non-limiting embodiments, CDC ROE margin may provide a measurement (e.g., normalized and/or objective measurement and/or the like) by which to compare the performance and capability of the operator of host platform controlled dynamical system 420. In some non-limiting embodiments, the elastic nature of the dynamic envelope (of which at least some of the elements constitute the ROE) may account for actual potential actions and/or outcomes that the operator did and/or could have commanded. In some non-limiting embodiments, a CDC ROE margin measurement is made for each cycle (e.g., last cycle CDC ROE margin measurement 440gc). Additionally or alternatively, using multiple CDC ROE margin measurements, operator measurement module 418gc may perform various analytical methods to determine the consistency and/or reliability of the capability of the operator (e.g., a human, a machine, and/or the like) to command host platform controlled dynamical system 420.

In some non-limiting embodiments, operator measurement module 418gc may send live and/or bundled (e.g., batch) measurements to off-board devices (e.g., of ROE system 102 and/or the like), in addition to and/or in lieu of logged data, via secure communications gateway module 418j. Additionally or alternatively, operator measurement module 418gc may thus reduce the size of data communicated from ROE command and measurement device 410. Additionally or alternatively, criteria may be set in operator measurement module 418gc, e.g., if certain CDC ROE margin tolerance thresholds are exceeded, larger log data samples of just the CDCs of interest may be packaged for transmission to off-board devices (e.g., of ROE system 102 and/or the like) for further review and evaluation.

Referring now to FIG. 5A, FIG. 5A is a diagram of an exemplary implementation 500a of a non-limiting embodiment relating to process 300 shown in FIG. 3. As shown in FIG. 5A, implementation 500a may include at least one set 510 of dynamic envelope elements 512a-d. For example, set 510 may include first dynamic envelope element 512a, second dynamic envelope element 512b, third dynamic envelope element 512c, fourth dynamic envelope element 512d, and/or the like. In some non-limiting embodiments, the dynamic envelope elements 512a-d may be combined (e.g., grouped, overlaid, superimposed, and/or the like) to form set 510.

Referring now to FIG. 5B, FIG. 5B is a diagram of an exemplary implementation 500b of a non-limiting embodiment relating to process 300 shown in FIG. 3. As shown in FIG. 5B, implementation 500b may include worldview relational interaction map 504b, which may include at least one set 510a-c of dynamic envelope elements 512. For example, first set 510a may include a first plurality of dynamic envelope elements 512, second set 510b may include a second plurality of dynamic envelope elements 512, third set 510c may include a third plurality of dynamic envelope elements 512, and/or the like. In some non-limiting embodiments, first set 510a-c may be combined (e.g., grouped, overlaid, superimposed, and/or the like) to form worldview relational interaction map 504b.

Figure 5C:
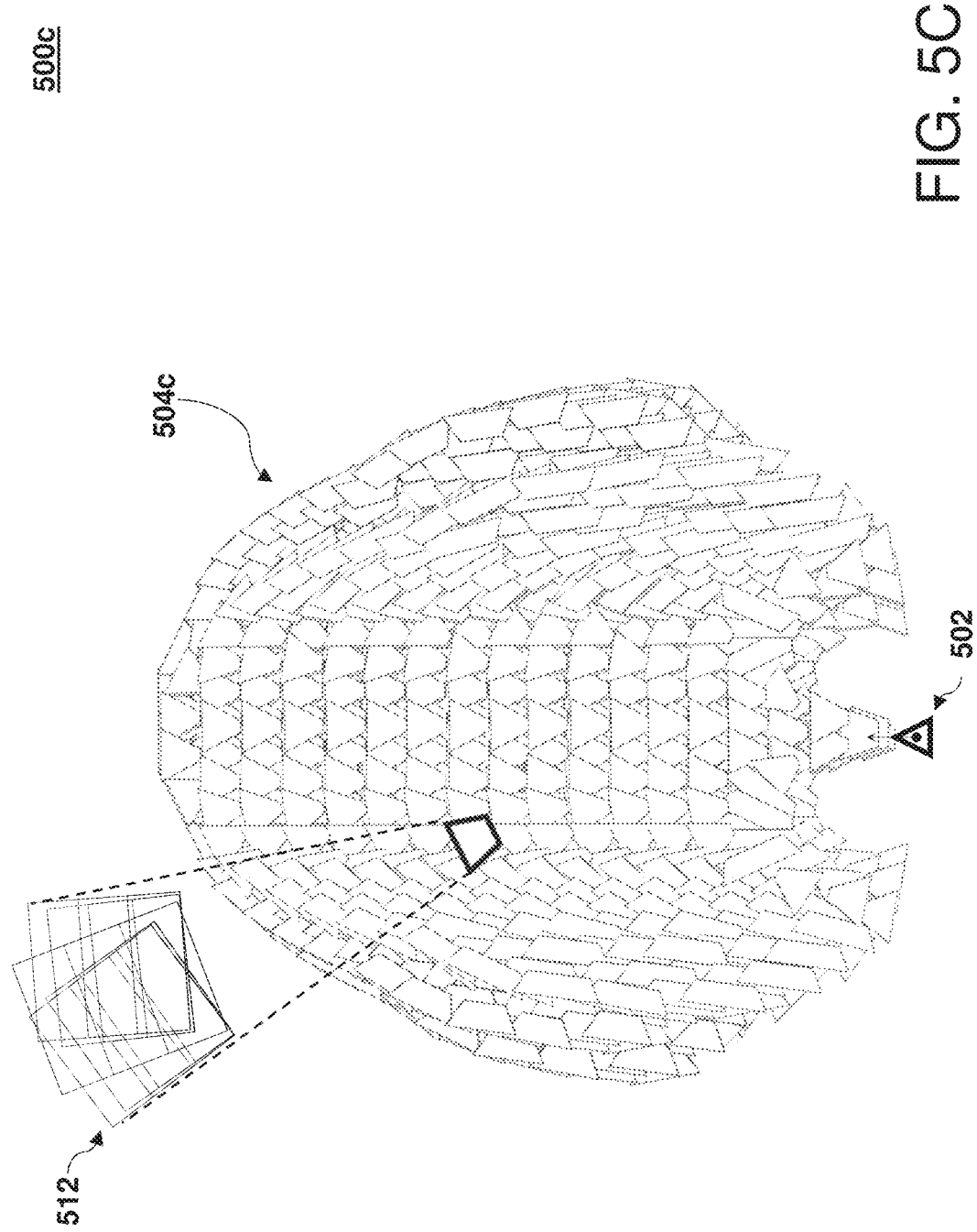

Referring now to FIG. 5C, FIG. 5C is a diagram of an exemplary implementation 500c of a non-limiting embodiment relating to process 300 shown in FIG. 3. As shown in FIG. 5C, implementation 500c may include worldview relational interaction map 504c, which may include at least one set 510 of dynamic envelope elements 512. For example, each of the sets 510 may include a plurality of dynamic envelope elements 512. In some non-limiting embodiments, first set 510a-c may be combined (e.g., grouped, overlaid, superimposed, and/or the like) to form worldview relational interaction map 504c. In some non-limiting embodiments, a current position 502 of host platform controlled dynamical system 120 may be included in worldview relational interaction map 504c.

Figure 5D:
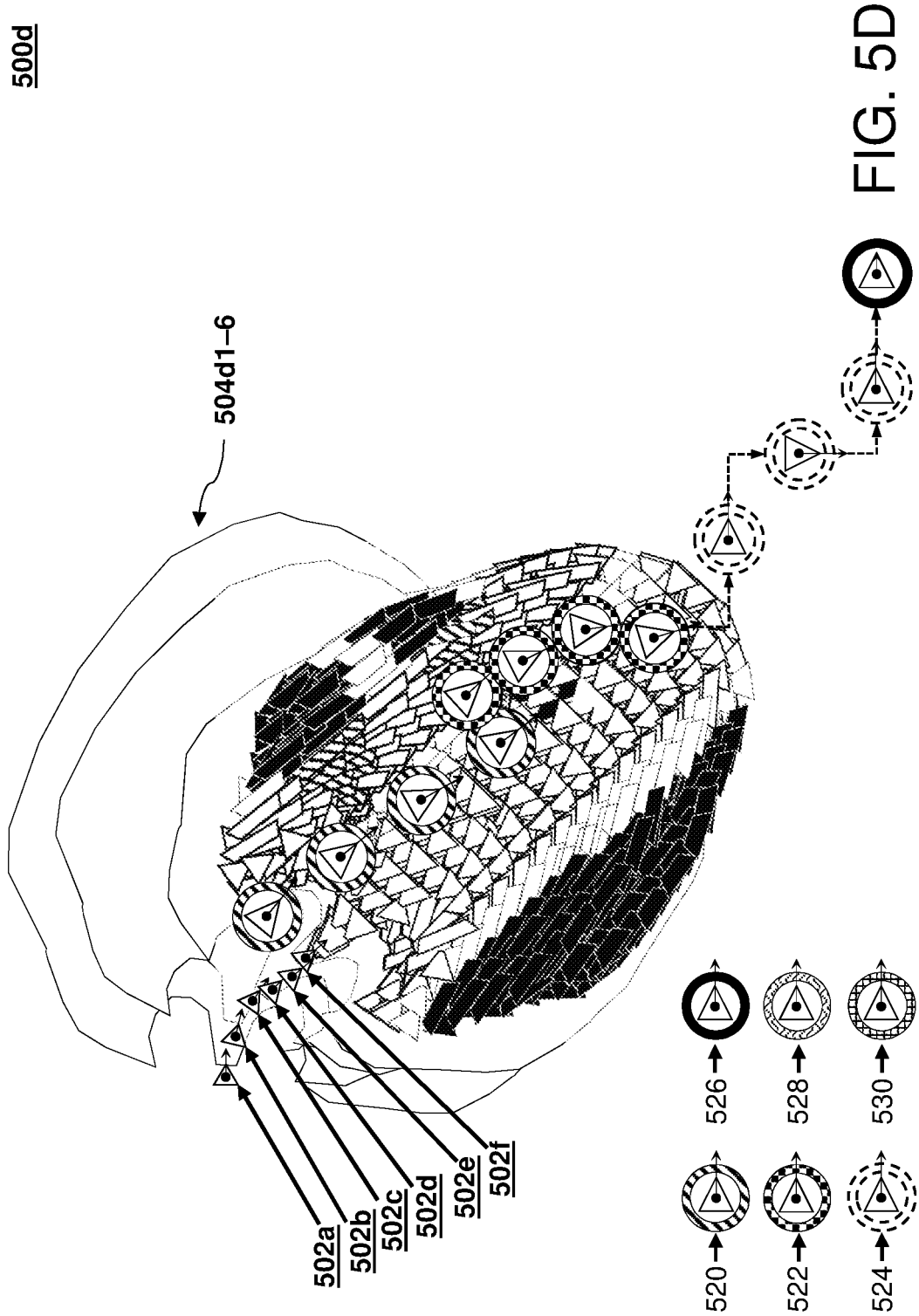

Referring now to FIG. 5D, FIG. 5D is a diagram of an exemplary implementation 500d of a non-limiting embodiment relating to process 300 shown in FIG. 3. As shown in FIG. 5D, implementation 500d may include a plurality of worldview relational interaction maps 504d1-6, each of which may correspond to a different time and/or position of host platform controlled dynamical system 120 as host platform controlled dynamical system 120 travels along goal command path 510. For example, at a first time during which host platform controlled dynamical system 120 is at first position 502a, first worldview relational interaction map 504d1 may be generated, as described herein. Additionally or alternatively, at a second time (e.g., after the first time) during which host platform controlled dynamical system 120 is at second position 502b, second worldview relational interaction map 504*d*2 may be generated, as described herein. Additionally or alternatively, at a third time (e.g., after the second time) during which host platform controlled dynamical system 120 is at third position 502*c*, third worldview relational interaction map 504*d*3 may be generated, as described herein. Additionally or alternatively, at a fourth time (e.g., after the third time) during which host platform controlled dynamical system 120 is at fourth position 502*d*, fourth worldview relational interaction map 504*d*4 may be generated, as described herein. Additionally or alternatively, at a fifth time (e.g., after the fourth time) during which host platform controlled dynamical system 120 is at fifth position 502*e*, fifth worldview relational interaction map 504*d*5 may be generated, as described herein. Additionally or alternatively, at a sixth time (e.g., after the fifth time) during which host platform controlled dynamical system 120 is at sixth position 502*f*, sixth worldview relational interaction map 504*d*6 may be generated, as described herein.

In some non-limiting embodiments, goal command path 510 may include a plurality of goals. For example, goal command path 510 may include at least one of tactical level goal 520, operational level goal 522, waypoint 524, strategic level goal 526, seek safe goal 528, critical goal 530, any combination thereof, and/or the like.

Figure 5E:
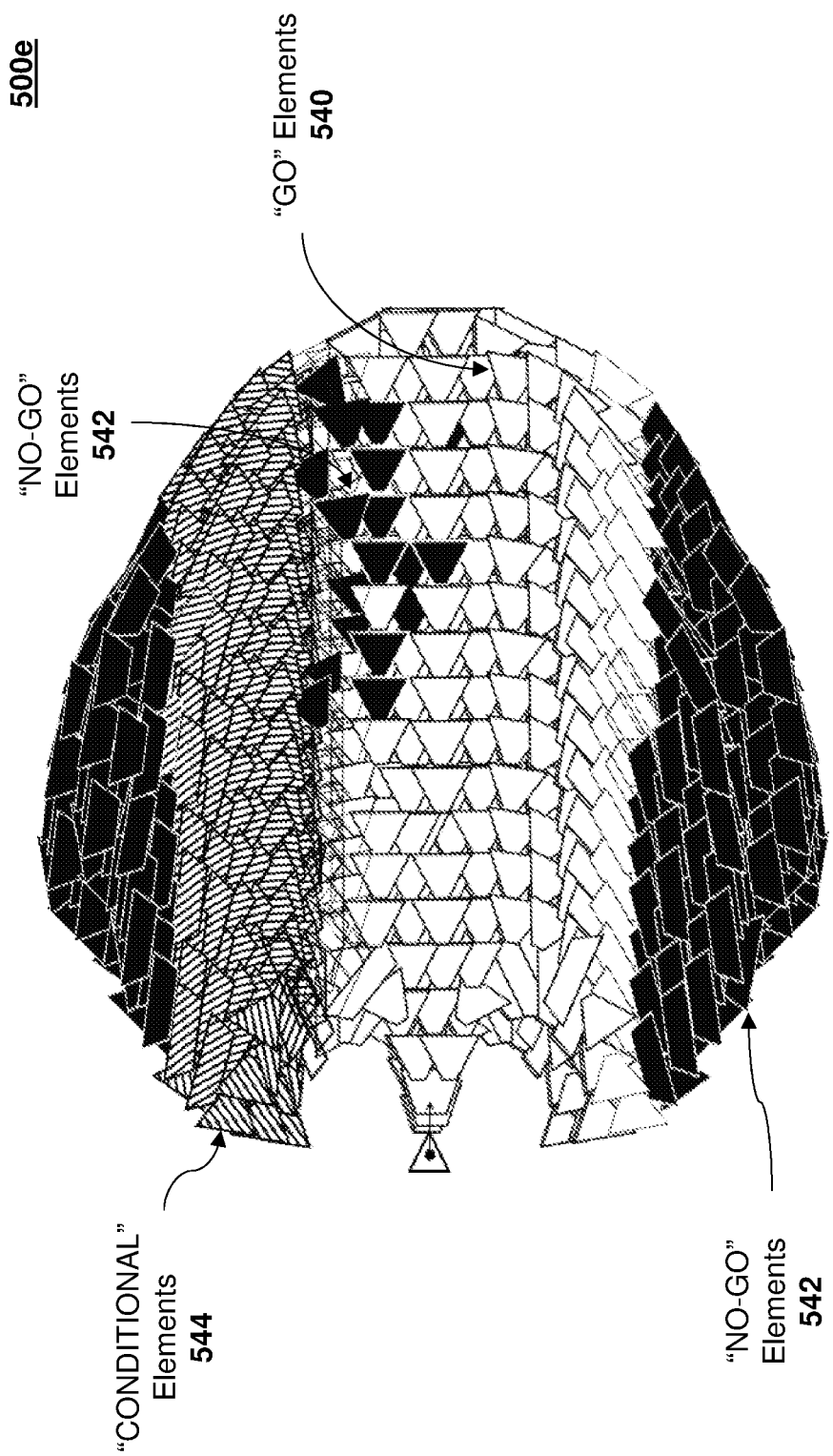

Referring now to FIG. 5E, FIG. 5E is a diagram of an exemplary implementation 500*e* of a non-limiting embodiment relating to process 300 shown in FIG. 3. As shown in FIG. 5E, implementation 500*e* may include worldview relational interaction map 504*e*, which may include "GO" elements 540, "NO-GO" elements 542, and/or "CONDITIONAL" elements 544.

Figure 6A:
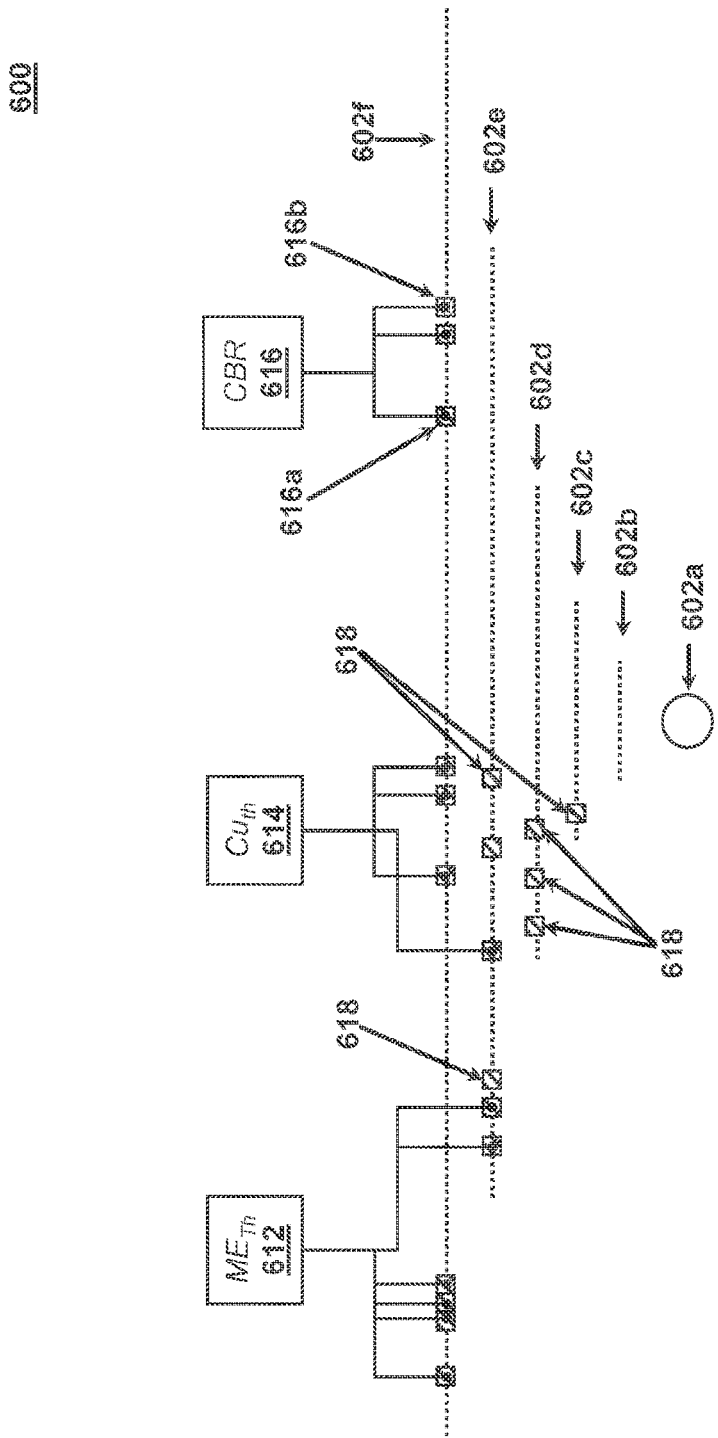

Referring now to FIG. 6A, FIG. 6A is a diagram of an exemplary implementation 600*a* of a non-limiting embodiment relating to process 300 shown in FIG. 3. As shown in FIG. 6A, implementation 600*a* may include CDC current state 602 and/or at least one worldview CDC band 604*a-e*. For example, each dot in the worldview CDC band(s) 604*a-e* may represent one dynamic envelope element. For the purpose of illustration, as shown in FIG. 6A, the at least one worldview CDC band 604*a-e* may include first worldview CDC band 604*a*, second worldview CDC band 604*b*, third worldview CDC band 604*c*, fourth worldview CDC band 604*d*, fifth worldview CDC band 604*e*, and/or the like.

In some non-limiting embodiments, at least one element of worldview CDC band(s) 604*a-e* may satisfy a momentum exchange probability threshold (MEth). For example, as shown in FIG. 6A, first plurality of elements 612 may satisfy the MEth. In some non-limiting embodiments, any element that satisfies the MEth (e.g., first plurality of elements 612) may be determined to be a "NO-GO" element, as described herein.

In some non-limiting embodiments, at least one element of worldview CDC band(s) 604*a-e* may satisfy a confidence-uncertainty threshold (CUth). For example, as shown in FIG. 6A, second plurality of elements 614 may satisfy the CUth. In some non-limiting embodiments, any element that satisfies the CUth (e.g., second plurality of elements 614) may be determined to be a "NO-GO" element, as described herein.

In some non-limiting embodiments, at least one element of worldview CDC band(s) 604*a-e* may satisfy a constraint-boundary-rule threshold (CBR). For example, as shown in FIG. 6A, third plurality of elements 616 may satisfy the CBR. In some non-limiting embodiments, at least a subset of elements that satisfies the CBR (e.g., first subset 616*a* of third plurality of elements 616) may be determined to be "NO-GO" elements, as described herein. Additionally or alternatively, at least a subset of elements that satisfies the CBR (e.g., second subset 616*b* of third plurality of elements 616) may be determined to be "CONDITIONAL" elements, as described herein.

In some non-limiting embodiments, at least one element in at least one of the worldview CDC band(s) 604*a-e* may be linked to at least one other element in at least one other of the worldview CDC band(s) 604*a-e*, as described herein. For example, each of fourth plurality of elements 618 may be linked to at least one element of first plurality of elements 612, second plurality of elements 614, and/or third plurality of elements 616. For example, occupying a respective element of fourth plurality of elements 618 may directly and/or indirectly lead to a respective element of at least one of first plurality of elements 612, second plurality of elements 614, and/or third plurality of elements 616 (e.g., certainly, with high probability, and/or the like). In some non-limiting embodiments, the elements of fourth plurality of elements 618 may be determined to be "NO-GO" elements, as described herein.

Referring now to FIG. 6B, FIG. 6B is a diagram of an exemplary implementation 600*b* of a non-limiting embodiment relating to process 300 shown in FIG. 3. As shown in FIG. 6B, implementation 600*b* may include first linked dynamic envelope element 620, at least one dynamic envelope CDC band 622*a-d*, at least one link 624*a-d*, and/or second linked dynamic envelope element 626. For example, each dot in the dynamic envelope CDC band(s) 622*a-d* may represent one dynamic envelope element. For the purpose of illustration, as shown in FIG. 6B, the at least one dynamic envelope CDC band 622*a-d* may include first dynamic envelope CDC band 624*a*, second dynamic envelope CDC band 624*b*, third dynamic envelope CDC band 624*c*, fourth dynamic envelope CDC band 624*d*, and/or the like.

In some non-limiting embodiments, at least one element in at least one of the dynamic envelope CDC band(s) 624*a-d* may be linked to at least one other element in at least one other of the dynamic envelope CDC band(s) 624*a-d*, as described herein. For example, at least one (e.g., a plurality of and/or the like) first link 624*a* may show a linking between first dynamic envelope element 620 and at least one (e.g., a plurality of and/or the like) element of first dynamic envelope CDC band 622*a*. Additionally or alternatively, at least one (e.g., a plurality of and/or the like) second link 624*b* may show a linking between at least one (e.g., a plurality of and/or the like) element of first dynamic envelope CDC band 622*a* and at least one (e.g., a plurality of and/or the like) element of second dynamic envelope CDC band 622*b*. Additionally or alternatively, at least one (e.g., a plurality of and/or the like) third link 624*c* may show a linking between at least one (e.g., a plurality of and/or the like) element of second dynamic envelope CDC band 622*b* and at least one (e.g., a plurality of and/or the like) element of third dynamic envelope CDC band 622*c*. Additionally or alternatively, at least one (e.g., a plurality of and/or the like) fourth link 624*d* may show a linking between at least one (e.g., a plurality of and/or the like) element of third dynamic envelope CDC band 622*c* and at least one (e.g., a plurality of and/or the like) element of fourth dynamic envelope CDC band 622*d*. For example, the at least one element of fourth dynamic envelope CDC band 622*d* may include second linked dynamic envelope element 626.

Figure 7A:
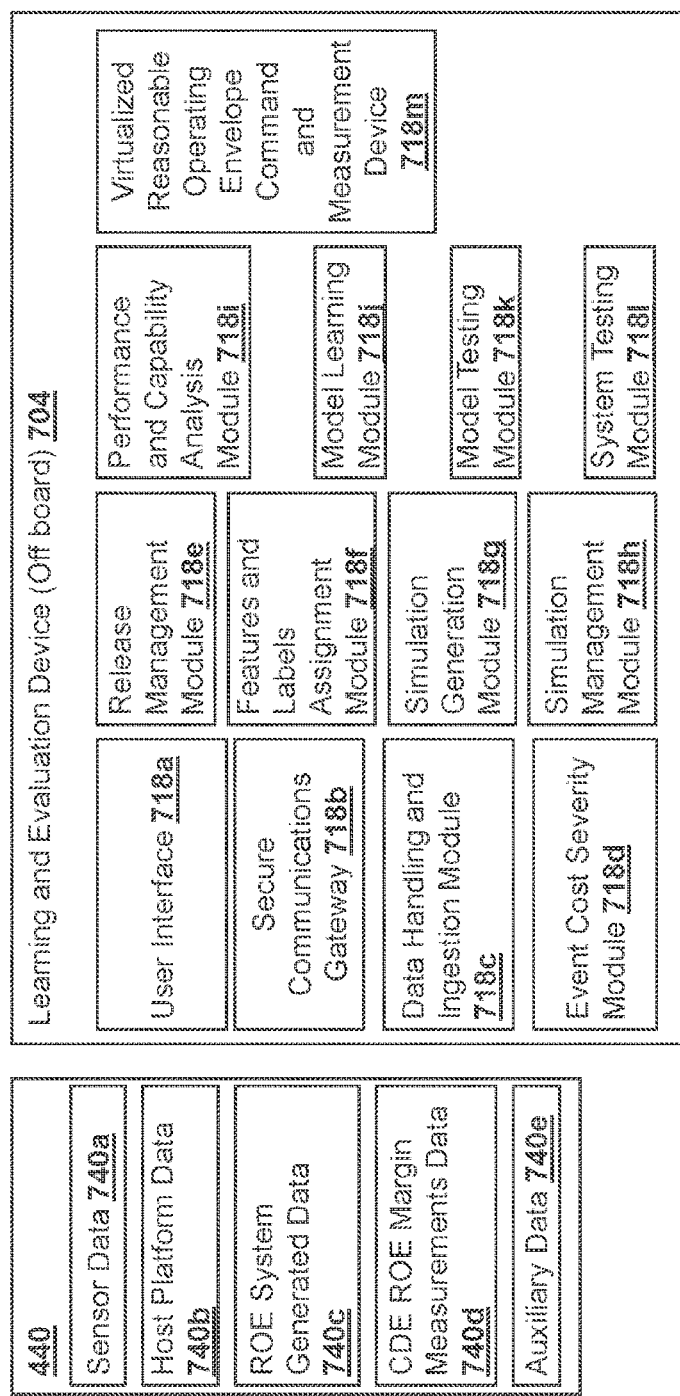

Referring now to FIGS. 7A-7B, FIGS. 7A-7B are diagrams of an exemplary implementation 700 of a non-limiting embodiment relating to process 300 shown in FIG. 3. As shown in FIG. 7, implementation 700 may include learning and evaluation system 704. In some non-limiting embodiments, learning and evaluation system 704 may be the same as or similar to learning and evaluation system 104.

In some non-limiting embodiments, learning and evaluation system 704 may receive (e.g., from ROE command and measurement device 110, asset task and management system 106, other tasking and dispatch networks 108, and/or the like) input data 740. For example, input data 740 may include at least one of sensor data 740*a*, host platform data 740*b*, ROE system generated data 740*c*, CDC ROE margin measurements data 740*d*, auxiliary data 740*d*, any combination thereof, and/or the like.

In some non-limiting embodiments, software of learning and evaluation system 704 may be implemented (e.g., completely, partially, and/or the like) by modules. For example, such modules may include user interface module 718*a*, secure communications gateway module 718*b*, data handling and ingestion module 718*c*, event cost severity module 718*d*, release management module 718*e*, features and labels assignment module 718*f*, simulation generation module 718*g*, simulation management module 718*h*, performance and capability analysis module 718*i*, model learning module 718*j*, model testing module 718*k*, system testing module 718*l*, virtualized ROE command and measurement device 718*m*, any combination thereof, and/or the like.

In some non-limiting embodiments, learning and evaluation system 704 may include at least one repository. For example, learning and evaluation system 704 may include at least one of log data repository 712*a*, benchmark data corpus repository 712*b*, training data corpus repository 712*c*, models bank repository 712*d*, threshold criteria repository 712*e*, geospatial repository 712*f*, requirements repository 712*g*, test case repository 712*h*, performance and capabilities attribution repository 712*i*, release use history and attribution 712*j*, severity to capability attribution repository 712*k*, attribution repositories 712*l*, operator-release attribution repository 712*m*, scenario-context attribution repository 712*n*, host platform attribution repository 712*o*, activities attribution repository 712*p*, domain-environment attribute repository 712*q*, any combination thereof, and/or the like.

In some non-limiting embodiments, the learning and evaluation process may include learning in which learning and evaluation system 704 may train implementing modules and/or procedure-model layers sets (e.g., modules 418 and/or the like) to perform tasks and intermediary tasks to generate a WRIM, generate a predicted ROE, carry out command(s), and make measurement(s) (e.g., of an operator command) and/or the like. In some non-limiting embodiments, the results of training may be evaluated by learning and evaluation system 704 running the modules and procedure-model layers sets in unit and functional tests on their respective operations with follow on integrated system testing to validate and verify the entire performance and capability of the software. Additionally or alternatively, once areas of performance and capability are tested by learning and evaluation system 704 to the point of generating a validated WRIM, the validated portions of the software used to generate a worldview may be used to evaluate the performance of operators independent of the host platform controlled dynamical system 120 and/or the operator thereof. In some non-limiting embodiments, the results of evaluating independent operators may inform learning and evaluation system 704 of the severities and/or implied costs (e.g., technical cost function and/or the like) of the predicted and realized momentum exchange information. In some non-limiting embodiments, learning and evaluation system 704 may receive auxiliary data that curates momentum exchange events that may be used to set threshold criteria for the generation of a predicted ROE. Additionally or alternatively, learning and evaluation system 704 may then conduct training and/or testing operations to tune and/or validate the modules and procedure-model layers sets for generating a predicted ROE. In some non-limiting embodiments, the outcomes of independent operators controlling host platform controlled dynamical systems 120 may be used to validate software releases. Additionally or alternatively, upon validating the ROE generation capability of the software, learning and evaluation system 704 may enable self-measurement of the commands generated by the host platform controlled dynamical system 120. In some non-limiting embodiments, learning and evaluation system 704 may provide a performance and analysis toolset for system users to rate and monitor the use of host platform controlled dynamical system 120, e.g.; by operators.

In some non-limiting embodiments, a release may refer to a package of software that may be the complete set of all of software used to run an asset (e.g., ROE command and measurement device 110 and/or host platform controlled dynamical system 120) and/or or a subset of such software that is comprised of modules and/or procedure-model layers sets. In some non-limiting embodiments, learning and evaluation system 704 may train, test, and/or evaluate the software releases in conjunction with the ROE command and measurement device 110, host platform controlled dynamical system 120, and/or hardware configurations thereof on which the software releases operate on and/or within.

In some non-limiting embodiments, learning and evaluation system 704 and/or host platform controlled dynamical system 120 (e.g., ROE command and measurement device 110 thereof) may be connected for data communication through use of secure communications gateway 718*b* (e.g., connected via network 130 to secure communications gateway 418*j*). In some non-limiting embodiments, the secure communications gateway (e.g., secure communications gateway 418*j*) of host platform controlled dynamical system 120 (e.g., ROE command and measurement device 110 thereof) may communicate (e.g., upload, offload, and/or the like) logged data acquired through use of host platform controlled dynamical system 120 (e.g., ROE command and measurement device 110 thereof) and/or receive software release updates. In some non-limiting embodiments, secure communications gateway 718*b* may receive the data logged and/or communicated (e.g., uploaded, streamed, and/or the like) from host platform controlled dynamical system 120 (e.g., ROE command and measurement device 110 thereof) and/or communicate software release updates to host platform controlled dynamical system 120 (e.g., ROE command and measurement device 110 thereof)

In some non-limiting embodiments, data handling and ingestion module 718*c* may ingest pre-recorded and/or run-time streamed data (e.g., from host platform controlled dynamical system 120 and/or ROE command and measurement device 110 thereof). In some non-limiting embodiments, data handling and ingestion module 718*c* may perform operations to extract, load, and/or transform the log data into a normalized data set for use by the learning and/or evaluation modules in learning and evaluation system 704. Additionally or alternatively, ingested data may be indexed for attributes including but not limited to date-time, source host platform controlled dynamical system 120 (and/or ROE command and measurement device 110 thereof) identity and/or configuration, area and/or domain of use, any combination thereof, and/or the like. Additionally or alternatively, the descriptive attributes along with addresses to the logged data may be stored in a data index (e.g., attribution repositories 712*l*). Additionally or alternatively, the log data set for retention may be stored in log data repository 712*a*.

In some non-limiting embodiments, data handling and ingestion module 718*c* may manage user-specified instructions for the handling of ingested data. Additionally or alternatively, data handling and ingestion module 718*c* may instructs the operations to perform on received data and/or if and where to store the ingested data. In some non-limiting embodiments, data handling and ingestion module 718*c* may link data sets received from assets (e.g., host platform controlled dynamical system 120 and/or ROE command and measurement device 110 thereof) with auxiliary data. For example, data handling and ingestion module 718*c* may match insurance claims data received as auxiliary data with corresponding data logged on an asset (e.g., host platform controlled dynamical system 120 and/or ROE command and measurement device 110 thereof) at the time of the insurance claim causing event.

In some non-limiting embodiments, use cases may present scenarios where momentum is exchanged in which the host platform controlled dynamical system 120 and its occupants, goods, and/or the like would experience tolerable momentum exchange but which are intolerable in respect to the object-actor with which momentum is exchanged. Additionally or alternatively, a severity value and/or cost function of the momentum exchange may be developed in learning and evaluation system 704 to determine and set threshold criteria for generating the ROE.

In some non-limiting embodiments, assets (e.g., host platform controlled dynamical system 120 and/or ROE command and measurement device 110 thereof) may provide event outcome data that may be coupled with auxiliary data that provides additional training features and/or labels that may be used in the training and/or evaluation of the ROE software (e.g., for host platform controlled dynamical system 120 and/or ROE command and measurement device 110 thereof). For example, events may be user-, occupant-, and/or observer-provided observations and/or assessments of the outcome of involving the use of host platform controlled dynamical system 120 (and/or ROE command and measurement device 110 thereof). Additionally or alternatively, the observation and/or assessment may be collected, e.g., if host platform controlled dynamical system 120 (and/or ROE command and measurement device 110 thereof) is relegated to only measuring and logging an independent operator and/or where host platform controlled dynamical system 120 (and/or ROE command and measurement device 110 thereof) retains a control responsibility. For example, automotive accidents and/or collisions may result in such collection. In some non-limiting embodiments, event cost severity module 718*d* may perform operations to extract the recorded measurements and/or sensor data (e.g., from host platform controlled dynamical system 120 and/or ROE command and measurement device 110 thereof) and/or match such measurements and/or data with externally assigned outcome severity values. For example, in an automotive-related collision, a society-assigned severity cost may be assigned to the accident. Additionally or alternatively, police reports, traffic safety investigations, property/vehicle repair descriptions and/or costs, current procedural terminology (CPT) code billings for medical treatments contained and/or related to automotive related property and casualty insurance bodily injury, medical and/or personal injury protection and/or basic first party benefits, property and/or physical damage claims, and/or the like may provide independent observations and/or assessments of the severity of an event and/or may be used by learning and evaluation system 704 as auxiliary data to produce training features and labels. Additionally or alternatively, severity observations and assessments may provide features and/or labels for learning and evaluation system 704 to determine and/or set criteria thresholds for the handling of predicted momentum exchange in the generation of the predicted ROE.

In some non-limiting embodiments, the situational instances where an object-actor of unknown mass and/or resultant severity from co-occupying an element in the dynamic envelope can be inferred from event severity data. Additionally or alternatively, there may be object-actors that may co-occupy an element of the dynamic envelope with no severity. For example, a wind-blown empty plastic bag may be associated with such a lack of severity. In some non-limiting embodiments, models and/or ROE threshold criteria may be tuned to classify and/or account for the previously unknown attributes of an object-actor and/or set experience-based threshold criteria for generation of a ROE. In some non-limiting embodiments, for each use application, learning and evaluation system 704 may be configured to handle the available auxiliary data useful to determining severity and/or setting threshold(s).

In some non-limiting embodiments, event cost severity module 718*d* may performs operations to parse and/or structure event instances with available log data and/or auxiliary data sources to determine the severity of an observed and/or logged event (e.g., of host platform controlled dynamical system 120 and/or ROE command and measurement device 110 thereof). Additionally or alternatively, event cost severity module 718*d* may perform operations to link resultant momentum exchange and severity costs to determine the threshold criteria used to generate a ROE. In some non-limiting embodiments, event cost severity module 718*d* communicate threshold criteria data to threshold criteria repository 712*e* for record and retrieval.

In some non-limiting embodiments, features and labels assignment module 718*f* may perform operations to attach and/or embed known values to data sets to become learning features and/or labels for model training and/or model testing. In some non-limiting embodiments, the feature and/or label curated data may be sent to training data corpus repository 712*c* and/or benchmark data corpus repository 712*b* as specified by automated handling instructions and/or as specified by user instructions (e.g., ad-hoc instructions). In some non-limiting embodiments, features and labels assignment module 718*f* may perform automated feature and/or label assignment. For example, features and labels assignment module 718*f* may perform operations to determine the realized outcomes of elapsed CDC processes and/or apply the realized outcome values to preceding data sets. Additionally or alternatively, the realized values may become features and/or labels for subsequent model training. For example, in the training of the DTIES procedure and model layers set 418*p* in worldview module 418*f* of ROE command and measurement device 110/410, the normal run time data stream may be supplemented with later cycles realized (and/or now determined post-cycle) DTIES values. In some non-limiting embodiments, features and labels assignment module 718*f* may also manage user-directed annotation, overwriting, and/or curation of features and/or labels onto data sets for training via the user instructions sent via user interface 718*a*.

In some non-limiting embodiments, model learning module 718*j* may retrieve training data from training data corpus repository 712*c* and/or perform operations to train procedure-model layers sets (e.g., using and/or not using feature supplemented data). Additionally or alternatively, model learning module 718*j* may evaluate the procedure-model layers set output, e.g., in comparison with labeled supplemented data. In some non-limiting embodiments, model learning module 718*j* may conduct iterations and/or permutations to reach a predetermined fit (e.g., user-specified fit, selected fit, and/or the like) to the labels and/or other specified outcomes. In some non-limiting embodiments, trained models may be sent to models bank repository 712*d*, e.g., with a release identity assigned by release management module 718*e*. Additionally or alternatively, the trained module may be stored in models bank repository 712*d* and/or available for follow-on testing.

In some non-limiting embodiments, model testing module 718*k* may load procedure-model layers sets to be tested from models bank repository 712*d*, e.g., based on references pre-specified and/or user-instructed test cases from test case repository 712*h*. Additionally or alternatively, model testing module 718*k* may fetch the data to test the procedure-model layers set with from benchmark data corpus repository 712*b*. In some non-limiting embodiments, model testing module 718*k* may run the procedure-model set through the test cases, score the output against test case criteria, and/or record the results. Additionally or alternatively, the results may be sent to release management module 718*e* for presentation to the user via user interface 718*a* and/or an automated report. In some non-limiting embodiments, model testing module 718*k* may perform operations for a user to configure test cases based on receiving instructions via user interface 718*a*.

In some non-limiting embodiments, simulation management module 718*h* may perform operations to assemble instructions for simulation generation module 718*h* for training and testing purposes. In some non-limiting embodiments, a user may, via user interface 718*a*, use the module to set and/or configure simulation parameters, object-actor presence and/or behaviors, map areas for operation, scenarios, other attributes, and/or the like for testing and/or evaluation purposes. In some non-limiting embodiments, simulation management module 718*h* may link user generated simulation configurations to training data corpus repository 712*c*, benchmark data corpus repository 712*b*, and/or test case repository 712*h*. In some non-limiting embodiments, if a user and/or pre-specified program instructs a simulation to be run for training and/or testing, the simulation management module may load the specified simulation configuration and/or instructs the simulation generation module to generate the simulated data in the sequence required for training and/or testing purposes.

In some non-limiting embodiments, simulation generation module 718*g* may generate the simulated environment and simulated host platform controlled dynamical system. Additionally or alternatively, simulation generation module 718*g* may include use and/or incorporation of a third party provided simulation engine. In some non-limiting embodiments, simulation generation module 718*g* may communicate (e.g., serve) data streams, e.g., in response to instructions sent by simulation management module 718*h*.

In some non-limiting embodiments, learning and evaluation system 704 may include virtualized ROE command and measurement device 718*m*, which may contain virtualized instances of ROE command and measurement device 110 and/or host platform controlled dynamical system 120. Additionally or alternatively, the virtualized ROE command and measurement device 718*m* may perform the operations of ROE command and measurement device 110 to run on previously logged data and/or simulation data for use in learning, testing, and/or evaluation processes. In some non-limiting embodiments, whole system software releases and/or module and/or model sub-releases/versions may be interchangeably loaded into a virtualized instance to conduct evaluation processes.

In some non-limiting embodiments, system testing module 718*l* may perform integration and/or systems testing on complete software releases. In some non-limiting embodiments, system testing module 718*l* may use and/or manage a prescribed and/or ad-hoc set of testing use cases, log the results, and/or communicate results to the performance and capability analysis module 718*i* for analysis and/or attribution. In some non-limiting embodiments, the complete software releases may include controlled groups of implementing modules and/or procedure-model sets with variable modules and/or procedure-model sets interchanged for evaluation purposes. In some non-limiting embodiments, system testing module 718*l* may load test case-linked benchmark data and/or simulation scenarios to conduct the system testing. In some non-limiting embodiments, system testing module 718*l* may receive instructions via user interface 718*a* and/or performs operations for a user to configure test cases.

In some non-limiting embodiments, CDC ROE margin measurements may generate capabilities attribution for at least one operator (e.g., a single operator, a group of operators, and/or the like), which may be attributed based on, e.g., various domains, geographies, scenarios, situations, environment features, object-actor type handling, time of day, illumination, type/class/model of host platform controlled dynamical system(s) 120, weather types, any combination thereof, and/or the like. In some non-limiting embodiments, performance and capability analysis module 718*i* may perform operations to evaluate the results of command outcomes and CDC ROE margin measurements in for performance and/or capability attributed in respect categorically to the environment, task-activities, operating contexts, host platform type/class/model variant, the operator-release, and/or the like. In some non-limiting embodiments, operator-release may include a human, a third-party system, and/or ROE command and measurement device 110 release that may control host platform controlled dynamical system 120 during a measurement period. Additionally or alternatively, the operator-release may execute control of host platform controlled dynamical system 120, which may have type/class/make/model variants, to conduct a task, which may have at least one activity classification of the tasks performed. Additionally or alternatively, an environment may have differentiable operating contexts. Additionally or alternatively, the attribution may be associated with differentiable categories and/or sub-categories. In some non-limiting embodiments, performance and capability analysis module 718*i* may record CDC ROE margin measurements on the CDC progression, perform operations to identify patterns in the sequences of various CDC count sequences, and/or correlate with attributes (e.g., environment, task-activities, operating contexts, host platform type/class/model variant, and/or the like).

In some non-limiting embodiments, performance and capability analysis module 718*i* may manage the attribution and/or query of the various many-to-many relationships that may exist in measured CDC ROE margin performance and/or capabilities. In some non-limiting embodiments, performance and capability analysis module 718*i* may aggregate analysis of at least one operator-release instance (e.g., a single operator-release instance, a group of operator-release instances, and/or the like) and/or the performance and/or capability thereof to produce a composite capability report, which may attribute any variances in capability attributed to environmental, task-activity type, host platform factors, and/or the like. In some non-limiting embodiments, composite capability reports may be correlated to event cost severity. In some non-limiting embodiments, performance and capability analysis module 718*i* may receive measurement data from assets (e.g., ROE command and measurement device(s) 110) and/or structure the measurement data for assignment to respective attribution repositories 712*l*.

In some non-limiting embodiments, requirements repository 712*g* may maintain a record of the functional and/or technical requirements that a ROE command and measurement device 110 may need to meet use and/or acceptance standards. Additionally or alternatively, the requirements may be linked to environments, task-activity types, host platform type variants, use case contexts, and/or the like.

In some non-limiting embodiments, test case repository 712*h* may maintain the configurations and/or instructions for the model testing module 718*k* and/or system testing module 718*l* to reference for the running of tests. Additionally or alternatively, test case repository 712*h* may store test cases linked to corresponding functional and technical requirements. Additionally or alternatively, test case repository 712*h* may store linked references to prescribed data sets in benchmark data corpus repository 712*b* and/or to simulation scenarios in simulation management module 718*h*. In some non-limiting embodiments, model testing module 718*k* and/or system testing module 718*l* may load user configured test cases into test case repository 712*h*.

In some non-limiting embodiments, release management module 718*e* may maintain a record of the software-hardware configurations in development, test, and/or use. Additionally or alternatively, release management module 718*e* may maintain and/or enforces user-defined criteria and/or controls for the nomination and/or approvals to move a software release between development, evaluation, and/or production release phases. In some non-limiting embodiments, release management module 718*e* may perform controls to check that software releases go through the prescribed and/or required test cases to be nominated for promotion to the next phase (e.g. development to test, test to production, and/or the like). In some non-limiting embodiments, release management module 718*e* may perform operations to check if test cases and/or linked functional and/or technical requirements have been passed, failed, and/or untested. In some non-limiting embodiments, release management module 718*e* may run controls to check that releases pass and/or meet the user-defined requirements for use of a software release. In some non-limiting embodiments, release management module 718*e* may generate a release guidance report that may be embedded and/or included with each release in each phase that may include records of the chain of custody of the release, performance and/or capability attribution to factors, approval and/or authorizations, and/or any use case prescriptive and/or restrictive instructions and/or advisory messages. In some non-limiting embodiments, release management module 718*e* may track the stages and/or phases of a software release from inception to retirement in the learning and evaluation process pipeline.

Figure 8:
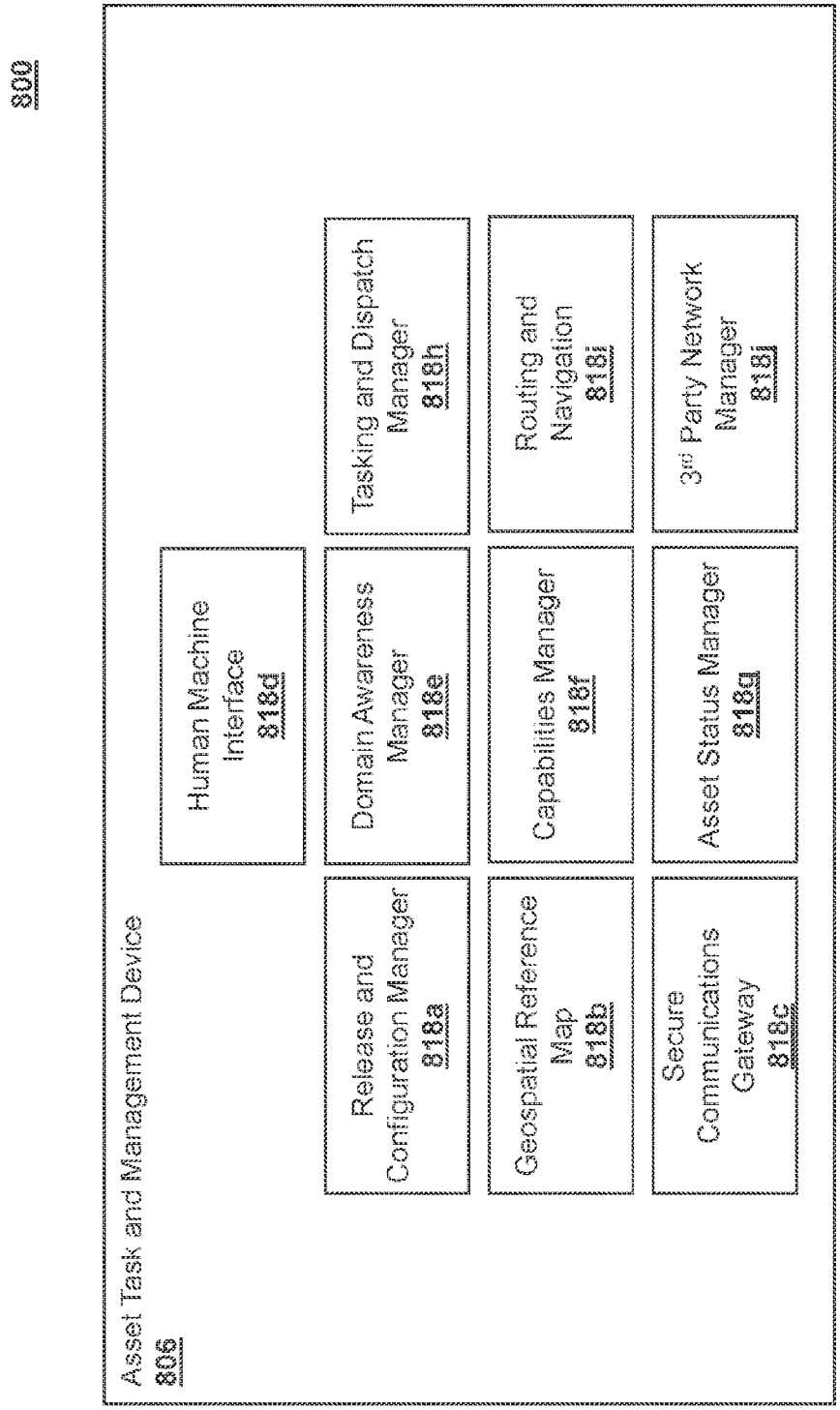
FIG. 8 is a diagram of non-limiting embodiments of devices and/or systems according to the principles of the presently disclosed subject matter.

Referring now to FIG. 8, FIG. 8 is a diagram of an exemplary implementation 800 of a non-limiting embodiment relating to process 300 shown in FIG. 3. As shown in FIG. 8, implementation 800 may include asset task and management system 806. In some non-limiting embodiments, asset task and management system 806 may be the same as or similar to asset task and management system 106.

In some non-limiting embodiments, software of asset task and management system 806 may be implemented (e.g., completely, partially, and/or the like) by modules. For example, such modules may include release and configuration manager module 818*a*, geospatial reference map module 818*b*, secure communications gateway module 818*c*, human machine interface module 818*d*, domain awareness manager module 818*e*, capabilities manager module 818*f*, asset status manager module 818*g*, tasking and dispatch manager module 818*h*, routing and navigation module 818*h*, third party network manager module 818*j*, any combination thereof, and/or the like.

In some non-limiting embodiments, asset task and management system 806 may be connected to at least one asset (e.g., at least one ROE command and measurement device 110) and/or at least one learning and evaluation system 104. In some non-limiting embodiments, asset task and management system 806 may be responsible for remote tasking and/or management of host platform controlled dynamical systems 120, which may be equipped with ROE command and measurement devices 110. Additionally or alternatively, asset task and management system 806 may receive messages from ROE command and measurement device 110 via the respective secure communications gateway thereof, and/or such messages may include data such as the current location, dynamic state, control status, measurements, and/or the like of host platform controlled dynamical system 120 and/or ROE command and measurement device 110 thereof. Additionally or alternatively, such data may include run time diagnostics, streamed sensor data, and/or the like.

In some non-limiting embodiments, domain awareness manager 818*e* may perform operations to update and/or maintain the situational awareness about the domain in which assets (e.g., ROE command and measurement device 110) may operate. In some non-limiting embodiments, situational awareness may include the known, reported, and/or predicted object-actors of interest; events; operating restrictions; prescribed and/or restricted zones of operation; deconfliction zones relevant and/or impacting the use of the managed assets; any combination thereof, and/or the like. In some non-limiting embodiments, domain awareness manager 818*e* may link situation features to a geospatial reference map. Additionally or alternatively, domain awareness manager 818*e* may maintains an index of current and/or past situational events, states, prescriptions, and/or restrictions for query by tasking and dispatch manager 818*h*.

In some non-limiting embodiments, capabilities manager 818*f* may maintains a record of the software and/or model set releases and/or capabilities thereof to operate in a zone of interest (e.g. highways and/or the like) and/or the capabilities thereof to handle situations (e.g. persistent conditions such as construction, ad-hoc condition such as weather conditions, and/or the like) within the operating domain. In some non-limiting embodiments, capabilities manager 818*f* may maintain a record of all active and/or available (e.g., for use) software and/or hardware configurations. In some non-limiting embodiments, capabilities manager 818*f* may maintain a record of the validation state (e.g. development, testing, and/or production) of software and/or hardware releases.

In some non-limiting embodiments, asset status manager 818*g* may maintain a manifest of what software and/or hardware configurations and/or releases are actively loaded on a ROE command and measurement device 110 (e.g., for use thereon). Additionally or alternatively, asset status manager 818*g* may also maintain records of additional attributes such as occupancy, fuel, additional equipment, service and/ or maintenance records, statuses, and/or the like that may be relevant to the selection and tasking of assets (e.g., ROE command and measurement devices 110), e.g., depending on the use case.

In some non-limiting embodiments, tasking and dispatch manager 818*h* may receive instructions from a user to task an asset (e.g., ROE command and measurement devices 110) for dispatch (e.g., immediate, scheduled, and/or conditions-based dispatch). In some non-limiting embodiments, tasking and dispatch manager 818*h* may perform checks to verify that only authorized software and/or hardware releases are used. In some non-limiting embodiments, tasking and dispatch manager 818*h* may query asset status manager 818*g* to fetch the software and/or hardware configuration of the task-requested asset (e.g., ROE command and measurement devices 110) and/or cross-reference with capabilities manager 818*f* to perform operations to check that the instructed task is matched with an asset that is equipped with software and/or hardware that meets the capability requirements of the user-instructed task. Additionally or alternatively, tasking and dispatch manager 818*h* may present alerts where capability mismatches occur. In some non-limiting embodiments, if a user task is open-ended and/or no specific asset is prescribed, tasking and dispatch manager 818*h* may perform operations to select the nearest and/or best task-based asset, e.g., by referencing the geospatial reference map module 818*b* and/or routing and navigation module 818*h*. In some non-limiting embodiments, tasking and dispatch manager 818*h* may perform operations to update the user of task status and the asset(s) executing the task(s).

In some non-limiting embodiments, third party network manager 818*i* may maintain instructions and/or authentication processes applicable to a third party tasking network (e.g., other tasking and dispatch networks 108) that may interface with the asset task and management system 806 for the tasking and/or use of assets. In some non-limiting embodiments, tasking and dispatch manager 818*h* may query third-party network manager 818*i* when tasks originate from and/or provide updates to a third-party network.

In some non-limiting embodiments, geospatial reference map module 818*b* may maintains pertinent geospatial data to communicate (e.g., serve); overlay with data, and/or perform operations on (e.g., for the tasking of) an asset. In some non-limiting embodiments, geospatial reference map module 818*b* may communicate (e.g., serve) map data to human machine interface 818*d*. Additionally or alternatively, domain awareness manager 818*e* may display overlaid situational awareness features (e.g., overlaid on the map data); capabilities manager 818*f* may display overlaid capability zones/areas (e.g., overlaid on the map data); tasking and dispatch manager 818*h* may display overlaid asset(s) tracks, current and planned areas and/or routes of use and/or communicate (e.g., serve) overlaid data of past or planned tasks (e.g., overlaid on the map data); and/or the like.

In some non-limiting embodiments, routing and navigation module 818*h* may perform operations on geospatial reference maps served from geospatial reference map module 818*b* to select task optimized routes and/or areas of operation to send assets, e.g., if not otherwise specified that the asset itself should perform the determination of routing and/or navigation operations. Additionally or alternatively, routing and navigation module 818*h* may receive optimization criteria from the tasking and/or dispatch manager that may prescribe the search criteria for which routing and navigation module 818*h* may determine a routing and navigation instructions set (e.g., an optimal routing and navigation instructions set and/or the like). In some non-limiting embodiments, routing and navigation module 818*h* may reference domain awareness manager 818*e* for prescriptive and/or restrictive guidance to incorporate.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:
1. A system comprising:
one or more hardware processors programmed or configured to:
receive data associated with a host platform;
construct a run-time dynamic envelope based on the data associated with the host platform, wherein, when constructing the run-time dynamic envelope, the one or more hardware processors are programmed and configured to:
construct an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with the entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform;
determine data associated with a state of the host platform based on the data associated with the host platform;
construct an idealized dynamic envelope based on the initialization dynamic envelope, the data associated with a state of the host platform, and data associated with a perception envelope; and
construct the run-time dynamic envelope based on the idealized dynamic envelope; and construct a Worldview Relational Interaction Map (WRIM) based on the run-time dynamic envelope, wherein the WRIM comprises a coordinate system corresponding to an area of an environment of the host platform, wherein the coordinate system comprises a plurality of elements, wherein each element of the plurality of elements comprises:
one or more data attributes associated with a predicted momentum exchange resulting from the host platform co-occupying the element with the entity.

2. The system of claim 1, wherein the one or more hardware processors are further programmed or configured to:
determine the one or more data attributes associated with the predicted momentum exchange of the host platform with regard to the entity associated with the element based on a machine learning model associated with a predicted transformation of perception;
wherein, when constructing the run-time dynamic envelope, the one or more hardware processors are programmed or configured to:
construct the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium;
wherein, when constructing the run-time dynamic envelope, the one or more hardware processors are programmed or configured to:
predict a state result of the host platform to actuator commands based on the data associated with DTIES; and
generate an element of the run-time dynamic envelope based on the state result of the host platform.

3. The system of claim 1, wherein the one or more hardware processors are further programmed or configured to:
identify a Reasonable Operating Envelope (ROE) based on each element of the WRIM;
wherein, when identifying the ROE, the one or more hardware processors are programmed or configured to:
compare the one or more data attributes associated with a momentum exchange of an element of the WRIM to a threshold;
label the element with an indication that the host platform should not occupy the element based on determining that the one or more data attributes associated with a momentum exchange of the element satisfies the threshold; and
label the element with an indication that the host platform can occupy the element based on determining that the one or more data attributes associated with a momentum exchange of the element does not satisfy the threshold.

4. The system of claim 1, wherein each element of the plurality of elements comprises:
one or more data attributes associated with a momentum exchange resulting from the host platform co-occupying the element with the entity;
one or more data attributes associated with boundaries, constraints, and/or rules of an environment of the host platform for the element; and
one or more data attributes associated with a metric of uncertainty of the host platform for the element; and
wherein the one or more hardware processors are further programmed or configured to:
identify a Reasonable Operating Envelope (ROE) based on the data attributes of each element of the WRIM;
wherein, when identifying the ROE, the one or more hardware processors are programmed or configured to:
provide the one or more data attributes associated with a momentum exchange resulting from the host platform co-occupying the element with the entity as an input to a first machine learning model to generate an output that includes a prediction of a value of momentum exchange and an indication of whether the value of momentum exchange satisfies a first threshold;
provide the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold;
provide the one or more data attributes associated with a metric of uncertainty of the host platform for the element as an input to a third machine learning model to generate an output that includes a prediction of a value of uncertainty and an indication of whether the value of uncertainty satisfies a third threshold;
label the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and
label the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold;
wherein the one or more hardware processors are further programmed or configured to:
receive data associated with a path of a second host platform, wherein the path of the second host platform comprises a plurality of elements that were occupied by the second host platform during a sequence of executed actuator commands; and
compare the data associated with the path of the second host platform to the ROE;

wherein, when comparing the data associated with the path of the second host platform along a second WRIM to the ROE, the one or more hardware processors are programmed or configured to:
   compare a first element of the plurality of elements that were occupied by the second host platform during a sequence of executed actuator commands to an element of the ROE having a NO GO label, wherein the element of the ROE is in a nearest command decision cycle (CDC) band to the first element; and
   determine a CDC band margin between the first element of the plurality of elements and the element of the ROE having the NO GO label, wherein the CDC band margin is a number of CDC bands from the first element of the plurality of elements to the element of the ROE having the NO GO label;
wherein the one or more hardware processors are further programmed or configured to:
   determine a pattern associated with CDC band margin for an operator of the second host platform;
   assign a rating to an identifier of an operator of the second host platform based on the pattern associated with CDC band margin for the operator; and
   determine a classification of risk of the operator based on the rating of the identifier of the operator.

5. The system of claim 4, wherein the one or more hardware processors are further programmed or configured to:
   determine a pattern associated with CDC band margin for an actual momentum exchange;
   generate a plurality of ranges of patterns of CDC band margins based on severity of outcome associated with a likelihood of momentum exchange event resulting from the host platform co-occupying an element with the entity, wherein each range of patterns of CDC band margins is associated with a classification of risk;
   determine a pattern associated with CDC band margin of the operator;
   determine a range of the plurality of ranges of patterns of CDC band margins for the operator based on the pattern associated with CDC band margin of an operator of a host platform; and
   determine a classification of risk of the operator based on the range.

6. The system of claim 1, wherein an output of a predicted momentum exchange machine learning model comprises the one or more data attributes associated with the predicted momentum exchange resulting from the host platform co-occupying the element with the entity, and wherein the one or more hardware processors are further programmed or configured to:
   train the predicted momentum exchange machine learning model based on a training dataset associated with an actual momentum exchange resulting from the host platform co-occupying an element with the entity;
   validate the predicted momentum exchange machine learning model based on a validation dataset associated with an actual momentum exchange resulting from the host platform co-occupying an element with the entity; and
   use the predicted momentum exchange machine learning model to generate the one or more data attributes associated with a predicted momentum exchange resulting from the host platform co-occupying an element with the entity;

wherein the one or more hardware processors are further programmed or configured to:
   train a threshold machine learning model based on a training dataset associated with an actual momentum exchange and a severity of outcome associated with an actual momentum exchange event resulting from the host platform co-occupying an element with the entity;
   validate the threshold machine learning model based on a validation dataset associated with an actual momentum exchange and a severity of outcome associated with the actual momentum exchange event resulting from the host platform co-occupying an element with the entity; and
   use the threshold machine learning model to generate a prediction and an indication of whether the prediction satisfies a threshold;
wherein each element of the plurality of elements comprises a plurality of data attributes, wherein the plurality of data attributes comprise:
   one or more data attributes associated with a momentum exchange resulting from the host platform co-occupying the element with the entity;
   one or more data attributes associated with boundaries, constraints, and/or rules of an environment of the host platform for the element;
   one or more data attributes associated with a metric of uncertainty of the host platform for the element; and
wherein the one or more hardware processors are further programmed or configured to:
   identify an Reasonable Operating Envelope (ROE) based on the plurality of data attributes of each element of the WRIM; and
   perform an action based on the ROE.

7. The system of claim 1, wherein the one or more hardware processors are further programmed or configured to:
   receive an input from a user associated with a strategic level goal on a geospatial map,
   generate a placeholder element for the strategic level goal based on the strategic level goal, wherein the placeholder element for the strategic level goal comprises criteria associated with velocity and acceleration of the host platform at the placeholder element;
   determine an operational level goal based on the strategic level goal;
   generate a placeholder element for the operational level goal based on the operational level goal, wherein the placeholder element for the operational level goal comprises criteria associated with velocity and acceleration of the host platform at the placeholder element; and
   determine a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

8. A method, comprising:
receiving data associated with a host platform;
constructing a run-time dynamic envelope based on the data associated with the host platform, wherein constructing the run-time dynamic envelope comprises:
   constructing an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with the entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform;

determining data associated with a state of the host platform based on the data associated with the host platform;

constructing an idealized dynamic envelope based on the initialization dynamic envelope, the data associated with a state of the host platform, and data associated with a perception envelope; and constructing the run-time dynamic envelope based on the idealized dynamic envelope; and constructing a Worldview Relational Interaction Map (WRIM) based on the run-time dynamic envelope, wherein the WRIM comprises a coordinate system corresponding to an area of an environment of the host platform, wherein the coordinate system comprises a plurality of elements, and wherein each element of the plurality of elements comprises:

one or more data attributes associated with a predicted momentum exchange resulting from the host platform co-occupying the element with the entity.

9. The method of claim 8, further comprising:

determining the one or more data attributes associated with the predicted momentum exchange of the host platform with regard to the entity associated with the element based on a machine learning model associated with a predicted transformation of perception;

wherein constructing the run-time dynamic envelope comprises:

constructing the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium;

wherein constructing the run-time dynamic envelope comprises:

predicting a state result of the host platform to actuator commands based on the data associated with DTIES; and generating an element of the run-time dynamic envelope based on the state result of the host platform.

10. The method of claim 8, further comprising:

identifying a Reasonable Operating Envelope (ROE) based on each element of the WRIM;

wherein identifying the ROE comprises:
comparing the one or more data attributes associated with a momentum exchange of an element of the WRIM to a threshold;

labeling the element with an indication that the host platform should not occupy the element based on determining that the one or more data attributes associated with a momentum exchange of the element satisfies the threshold; and labeling the element with an indication that the host platform can occupy the element based on determining that the one or more data attributes associated with a momentum exchange of the element does not satisfy the threshold.

11. The method of claim 8, wherein each element of the plurality of elements comprises:

one or more data attributes associated with a momentum exchange resulting from the host platform co-occupying the element with the entity;

one or more data attributes associated with boundaries, constraints, and/or rules of an environment of the host platform for the element; and one or more data attributes associated with a metric of uncertainty of the host platform for the element, the method further comprising:

identifying a Reasonable Operating Envelope (ROE) based on the data attributes of each element of the WRIM;

wherein identifying the ROE comprises:

providing the one or more data attributes associated with a momentum exchange resulting from the host platform co-occupying the element with the entity as an input to a first machine learning model to generate an output that includes a prediction of a value of momentum exchange and an indication of whether the value of momentum exchange satisfies a first threshold;

providing the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold;

providing the one or more data attributes associated with a metric of uncertainty of the host platform for the element as an input to a third machine learning model to generate an output that includes a prediction of a value of uncertainty and an indication of whether the value of uncertainty satisfies a third threshold;

labeling the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and labeling the element with a second indication based on the output of the first machine learning model including an indication that the value of momentum exchange does not satisfy the first threshold, the output of the second machine learning model including an indication that the flag condition does not satisfy the second threshold,

87 and the output of the third machine learning model including an indication that the value of uncertainty does not satisfy the third threshold;
the method further comprising:
receiving data associated with a path of a second host platform, wherein the path comprises a plurality of elements that were occupied by the second host platform during a sequence of executed actuator commands; and
comparing the data associated with the path of the second host platform to the ROE;
wherein comparing the data associated with the path of the second host platform along a second WRIM to the ROE comprises:
comparing a first element of the plurality of elements that were occupied by the second host platform during a sequence of executed actuator commands to an element of the ROE having a NO GO label, wherein the element of the ROE is in a nearest command decision cycle (CDC) band to the first element; and
determining a CDC band margin between the first element of the plurality of elements and the element of the ROE having the NO GO label, wherein the CDC band margin is a number of CDC bands from the first element of the plurality of elements to the element of the ROE having the NO GO label;
the method further comprising:
determining a pattern associated with CDC band margin for an operator of the second host platform;
assigning a rating to an identifier of an operator of the second host platform based on the pattern associated with CDC band margin for the operator; and
determining a classification of risk of the operator based on the rating of the identifier of the operator.

12. The method of claim 11, further comprising:
determining a pattern associated with CDC band margin for an actual momentum exchange;
generating a plurality of ranges of patterns of CDC band margins based on severity of outcome associated with a likelihood of momentum exchange event resulting from the host platform co-occupying an element with the entity, wherein each range of patterns of CDC band margins is associated with a classification of risk;
determining a pattern associated with CDC band margin of the operator;
determining a range of the plurality of ranges of patterns of CDC band margins for the operator based on the pattern associated with CDC band margin of an operator of a host platform; and
determining a classification of risk of the operator based on the range.

13. The method of claim 8, wherein an output of a predicted momentum exchange machine learning model comprises the one or more data attributes associated with the predicted momentum exchange resulting from the host platform co-occupying the element with the entity, the method further comprising:
training the predicted momentum exchange machine learning model based on a training dataset associated with an actual momentum exchange resulting from the host platform co-occupying an element with the entity;
validating the predicted momentum exchange machine learning model based on a validation dataset associated with an actual momentum exchange resulting from the host platform co-occupying an element with the entity; and

88 using the predicted momentum exchange machine learning model to generate the one or more data attributes associated with a predicted momentum exchange resulting from the host platform co-occupying an element with the entity;
the method further comprising:
training a threshold machine learning model based on a training dataset associated with an actual momentum exchange and a severity of outcome associated with an actual momentum exchange event resulting from the host platform co-occupying an element with the entity;
validating the threshold machine learning model based on a validation dataset associated with an actual momentum exchange and a severity of outcome associated with the actual momentum exchange event resulting from the host platform co-occupying an element with the entity; and
using the threshold machine learning model to generate a prediction and an indication of whether the prediction satisfies a threshold;
wherein each element of the plurality of elements comprises a plurality of data attributes, wherein the plurality of data attributes comprise:
one or more data attributes associated with a momentum exchange resulting from the host platform co-occupying the element with the entity;
one or more data attributes associated with boundaries, constraints, and/or rules of an environment of the host platform for the element; and
one or more data attributes associated with a metric of uncertainty of the host platform for the element;
the method further comprising:
identifying an Reasonable Operating Envelope (ROE) based on the plurality of data attributes of each element of the WRIM; and
performing an action based on the ROE.

14. The method of claim 8, further comprising:
receiving an input from a user associated with a strategic level goal on a geospatial map;
generating a placeholder element for the strategic level goal based on the strategic level goal, wherein the placeholder element for the strategic level goal comprises criteria associated with velocity and acceleration of the host platform at the placeholder element;
determining an operational level goal based on the strategic level goal;
generating a placeholder element for the operational level goal based on the operational level goal, wherein the placeholder element for the operational level goal comprises criteria associated with velocity and acceleration of the host platform at the placeholder element; and
determining a tactical level goal based on the operational level goal, wherein the tactical level goal corresponds to an element of a WRIM, wherein the element that corresponds to the tactical level goal comprises criteria associated with position, velocity, and acceleration relative to a coordinate system of the WRIM, wherein one or more data attributes of the element are related to the criteria associated with position, velocity, and acceleration.

15. A computer program product comprising at least one non-transitory computer-readable medium including one or more instructions that, when executed by at least one hardware processor, cause the at least one hardware processor to:
receive data associated with a host platform;
construct a run-time dynamic envelope based on the data associated with the host platform, wherein the one or more instructions that cause the at least one hardware processor to construct the run-time dynamic envelope cause the at least one hardware processor to:
construct an initialization dynamic envelope based on a set of actuator commands of the host platform, a response of the host platform to each actuator command of the set of actuator commands of the host platform, and a predetermined response in perception of the host platform to a dynamic action associated with an entity, wherein the initialization dynamic envelope comprises a machine learning model associated with a predicted transformation of perception, wherein the machine learning model associated with a predicted transformation of perception provides an output that comprises the predetermined response in perception of the host platform to a dynamic action associated with the entity, wherein the output is associated with a predicted transformation of perception at all positions of the host platform relative to a first position of the host platform after executing an actuator command, wherein the predicted transformation of perception is based on a notional entity as a reference point that is perceived by the host platform in a field of view of the host platform;
determine data associated with a state of the host platform based on the data associated with the host platform;
construct an idealized dynamic envelope based on the initialization dynamic envelope, the data associated with a state of the host platform, and data associated with a perception envelope;
construct the run-time dynamic envelope based on the idealized dynamic envelope; and
construct a Worldview Relational Interaction Map (WRIM) based on the run-time dynamic envelope, wherein the WRIM comprises a coordinate system corresponding to an area of an environment of the host platform, wherein the coordinate system comprises a plurality of elements, and wherein each element of the plurality of elements comprises:
one or more data attributes associated with a predicted momentum exchange resulting from the host platform co-occupying the element with the entity.

16. The computer program product of claim 15, wherein the one or more instructions further cause the at least one hardware processor to:
determine the one or more data attributes associated with the predicted momentum exchange of the host platform with regard to the entity associated with the element based on a machine learning model associated with a predicted transformation of perception;
wherein the one or more instructions that cause the at least one hardware processor to construct the run-time dynamic envelope cause the at least one hardware processor to:
construct the run-time dynamic envelope based on the idealized dynamic envelope and data associated with Dynamics Transfer Interface Effects Saturation (DTIES), wherein the data associated with DTIES comprises a factor associated with an interaction between a Dynamics Transfer Interface of the host platform and a Dynamics Interaction Medium of an element of the idealized dynamic envelope associated with an environment of the host platform, wherein the factor represents an energy transfer from the Dynamics Transfer Interface of the host platform to the Dynamics Interaction Medium and a resulting efficiency of output to the Dynamics Interaction Medium;
wherein the one or more instructions that cause the at least one hardware processor to construct the run-time dynamic envelope cause the at least one hardware processor to:
predict a state result of the host platform to actuator commands based on the data associated with DTIES; and
generate an element of the run-time dynamic envelope based on the state result of the host platform.

17. The computer program product of claim 15, wherein the one or more instructions further cause the at least one hardware processor to:
identify a Reasonable Operating Envelope (ROE) based on each element of the WRIM;
wherein, the one or more instructions that cause the at least one hardware processor to identify the ROE, cause the at least one hardware processor to:
compare the one or more data attributes associated with a momentum exchange of an element of the WRIM to a threshold;
label the element with an indication that the host platform should not occupy the element based on determining that the one or more data attributes associated with a momentum exchange of the element satisfies the threshold; and
label the element with an indication that the host platform can occupy the element based on determining that the one or more data attributes associated with a momentum exchange of the element does not satisfy the threshold.

18. The computer program product of claim 15, wherein each element of the plurality of elements comprises:
one or more data attributes associated with a momentum exchange resulting from the host platform co-occupying the element with the entity;
one or more data attributes associated with boundaries, constraints, and/or rules of an environment of the host platform for the element;
one or more data attributes associated with a metric of uncertainty of the host platform for the element; and
wherein the one or more instructions further cause the at least one hardware processor to:
identify a Reasonable Operating Envelope (ROE) based on the data attributes of each element of the WRIM;
wherein, the one or more instructions that cause the at least one hardware processor to identify the ROE, cause the at least one hardware processor to:
provide the one or more data attributes associated with a momentum exchange resulting from the host platform co-occupying the element with the entity as an input to a first machine learning model to generate an output that includes a prediction of a value of momentum exchange and an indication of whether the value of momentum exchange satisfies a first threshold;
provide the one or more data attributes associated with boundaries, constraints, and/or rules of an environment of the host platform for the element as an input to a second machine learning model to generate an output that includes a prediction of whether the element includes a flag condition and an indication of whether the flag condition satisfies a second threshold;
provide the one or more data attributes associated with a metric of uncertainty of the host platform for the element as an input to a third machine learning model to generate an output that includes a prediction of a value of uncertainty and an indication of whether the value of uncertainty satisfies a third threshold;

label the element with a first indication based on the output of the first machine learning model including an indication that the value of momentum exchange satisfies the first threshold, the output of the second machine learning model including an indication that the flag condition satisfies the second threshold, and the output of the third machine learning model including an indication that the value of uncertainty satisfies the third threshold; and label the element with a second indication based on the output of the first machine learning model including an indication that the value of momentum exchange does not satisfy the first threshold, the output of the second machine learning model including an indication that the flag condition does not satisfy the second threshold, and the output of the third machine learning model including an indication that the value of uncertainty does not satisfy the third threshold;

wherein the one or more instructions further cause the at least one hardware processor to:

receive data associated with a path of a second host platform, wherein the path comprises a plurality of elements that were occupied by the second host platform during a sequence of executed actuator commands; and compare the data associated with the path of the second host platform to the ROE;

wherein the one or more instructions that cause the at least one hardware processor to compare the data associated with the path of the second host platform along a second WRIM to the ROE cause the at least one hardware processor to:

compare a first element of the plurality of elements that were occupied by the second host platform during a sequence of executed actuator commands to an element of the ROE having a NO GO label, wherein the element of the ROE is in a nearest command decision cycle (CDC) band to the first element; and determine a CDC band margin between the first element of the plurality of elements and the element of the ROE having the NO GO label, wherein the CDC band margin is a number of CDC bands from the first element of the plurality of elements to the element of the ROE having the NO GO label;

wherein the one or more instructions further cause the at least one hardware processor to:

determine a pattern associated with CDC band margin for an operator of the second host platform;

assign a rating to an identifier of an operator of the second host platform based on the pattern associated with CDC band margin for the operator; and determine a classification of risk of the operator based on the rating of the identifier of the operator.

19. The computer program product of claim 18, wherein the one or more instructions further cause the at least one hardware processor to:

determine a pattern associated with CDC band margin for an actual momentum exchange;

generate a plurality of ranges of patterns of CDC band margins based on severity of outcome associated with a likelihood of momentum exchange event resulting from the host platform co-occupying an element with the entity, wherein each range of patterns of CDC band margins is associated with a classification of risk;

determine a pattern associated with CDC band margin of the operator;

determine a range of the plurality of ranges of patterns of CDC band margins for the operator based on the pattern associated with CDC band margin of an operator of a host platform; and determine a classification of risk of the operator based on the range.

20. The computer program product of claim 15, wherein an output of a predicted momentum exchange machine learning model comprises the one or more data attributes associated with the predicted momentum exchange resulting from the host platform co-occupying the element with the entity, and wherein the one or more instructions further cause the at least one hardware processor to:

train the predicted momentum exchange machine learning model based on a training dataset associated with an actual momentum exchange resulting from the host platform co-occupying an element with the entity;

validate the predicted momentum exchange machine learning model based on a validation dataset associated with an actual momentum exchange resulting from the host platform co-occupying an element with the entity; and use the predicted momentum exchange machine learning model to generate the one or more data attributes associated with a predicted momentum exchange resulting from the host platform co-occupying an element with the entity;

wherein the one or more instructions further cause the at least one hardware processor to:

train a threshold machine learning model based on a training dataset associated with an actual momentum exchange and a severity of outcome associated with an actual momentum exchange event resulting from the host platform co-occupying an element with the entity;

validate the threshold machine learning model based on a validation dataset associated with an actual momentum exchange and a severity of outcome associated with the actual momentum exchange event resulting from the host platform co-occupying an element with the entity; and use the threshold machine learning model to generate a prediction and an indication of whether the prediction satisfies a threshold;

wherein each element of the plurality of elements comprises a plurality of data attributes, wherein the plurality of data attributes comprise:

one or more data attributes associated with a momentum exchange resulting from the host platform co-occupying the element with the entity;

one or more data attributes associated with boundaries, constraints, and/or rules of an environment of the host platform for the element; and one or more data attributes associated with a metric of uncertainty of the host platform for the element, and wherein the one or more instructions further cause the at least one hardware processor to:

identify an Reasonable Operating Envelope (ROE) based on the plurality of data attributes of each element of the WRIM; and perform an action based on the ROE.

* * * * *